United States Patent
Rozinsky et al.

(10) Patent No.: US 10,056,813 B2
(45) Date of Patent: Aug. 21, 2018

(54) MULTIPOLE ELECTRICAL MACHINE

(71) Applicant: E.V.R. MOTORS LTD., Ashkelon (IL)

(72) Inventors: Eliyahu Rozinsky, Petah Tikva (IL);
Viktor Kislev, Ashkelon (IL); Ruslan Shabinski, Ma'ale Adumim (IL)

(73) Assignee: E.V.R. MOTORS LTD., Ashkelon (IL)

( * ) Notice: Subject to any disclaimer, the term of this patent is extended or adjusted under 35 U.S.C. 154(b) by 180 days.

(21) Appl. No.: 15/021,263

(22) PCT Filed: Sep. 18, 2014

(86) PCT No.: PCT/IL2014/050837
§ 371 (c)(1),
(2) Date: Mar. 10, 2016

(87) PCT Pub. No.: WO2015/040620
PCT Pub. Date: Mar. 26, 2015

(65) Prior Publication Data
US 2016/0226357 A1     Aug. 4, 2016

Related U.S. Application Data

(60) Provisional application No. 61/879,203, filed on Sep. 18, 2013, provisional application No. 61/879,215, (Continued)

(51) Int. Cl.
*H02K 1/14*            (2006.01)
*H02K 21/18*         (2006.01)
(Continued)

(52) U.S. Cl.
CPC .............. *H02K 21/18* (2013.01); *H02K 1/143* (2013.01); *H02K 1/182* (2013.01); *H02K 1/27* (2013.01);
(Continued)

(58) Field of Classification Search
CPC .......... H02K 1/143; H02K 1/18; H02K 1/182; H02K 1/27; H02K 1/28; H02K 21/12;
(Continued)

(56) References Cited

U.S. PATENT DOCUMENTS 3,330,975 A    7/1967   Osterwalder
4,899,074 A    2/1990   West
(Continued)

FOREIGN PATENT DOCUMENTS

CN        1359187 A    7/2002
CN        1499700 A    5/2004
(Continued)

OTHER PUBLICATIONS

International Search Report from International Application No. PCT/IL2014/050837 dated Jan. 5, 2015.
(Continued)

*Primary Examiner* — Tran Nguyen
(74) *Attorney, Agent, or Firm* — Dorsey & Whitney LLP

(57) ABSTRACT

An electromagnetic unit configured for being employed in a stator of an electric machine. The electromagnetic unit is constituted by a unitary solid body, and comprises a neck portion constituted by two end extensions sufficiently spaced apart for receiving therein a portion of a driven component of the electrical machine. The end extensions define therebetween a symmetry axis. The electromagnetic unit further comprises a frame extending from the end extensions and lying on the same or parallel plane as that of the end extensions. The frame has a first frame portion extending to one side of the symmetry axis to an extent W1, and a second frame portion extending to the other side of the symmetry axis to an extent W2<W1. W1, W2 are measured perpen-
(Continued)

dicular to the symmetry axis, and wherein at least the first frame portion is configured for receiving therein a coil of the electrical machine.

18 Claims, 62 Drawing Sheets

Related U.S. Application Data filed on Sep. 18, 2013, provisional application No. 61/879,221, filed on Sep. 18, 2013.

(51) Int. Cl.

| | | |
|---|---|---|
| H02K 21/12 | (2006.01) | |
| H02K 41/03 | (2006.01) | |
| H02K 1/27 | (2006.01) | |
| H02K 1/28 | (2006.01) | |
| H02K 15/02 | (2006.01) | |
| H02K 3/52 | (2006.01) | |
| H02K 5/08 | (2006.01) | |
| H02K 16/00 | (2006.01) | |
| H02K 1/18 | (2006.01) | |

(52) U.S. Cl.
CPC ............ *H02K 1/28* (2013.01); *H02K 15/022* (2013.01); *H02K 21/12* (2013.01); *H02K 41/031* (2013.01); *H02K 1/18* (2013.01); *H02K 3/521* (2013.01); *H02K 5/08* (2013.01); *H02K 16/00* (2013.01); *H02K 2201/12* (2013.01); *H02K 2201/15* (2013.01); *H02K 2213/03* (2013.01); *H02K 2213/12* (2013.01)

(58) Field of Classification Search
CPC ........ H02K 21/14; H02K 21/18; H02K 41/00; H02K 41/03; H02K 41/031
See application file for complete search history.

(56) References Cited

U.S. PATENT DOCUMENTS

| | | | |
|---|---|---|---|
| 5,051,641 A | 9/1991 | Weh | |
| 5,258,697 A | 11/1993 | Ford et al. | |
| 5,289,072 A | 2/1994 | Lange | |
| 5,651,841 A | 7/1997 | Moro et al. | |
| 5,696,419 A | 12/1997 | Rakestraw et al. | |
| 5,808,392 A | 9/1998 | Sakai et al. | |
| 6,097,118 A | 8/2000 | Hull | |
| 6,188,159 B1 | 2/2001 | Fan | |
| 6,492,756 B1 | 2/2002 | Maslov et al. | |
| 6,548,920 B2* | 4/2003 | Joong ................. | H02K 41/031 310/12.21 |
| 6,552,460 B2 | 4/2003 | Bales | |
| 6,617,746 B1 | 9/2003 | Maslov et al. | |
| 6,703,725 B2* | 3/2004 | Akita .................. | H02K 41/031 310/12.25 |
| 6,841,916 B2 | 1/2005 | Chiarenza | |
| 7,081,696 B2 | 7/2006 | Ritchey | |
| 7,138,734 B2* | 11/2006 | Kim ...................... | H02K 41/03 310/12.31 |
| 7,250,696 B2* | 7/2007 | Kim ...................... | H02K 41/03 310/12.05 |
| 7,285,889 B2 | 10/2007 | Shkondin | |
| 7,432,623 B2 | 10/2008 | Ritz, Jr. et al. | |
| 7,595,574 B2 | 9/2009 | Ritchey | |
| 7,723,888 B2 | 5/2010 | Petek | |
| 7,800,275 B2 | 9/2010 | Calley | |
| 7,816,830 B2 | 10/2010 | Dickes | |
| 7,851,965 B2 | 12/2010 | Calley et al. | |
| 7,863,784 B2 | 1/2011 | Ritz, Jr. et al. | |
| 7,868,510 B2 | 1/2011 | Rittenhouse | |
| 8,040,011 B2 | 10/2011 | Mueller et al. | |
| 8,339,009 B2 | 12/2012 | Mueller et al. | |
| 2002/0125781 A1 | 9/2002 | Bales | |
| 2004/0090128 A1* | 5/2004 | Kim ...................... | H02K 41/03 310/12.15 |
| 2004/0207281 A1 | 10/2004 | Detela | |
| 2004/0251767 A1 | 12/2004 | Chiarenza | |
| 2005/0110365 A1 | 5/2005 | Shkondin | |
| 2005/0204545 A1 | 9/2005 | Gieras et al. | |
| 2005/0212381 A1* | 9/2005 | Gilmour ................ | H02K 1/145 310/266 |
| 2006/0006745 A1 | 1/2006 | Lopatinsky et al. | |
| 2006/0232154 A1 | 10/2006 | Shkondin | |
| 2008/0169720 A1 | 7/2008 | Petek | |
| 2008/0179982 A1 | 7/2008 | Kramer | |
| 2008/0246362 A1 | 10/2008 | Hirzel | |
| 2009/0140526 A1 | 6/2009 | Jansen et al. | |
| 2010/0225197 A1* | 9/2010 | Fulford ................. | H02K 1/143 310/216.111 |
| 2011/0109190 A1 | 5/2011 | Aoyama et al. | |
| 2012/0007458 A1* | 1/2012 | Rozinsky ................ | H02K 1/02 310/156.47 |
| 2013/0113320 A1 | 5/2013 | Calley et al. | |
| 2013/0214633 A1 | 8/2013 | Dajaku | |

FOREIGN PATENT DOCUMENTS

| | | |
|---|---|---|
| CN | 101262159 | 9/2008 |
| CN | 102388524 | 3/2012 |
| CN | 102820756 A | 12/2012 |
| CN | 103199671 A | 7/2013 |
| EP | 1115127 | 7/2001 |
| EP | 1213819 A2 | 6/2002 |
| EP | 1283276 | 2/2003 |
| EP | 2317633 | 5/2011 |
| GB | 1525959 | 9/1978 |
| JP | 2007129154 | 5/2007 |
| WO | 95/04399 | 2/1995 |
| WO | 99/60692 | 11/1999 |
| WO | 01/89734 | 11/2001 |
| WO | 02/03527 | 1/2002 |
| WO | 02/37651 | 5/2002 |
| WO | 03/003385 | 1/2003 |
| WO | 2013/102444 | 7/2013 |

OTHER PUBLICATIONS

International Search Report from International Application No. PCT/IL2010/000007 dated Nov. 23, 2010.
Extended European Search Report for European Patent Application No. 14845647.8, dated Jun. 6, 2017 (12 pages).

* cited by examiner

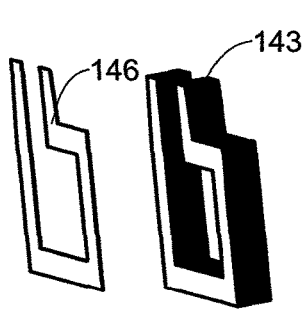
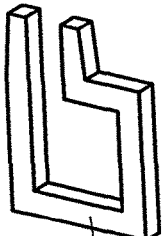
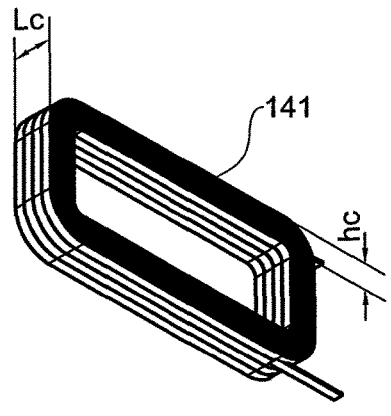
Fig. 7     Fig. 8     Fig. 9
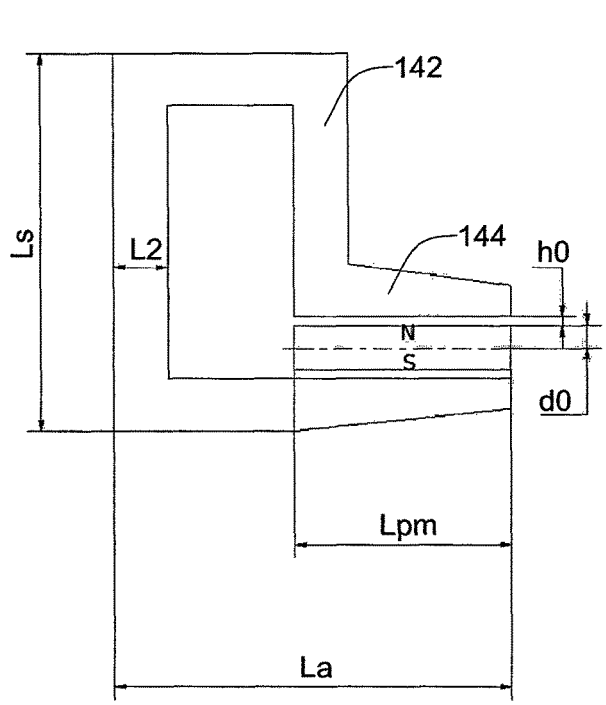
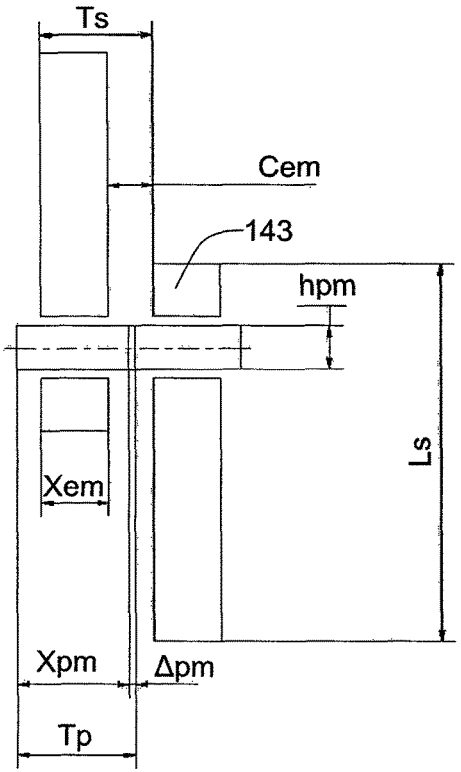
Fig. 10A     Fig. 10B

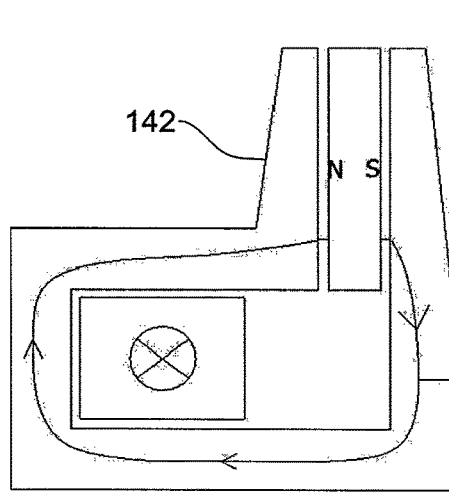 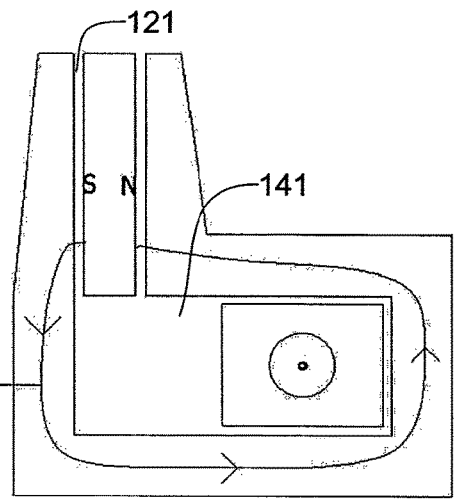
Fig. 14A
Fig. 14B
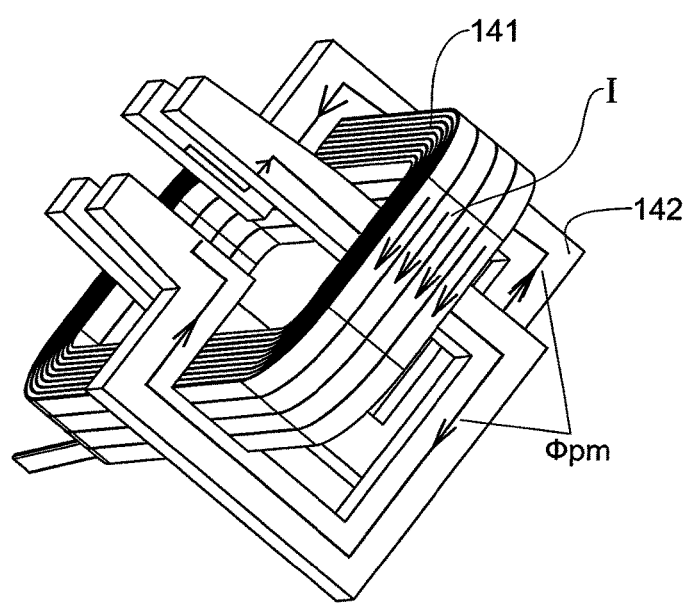
Fig. 15

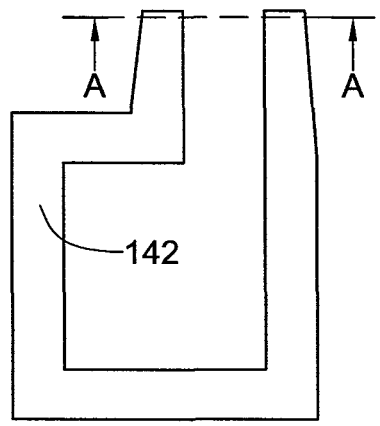
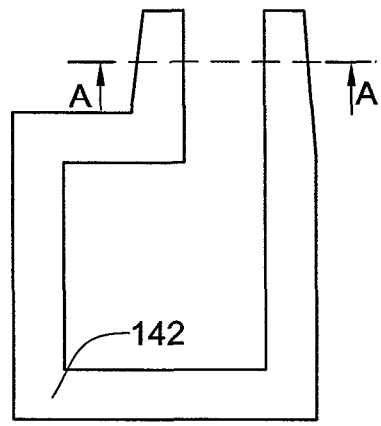
Fig. 16A
Fig. 16B
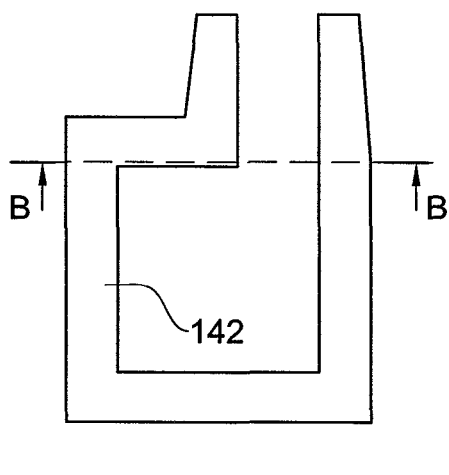
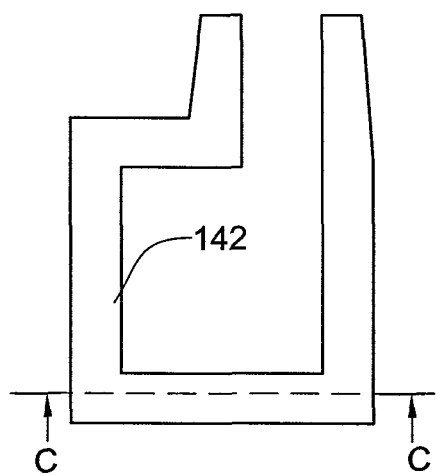
Fig. 16C
Fig. 16D

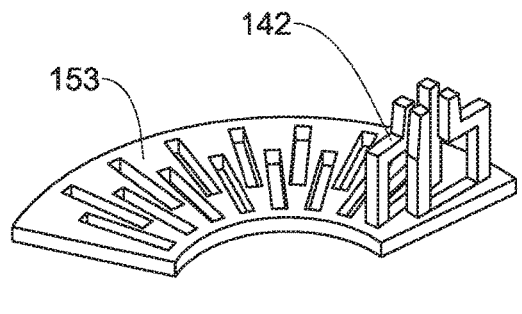 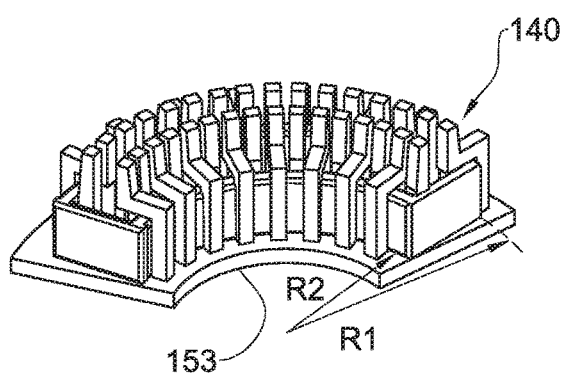
Fig. 17A    Fig. 17B
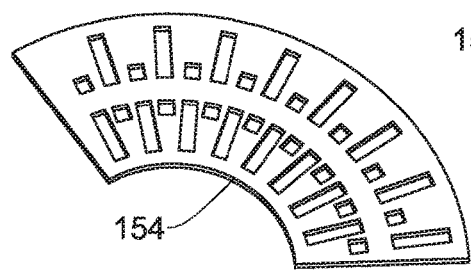 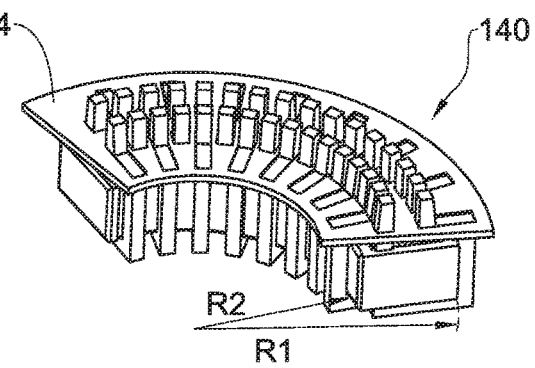
Fig. 18A    Fig. 18B
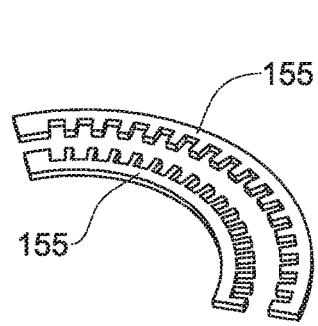 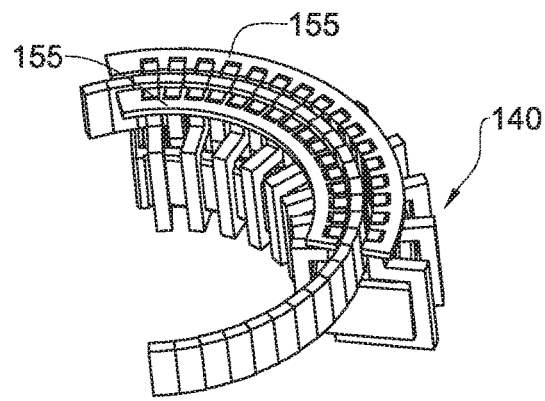
Fig. 19A    Fig. 19B

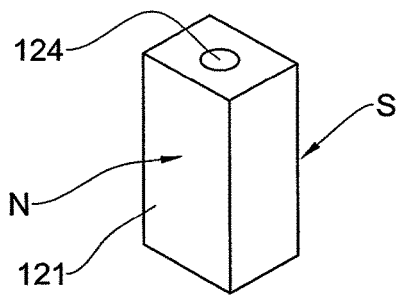
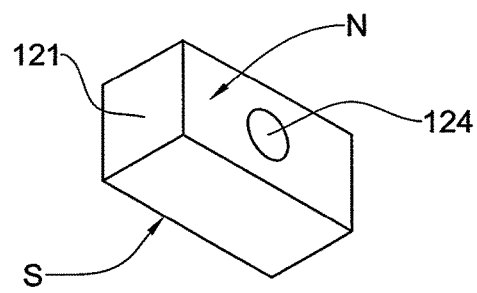
Fig. 28     Fig. 29
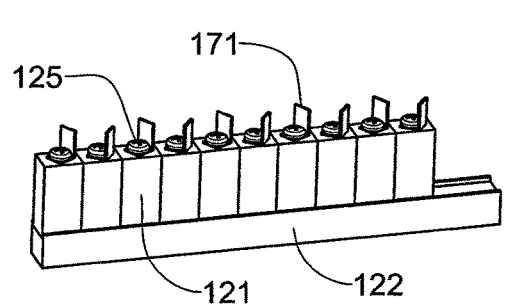
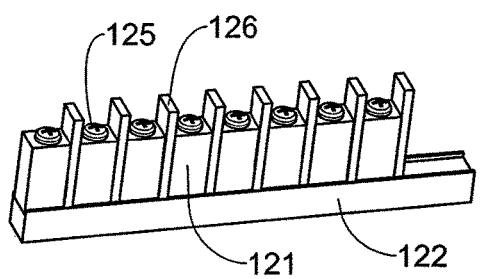
Fig. 30     Fig. 31
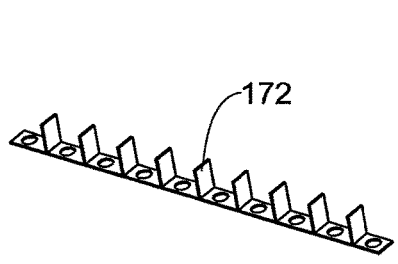
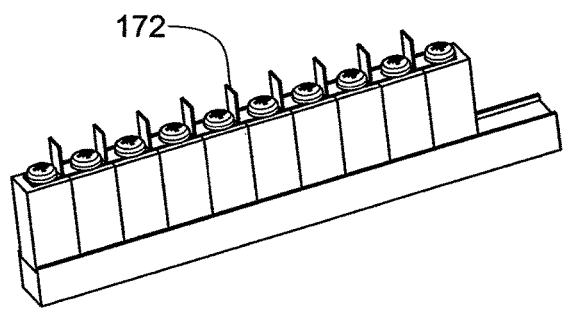
Fig. 32A     Fig. 32B

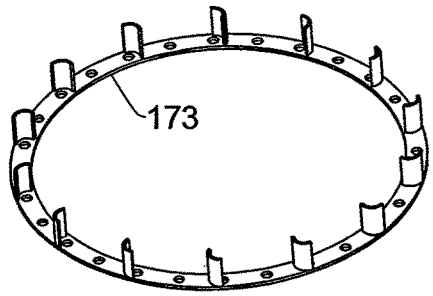
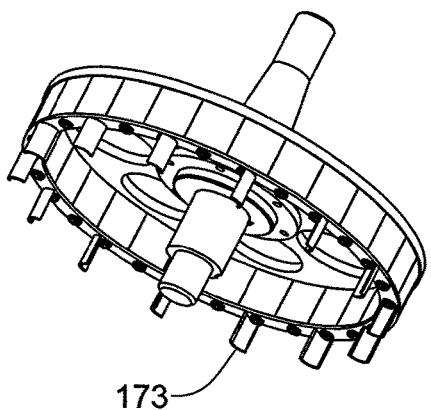
Fig. 33A    Fig. 33B
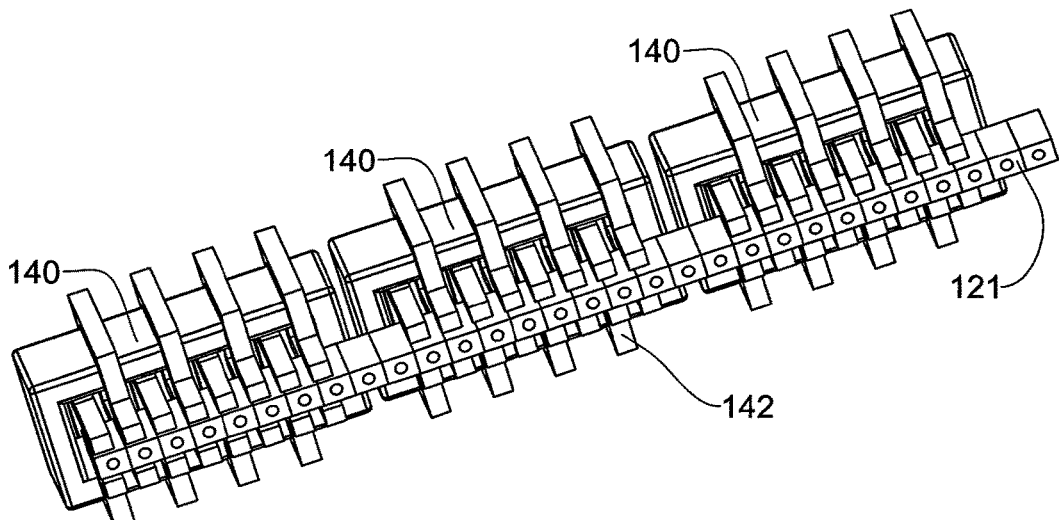
Fig. 34
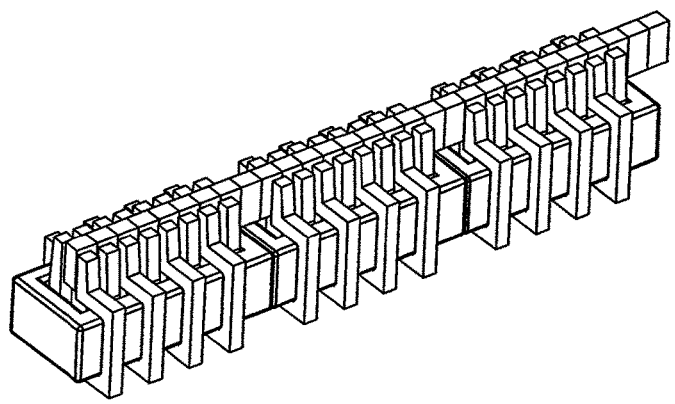
Fig. 35A

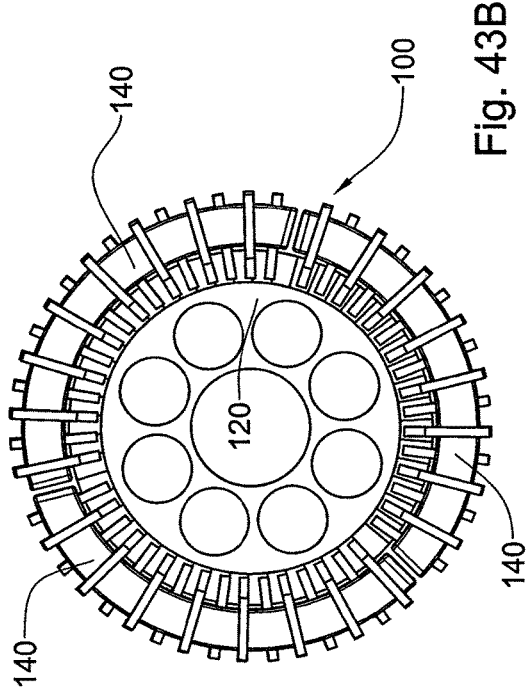
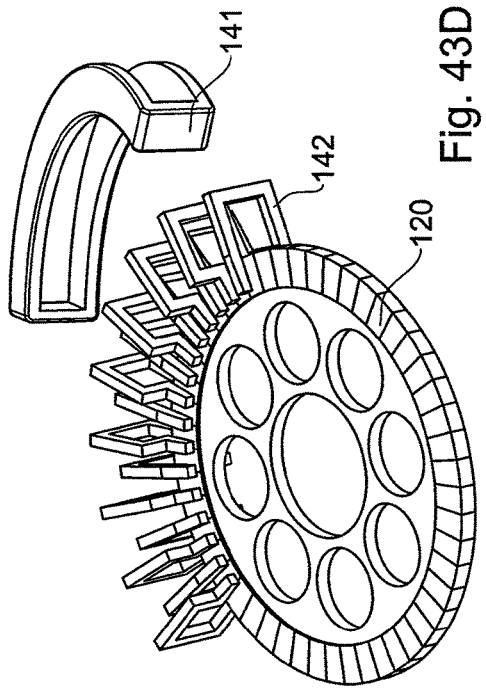
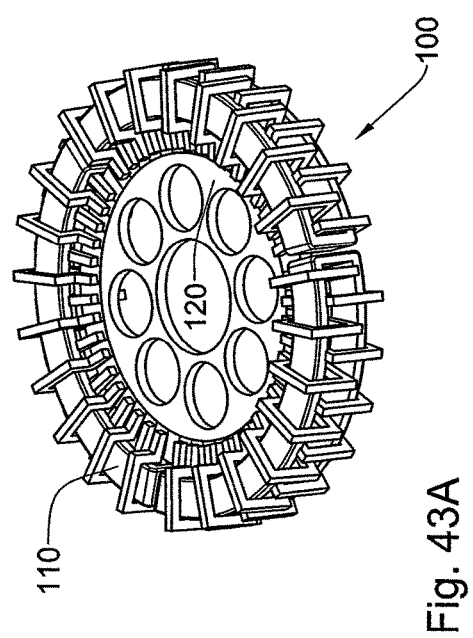
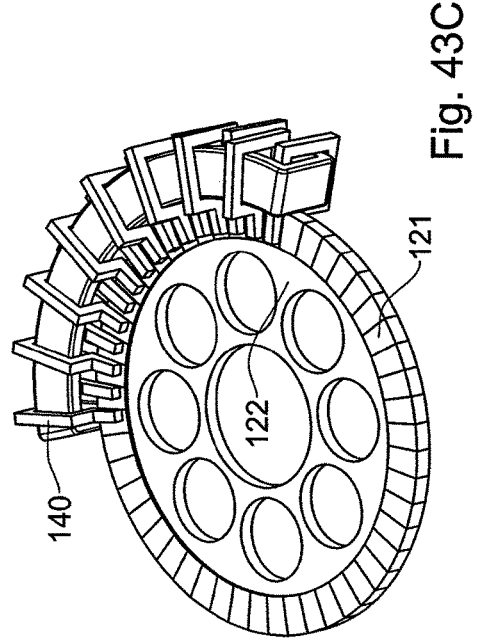
Fig. 43A
Fig. 43B
Fig. 43C
Fig. 43D

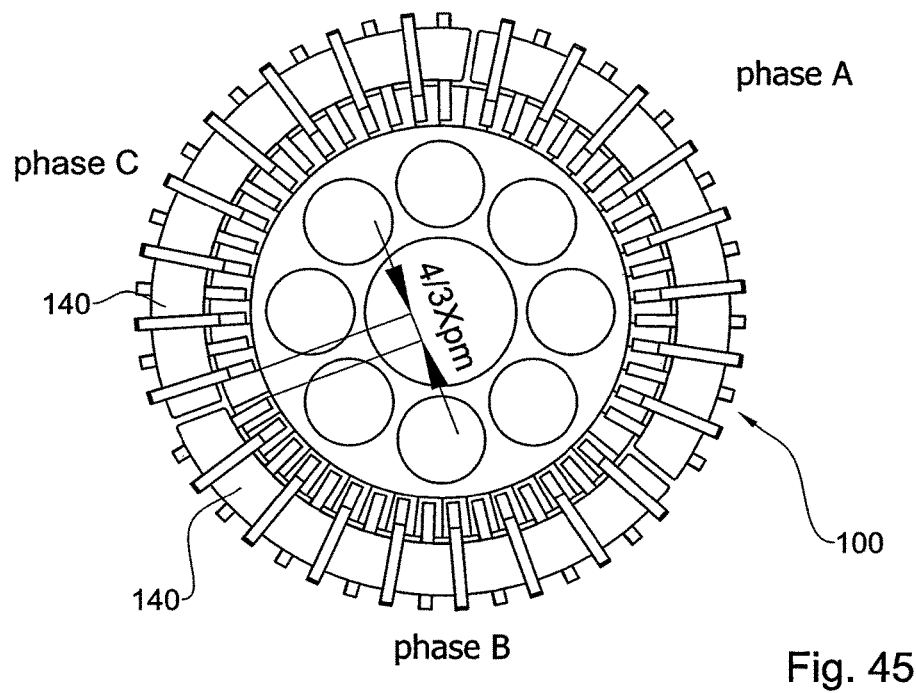
Fig. 45
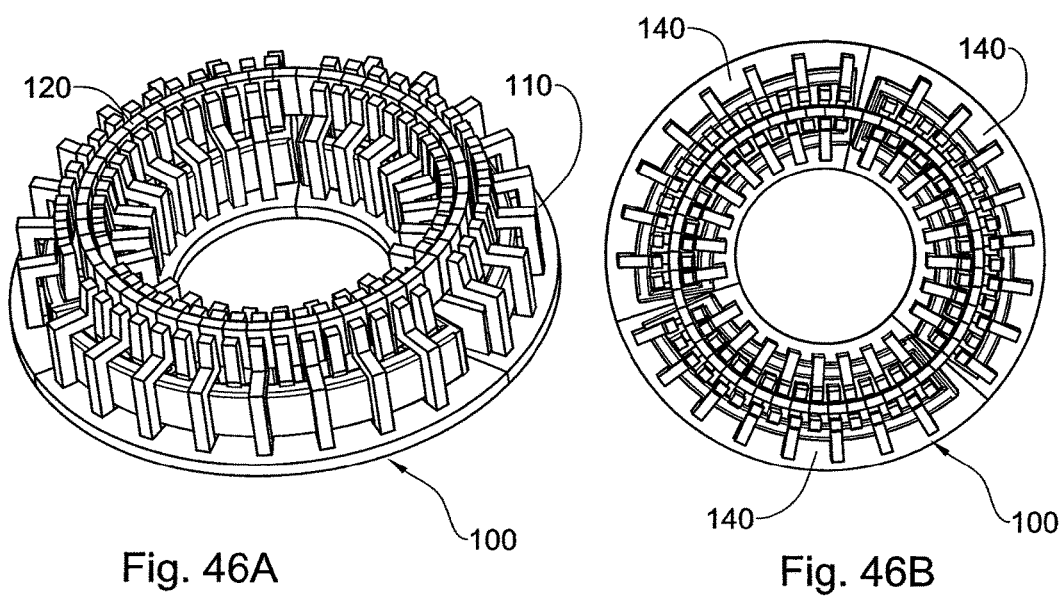
Fig. 46A
Fig. 46B

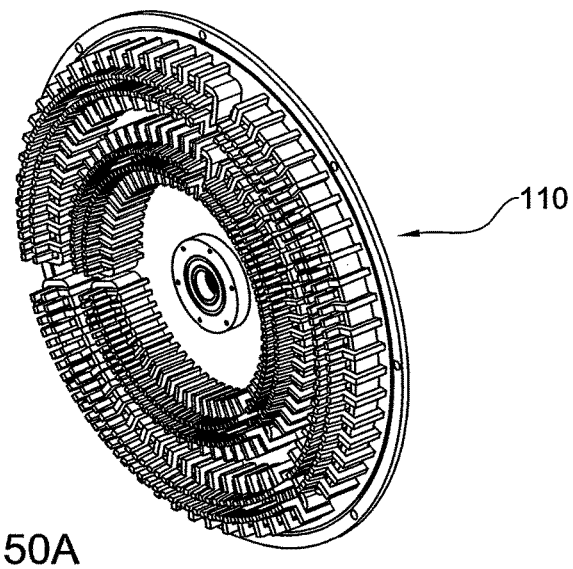
Fig. 50A
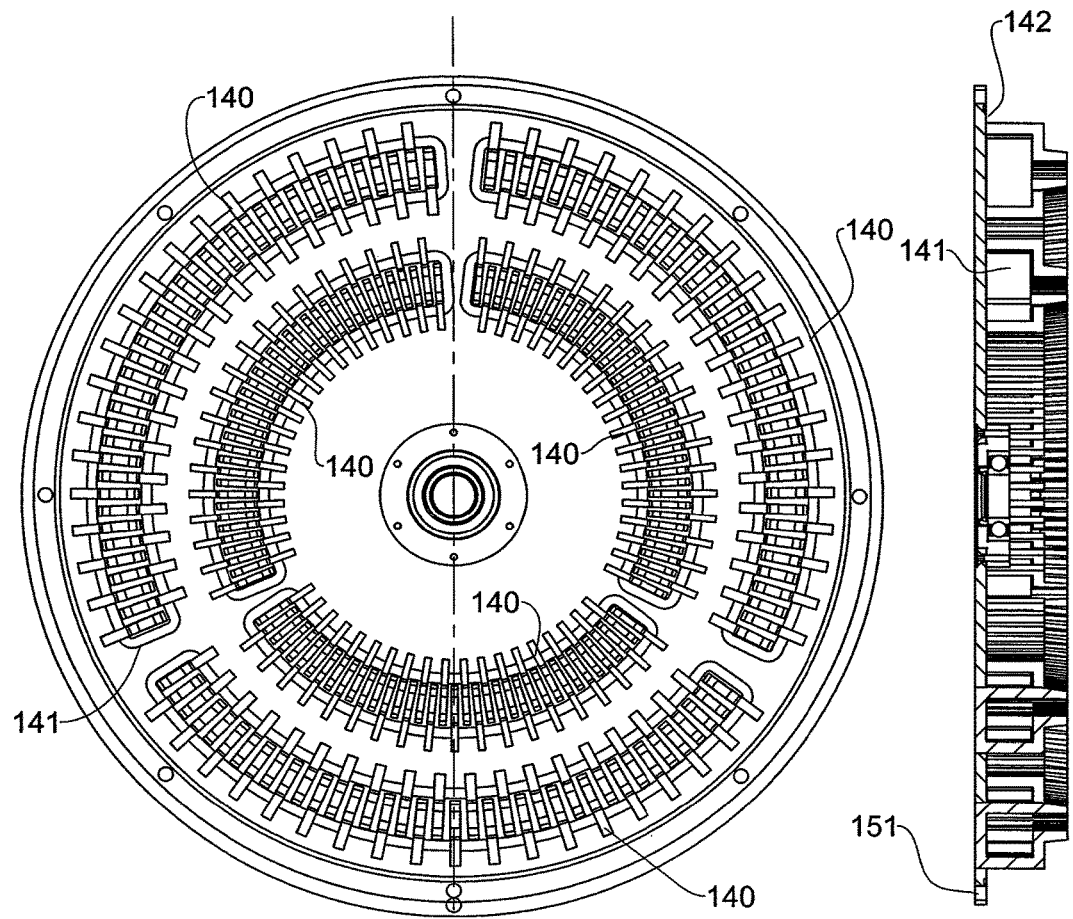
Fig. 50B
Fig. 50C

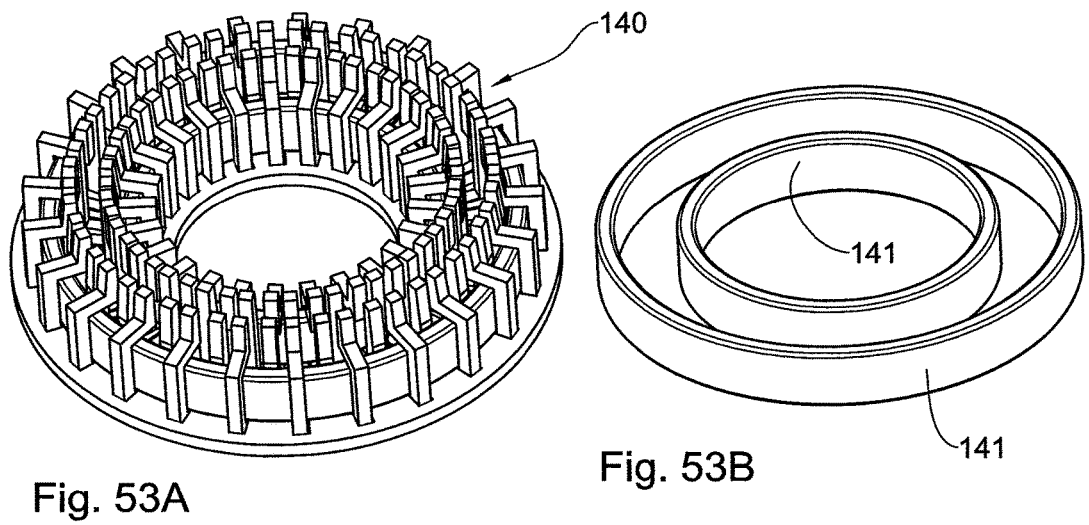
Fig. 53A   Fig. 53B
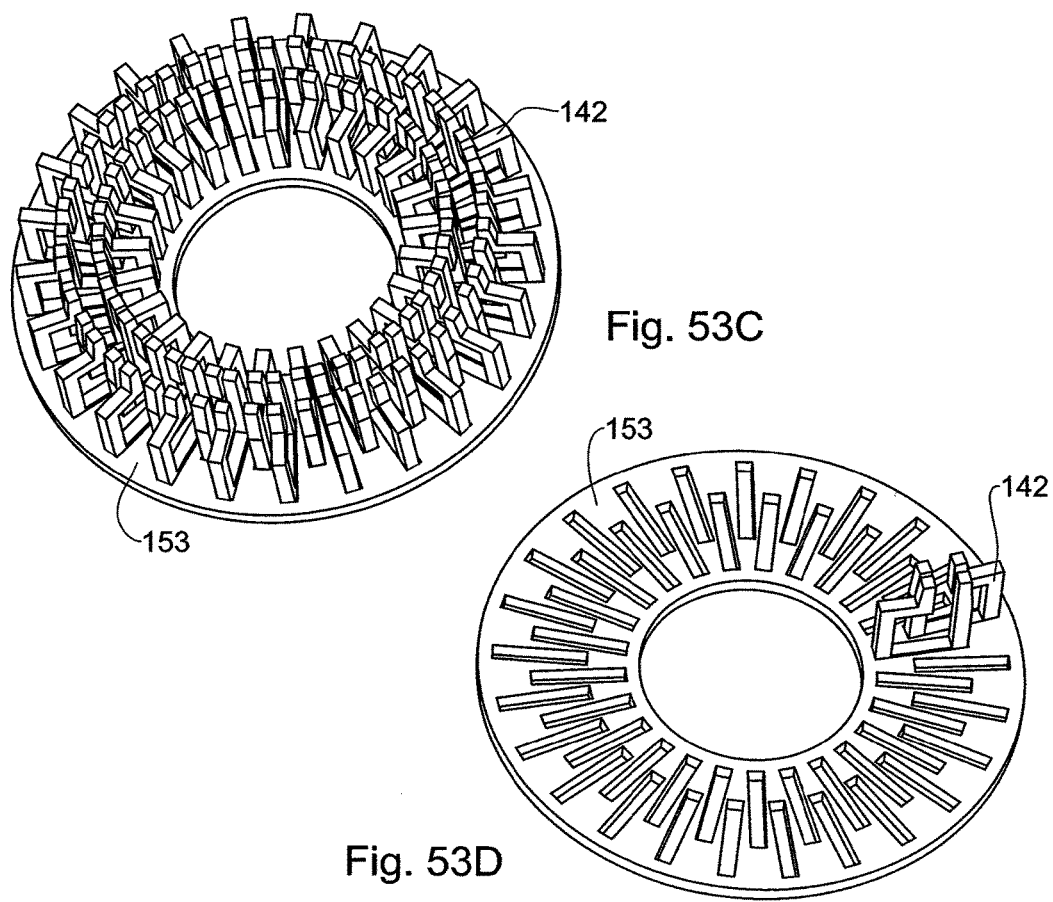
Fig. 53C
Fig. 53D

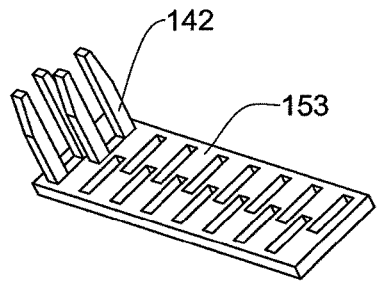
Fig. 61E
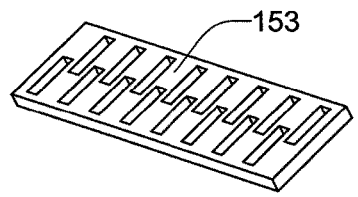
Fig. 61F
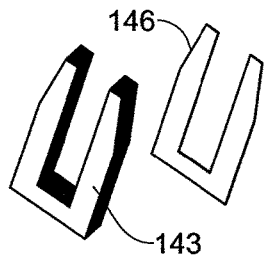
Fig. 62
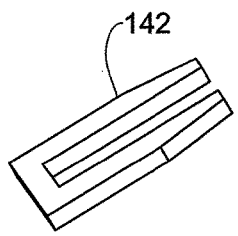
Fig. 63
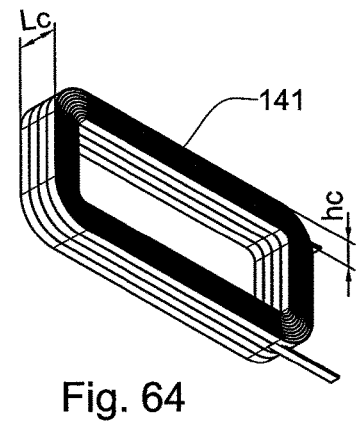
Fig. 64
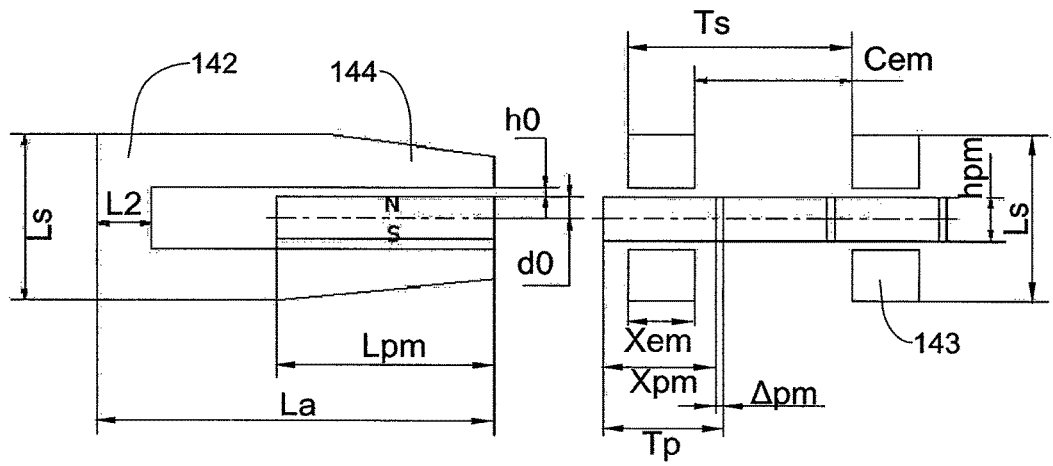
Fig. 65A
Fig. 65B

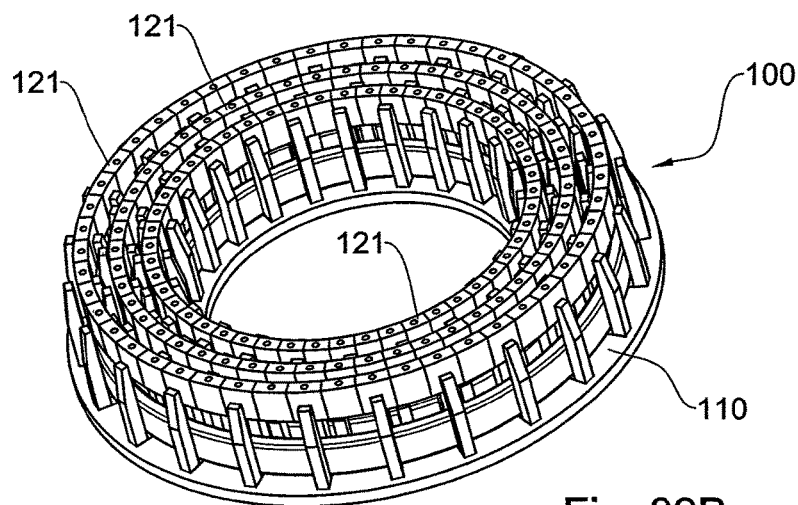
Fig. 89B
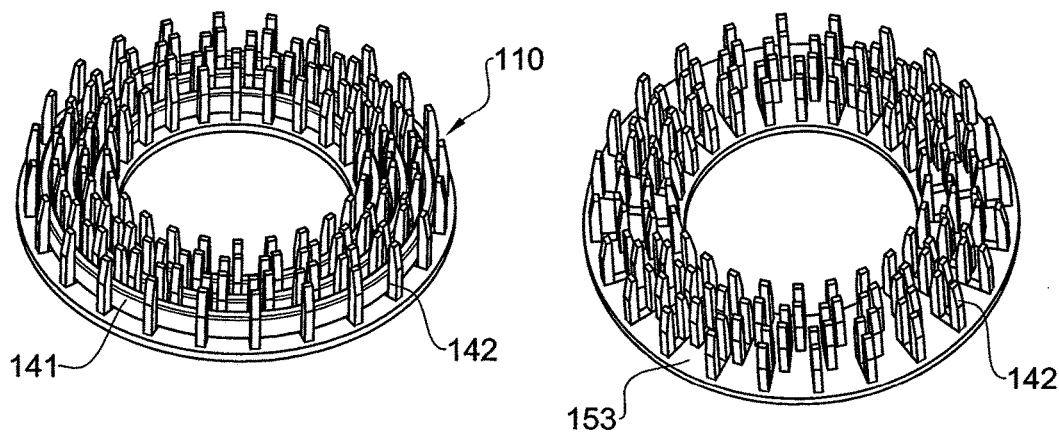
Fig. 90A          Fig. 90B
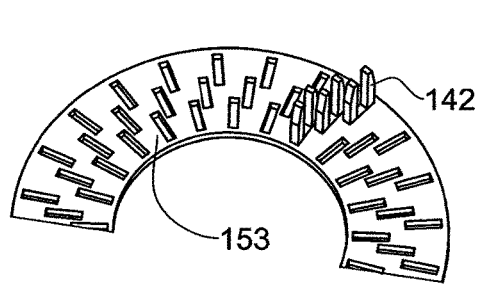 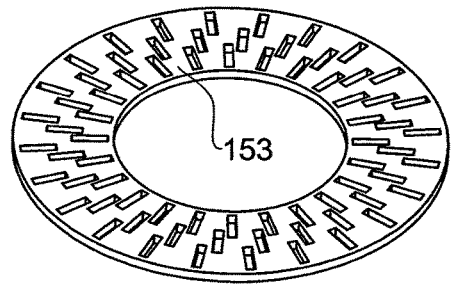
Fig. 90C          Fig. 90D

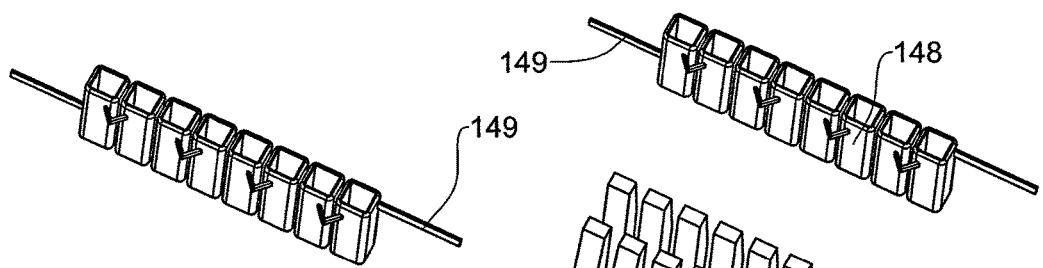
Fig. 105
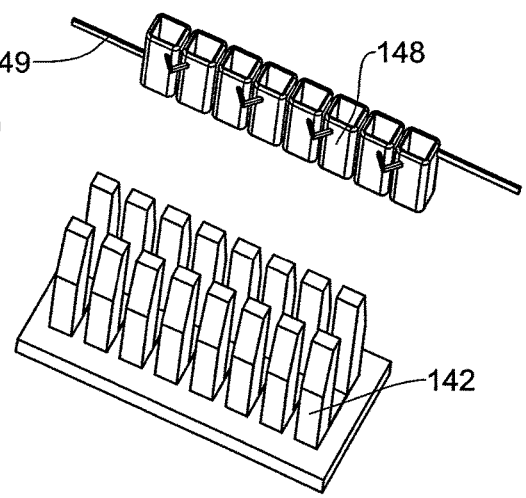
Fig. 106
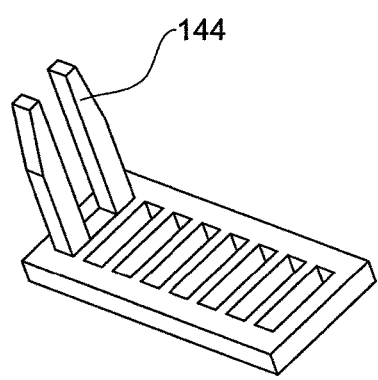
Fig. 107
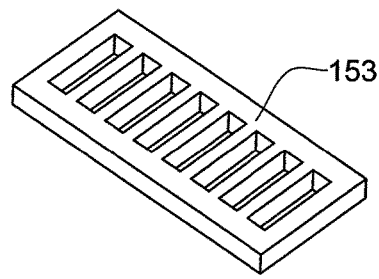
Fig. 108
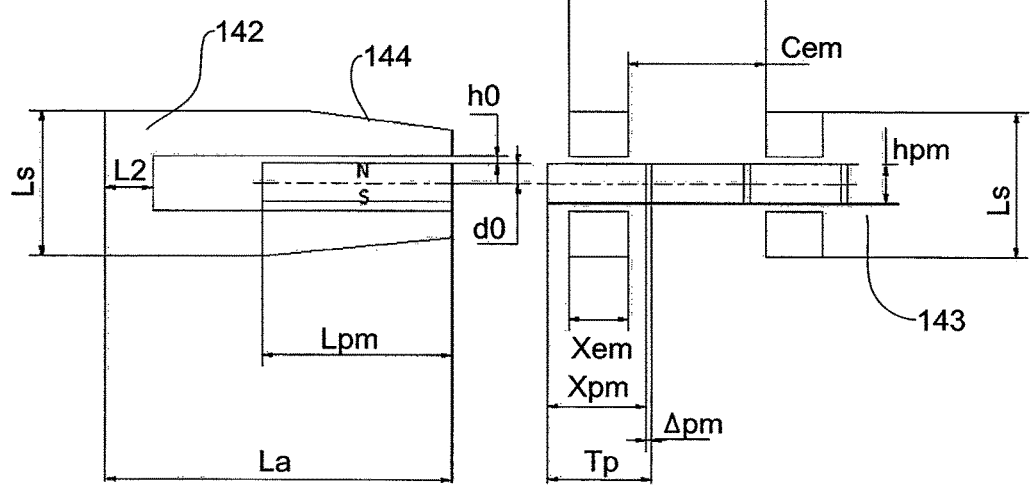
Fig. 109A
Fig. 109B

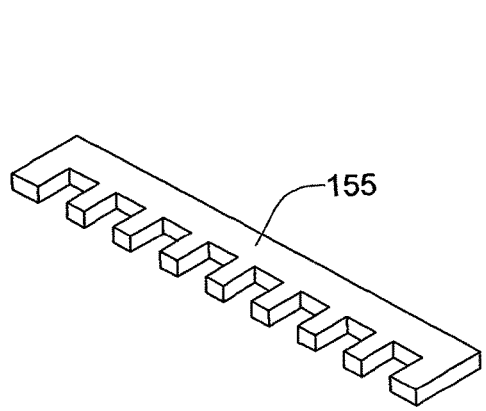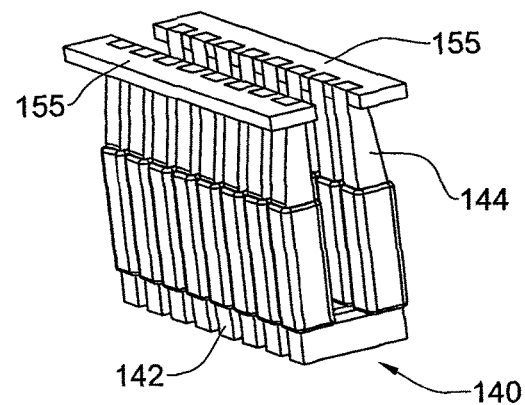
Fig. 114A　　　　　　Fig. 114B
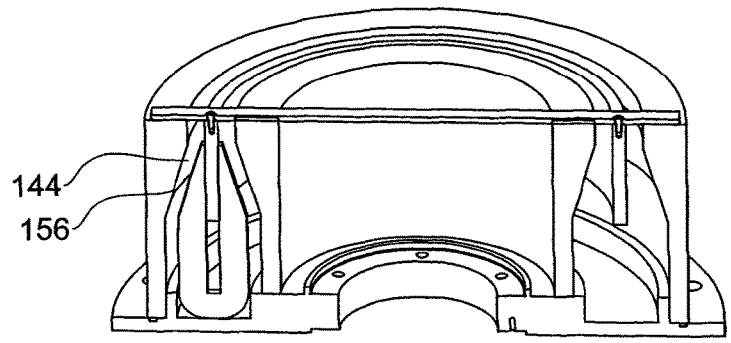
Fig. 115
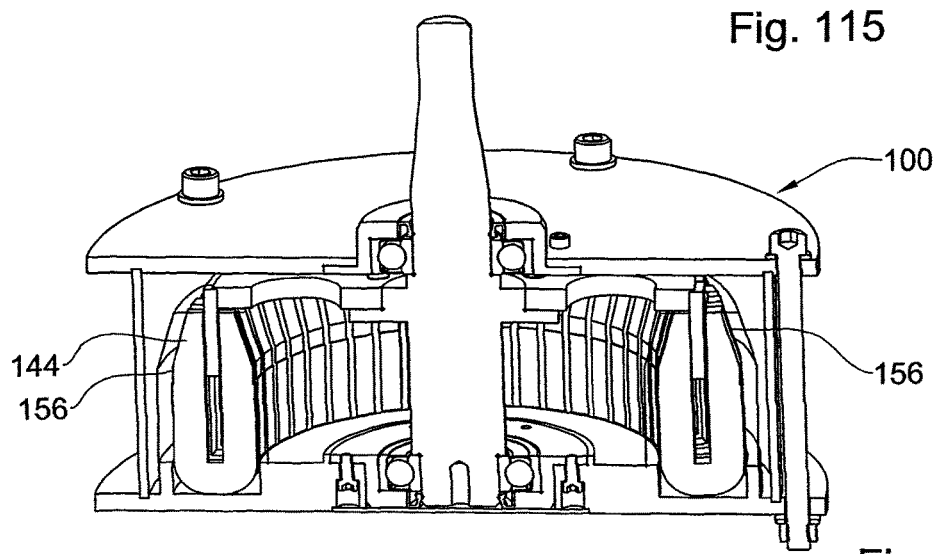
Fig. 116

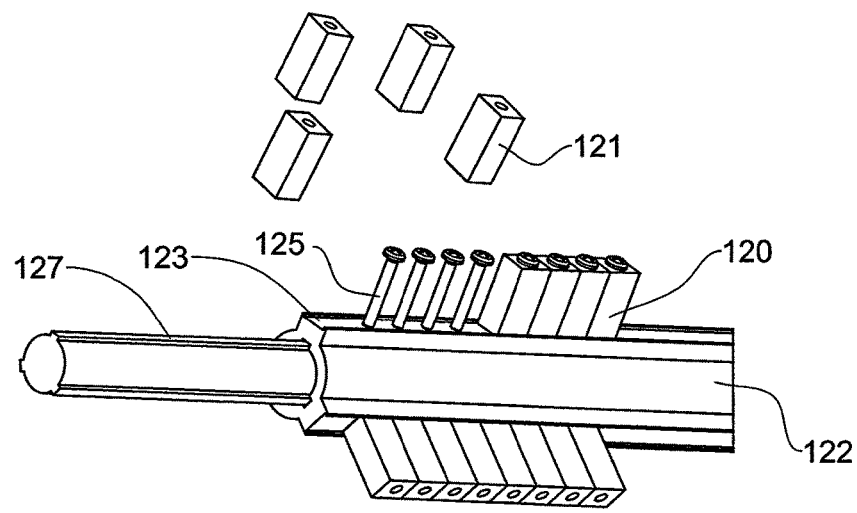
Fig. 127
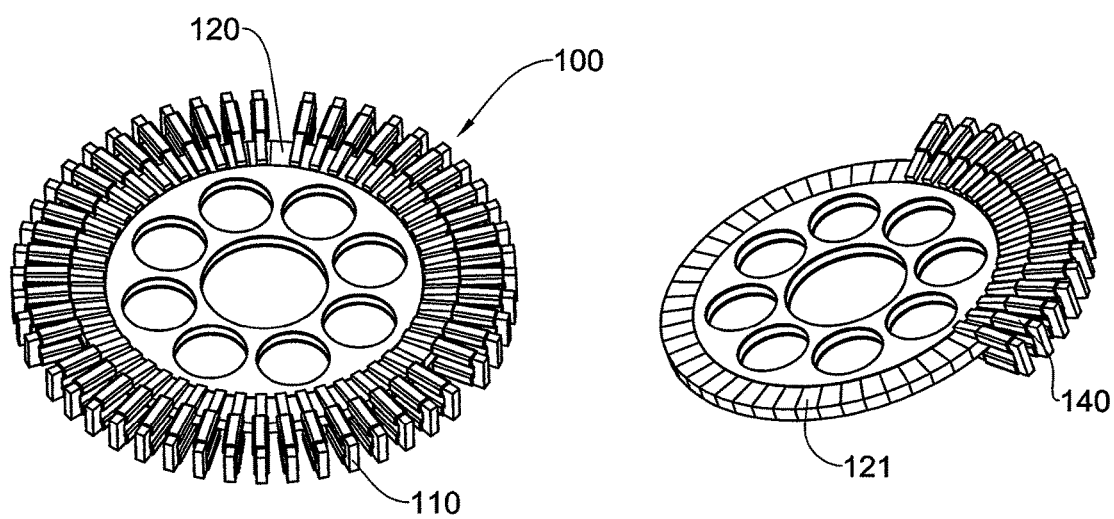
Fig. 128A
Fig. 128B

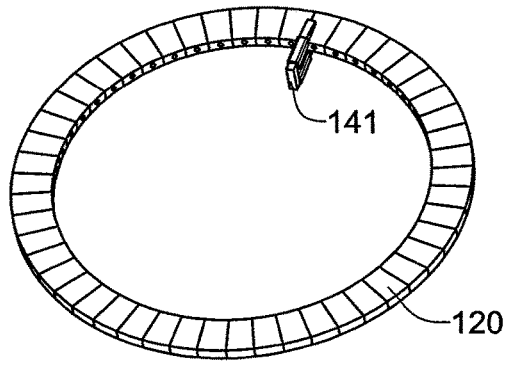 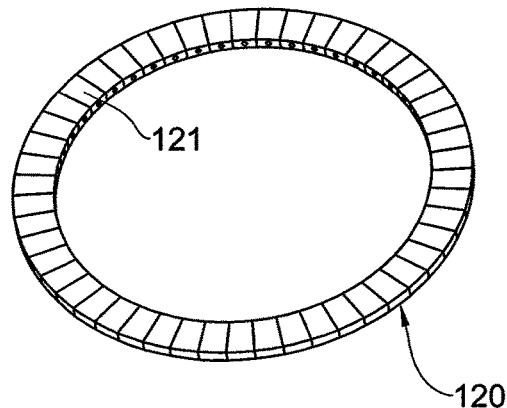
Fig. 129C    Fig. 129D
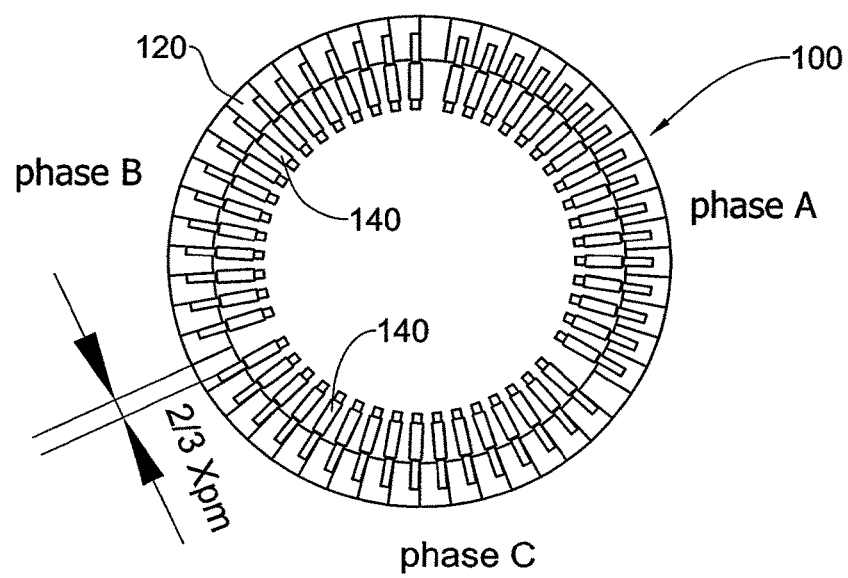
Fig. 130

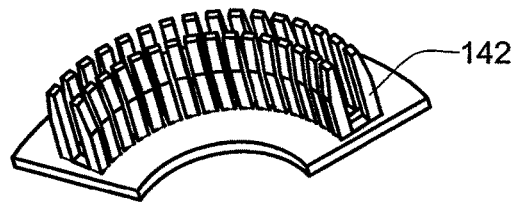
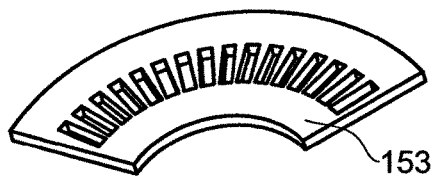
Fig. 134C
Fig. 134D
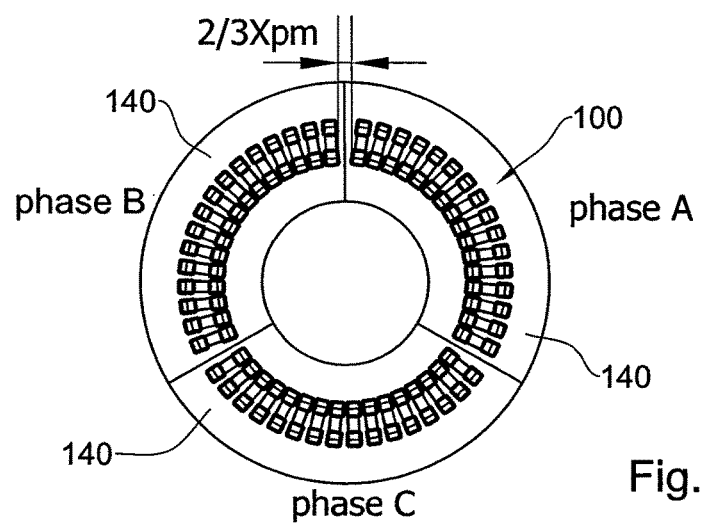
Fig. 135
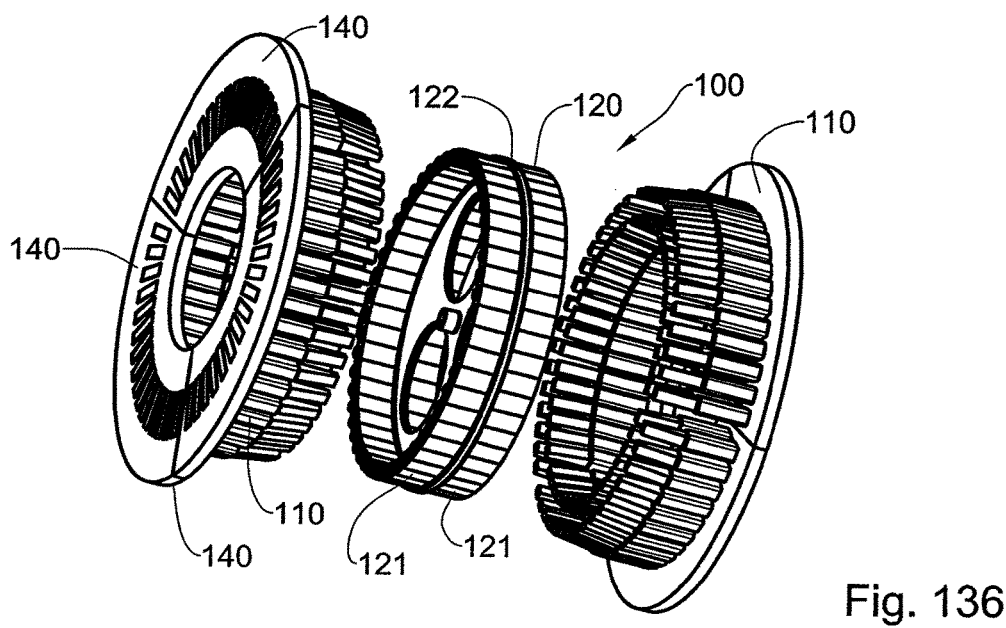
Fig. 136

MULTIPOLE ELECTRICAL MACHINE

TECHNOLOGICAL FIELD

The proposed solution is referred to the field of multipole permanent-magnet electrical machines. These electrical machines may be used as generators or direct-drive motors (gearless). The proposed electrical machines may be classified as the transverse flux permanent magnet machine (TFPM).

BACKGROUND ART

Magnet based electrical machine are well know in the art, and operate on the principle that electrical current generates electromagnetic flux and vise versa. In most such machines, a rotor comprising permanent magnets is configured for revolving within an electromagnetic field generated by a plurality of electromagnetic units associates with a coil through which electricity is passed.

One such example is an electrical machine described the applicant in WO10089734 which discloses an electrical machine comprising a stator and a rotor rotatable relative to the stator with an air gap therebetween is disclosed. The stator is provided with a first plurality of sources of magnetic field which is equally spaced in a circumferential configuration over the stator. The rotor is provided with a second plurality of sources of magnetic field which is equally spaced in a circumferential configuration over the rotor. The magnetic sources of at least one plurality are electromagnets; each electromagnet comprises at least one magnet coil resting on a magnet conductor. The magnetic conductor comprises at least one member made of magnetically isotropic and/or anisotropic materials.

Different electrical machines utilize various electromagnetic units, each with its own geometry and assembly method.

One example is U.S. Pat. No. 7,851,965 which disclosed transverse and/or commutated flux machines and components thereof, and methods of making and using the same. Certain rotors for use in transverse and commutated flux machines may be formed to facilitate a "many to many" flux switch configuration between flux concentrating stator portions having opposite polarities. Other rotors may be formed from a first material, and contain flux switches formed from a second material. Yet other rotors may be machined, pressed, stamped, folded, and/or otherwise mechanically formed. Via use of such rotors, transverse and/or commutated flux machines can achieve improved performance, efficiency, and/or be sized or otherwise configured for various applications Another example is WO0237651 which discloses linear motor and a method of producing the linear motor are provided to reduce a leak magnetic flux flowing between an armature and a moving element to reduce a one-direction magnetic attraction force generated between the armature and the moving element. The linear motor includes the armature having a core formed of a magnetic body and a winding wound around the core, and the moving element supported so as for the moving element to move relatively to the armature via a gap, magnetic pole teeth disposed above and below the moving element, disposed at predetermined pitches along a moving direction of the moving element and disposed opposite to each other via the moving element, and a winding for exciting the magnetic pole teeth such that adjacent and opposite magnetic pole teeth have different magnetic poles, and the moving element is reciprocated relatively to the armature by exciting the winding according to a predetermined control circuit Acknowledgement of the above references herein is not to be inferred as meaning that these are in any way relevant to the patentability of the presently disclosed subject matter.

GENERAL DESCRIPTION

According to one aspect of the subject matter of the present application there is provided an electromagnetic unit configured for being employed in a stator of an electric machine, said electromagnetic unit being constituted by a unitary solid body, and comprising a neck portion constituted by two end extensions sufficiently spaced apart for receiving therein a portion of a driven component of the electrical machine, and defining therebetween a symmetry axis, said electromagnetic unit further comprising a frame extending from the end extensions and lying on the same or parallel plane as that of the end extensions, said frame having a first frame portion extending to one side of the symmetry axis to an extent W1, and a second frame portion extending to the other side of the symmetry axis to an extent W2<W1, wherein W1, W2 are measured perpendicular to the symmetry axis, and wherein at least the first frame portion is configured for receiving therein a coil of the electrical machine.

According to a specific example, the end extensions can be straight. Furthermore, the end extensions can have a tapering shape, becoming narrower away from the frame.

The frame can be rectangular and, according to a specific example, square-shaped.

In accordance with a particular example, W2 can be equal to the distance between one of the end extensions and the symmetry axis. Specifically, this takes place when one side of the frame is co-linear with one of the end extensions.

The electromagnetic unit can be is made of a plurality of flat plates, each having a thickness t and a geometry similar to that of the electromagnetic unit, the flat plates being joined to form the electromagnetic unit having a combined thickness Y, being the sum of thicknesses y. The flat plates can be welded to one another.

According to another aspect of the subject matter of the present application there is provided a stator of an electrical machine comprising a mutual, close-contour coil and a plurality of electromagnetic ring units according to the previous aspect of the present application, mounted onto the coil, each being oriented perpendicular to said contour, wherein the first frame portion is located outside the close-contour of the coil and the second frame portion is located within the close-contour of the coil.

the electromagnetic units can be arranged so that the neck portions thereof form together a passage space for a driven component of the electrical machine. The driven component can be a permanent magnet structure.

According to one example, the structure can be a rotor, configured for revolving about an axis. According to another example, the structure can be a linear component, configured for linear displacement and/or reciprocation.

The electromagnetic units can be arranged successively along the contour of the mutual coil, at an alternative arrangement, the first frame portion of one electromagnetic unit facing the opposite way of that of the first portion of a successive electromagnetic unit.

The close-contour of the coil can be circular. In particular, the stator can comprise a first coil of diameter D1 and a second coil of diameter D2<D1, the coils extending about a mutual central axis.

In this case, the electromagnetic units are arranged along the coil contour at an alternating order so that the first frame portion of one electromagnetic unit is located outside the confines of the circular closed contour of the first coil, while the first frame portion of the successive electromagnetic unit is positioned within the confines of the circular closed contour of the second coil.

Alternatively, the close-contour of the coil is in the form of a sector of a circle. Specifically, the coil can have a first portion of radius R1 and a second portion of a radius R2<R1, extending about a mutual central axis.

In this case, the electromagnetic units are arranged along the coil contour at an alternating order so that the first frame portion of one electromagnetic unit is located outside the confines of the first portion of the coil, while the first frame portion of the successive electromagnetic unit is positioned within the confines of the second portion of the coil.

The stator can further comprise at least one positioning plate formed with positioning slots into which at least a portion of each of the plurality of electromagnetic units. In particular, said portion can be the end extensions of the electromagnetic units.

The stator can comprise two or more positioning plates, each being configured for receiving therein a different portion of each of the plurality of electromagnetic units.

The arrangement can be such that positioning the electromagnetic units within the positioning slots turns the stator into a unitary solid body. In particular, the at least one positioning plate can lie in a plane perpendicular to the plane of the electromagnetic unit. Furthermore, said at least one positioning plate can be configured for being fixedly attached to the housing of the electrical machine.

According to still another aspect of the subject matter of the present application there is provided a method for assembly of a stator of an electrical machine, said method including the steps of:

Providing:
  a plurality of electromagnetic units, each constituted by a unitary solid body;
  at least one coil; and
  at least one positioning plate comprising positioning slots, each being configured for receiving therein at least a portion of a corresponding electromagnetic ring unit;
  assembling the plurality of electromagnetic units with the coil to form a semi-assembled stator; and
  assembling the electromagnetic units onto the positioning plate by anchoring them into said positioning slots;

The arrangement can be such that after anchoring the electromagnetic units to the positioning plate, the coil cannot be removed from the stator.

According to one example, said stator comprises a plurality of coils, each being configured for mounting onto its corresponding electromagnetic unit, wherein said coil is configured for surrounding a portion of a frame of the electromagnetic unit.

According to another example, said coil is a mutual coil configured for interacting with a plurality of electromagnetic unit. In this case, the method can include:
  first mounting the plurality of electromagnetic units onto the mutual coil to form a semi-assembled stator, so that each electromagnetic unit is oriented transverse to the longitudinal direction; and thereafter
  mounting the semi-assembled stator onto the positioning plate by anchoring each of a majority of the electromagnetic units into respective positioning slots of the positioning plate, thereby forming an assembled stator in the form of a solid body;
  wherein the arrangement of the positioning slots is such that once the electromagnetic units are anchored, the mutual coil is prevented from removal from the assembled stator.

According to one example, the electromagnetic units can be U-shaped. According to another example, the electromagnetic units can be G-shaped.

The anchoring can include inserting at least a portion of each electromagnetic unit into a respective positioning slot of the positioning plate. In particular, said portion can be the end extensions of the electromagnetic units.

The method can include providing two or more positioning plates, and anchoring the plurality of electromagnetic units thereto so that each positioning plate is configured for receiving therein a different portion of each of the plurality of electromagnetic units.

According to yet another aspect of the subject matter of the present application, there is provided a stator assembled according to the method of the previous aspect of the subject matter of the present application.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 7 is a schematic isometric view of an electromagnetic unit of the stator shown in FIG. 2, during assembly;

FIG. 8 is a schematic isometric view of an electromagnetic unit of the stator shown in FIG. 2, when assembled;

FIG. 9 is a schematic isometric view of a winding used in the electrical machine shown in FIG. 1;

FIGS. 10A and 10B are respective schematic front and side views of an electromagnetic unit and a portion of a permanent magnet;

FIGS. 14A and 14B are schematic front and rear views of an electromagnetic unit when mounted onto a coil;

FIG. 15 is a schematic isometric view of the units shown in FIG. 14A, 14B, demonstrating the magnetic flux within the electromagnetic units;

FIGS. 16A to 16D are schematic front views of an electromagnetic unit of the stator, showing different planes along which positioning plates can be placed during assembly of the stator.

FIGS. 17A to 19B are respective schematic isometric views of bottom, middle and top positioning plates, and the stators in which they are mounted;

FIGS. 25 to 29 are schematic isometric views of a linear permanent magnet and building blocks for its assembly;

FIGS. 30 to 32B are various schematic isometric views of a linear permanent magnet comprising cooling fins;

FIGS. 33A and 33B are schematic isometric views of a rotor and a fin arrangement of the electrical machine;

FIG. 34 is a schematic isometric view of a portion of a linear electrical machine;

FIGS. 35A and 35B are schematic isometric and side views of the portion shown in FIG. 34;

FIGS. 43A to 43D are schematic isometric views of the rotor and stator of an electrical machine;

FIG. 45 is a schematic front view of the electrical machine shown in FIGS. 43A to 44D;

FIGS. 46A and 46B are schematic isometric and top views of a stator and rotor of an electrical machine of the present application;

FIGS. 46C to 46F are schematic isometric views of the electrical machine shown in FIGS. 46A and 46B, demonstrating various stages of its assembly;

FIGS. 50A to 50C are schematic isometric, front and side views of a first sub-assembly of the electrical machine shown in FIG. 48;

FIGS. 53A to 53D are schematic isometric views of a portion of the electrical machine shown in FIG. 48, shown during assembly thereof;

FIGS. 61A to 61F are schematic isometric views of another example of an electrical machine, shown during various assembly stages thereof;

FIG. 62 is a schematic isometric view of an electromagnetic unit of the stator shown in FIG. 58, during assembly;

FIG. 63 is a schematic isometric view of an electromagnetic unit of the stator shown in FIG. 58, when assembled;

FIG. 64 is a schematic isometric view of a winding used in the electrical machine shown in FIG. 58;

FIGS. 65A and 65B are respective schematic front and side views of an electromagnetic unit and a portion of a permanent magnet;

FIG. 89B is a schematic isometric view of the electrical machine shown in FIG. 89A;

FIGS. 90A to 90F are schematic isometric and top views showing the internal construction of the electrical machine shown in FIGS. 89A-89B;

FIGS. 105 to 108 are schematic isometric views of the stator shown in FIG. 98, in various assembly stages thereof;

FIGS. 109A and 109B are schematic front and side views of an electromagnetic unit used in the stator shown in FIG. 98;

FIGS. 113A and 113B are schematic isometric views of a stator mounted on a top positioning plate and of the top positioning plate;

FIGS. 115 and 116 are schematic isometric cross-section views of a housing of an electrical machine;

FIG. 127 is a schematic isometric exploded view of a portion of the electrical machine shown in FIG. 125;

FIG. 130 is a schematic top view of the electrical machine shown in FIG. 128;

FIG. 135 is a schematic top view of the electrical machine shown in FIG. 131;

FIG. 136 is a schematic isometric exploded view of an electrical machine;

DETAILED DESCRIPTION OF EMBODIMENTS

List of Accepted Abbreviations

TFPM—transverse flux permanent magnet machine
LFPM—linear transverse flux permanent magnet machine
AFPM—axial flux permanent magnet machine
RFPM—radial flux permanent magnet machine
$\Phi_{pm}$—magnetic flux generated by permanent magnets
I—current flowing through the slot winding
A, B, C—stator winding phases
A-A, B-B, C-C—section planes
p—the number of pole pairs
ps—the number of pole pairs of the machine moving part located inside the slot
t—the number of slots in a phase
s—the number of the slot magnetic conductors
$\tau p$—pole pitch
$\tau s$—slot pitch
Lc—winding width
hc—winding height
Lpm—magnet length
$L_2$—magnetic conductor stack lamination width
ho—air gap distance
hpm—magnet height along the magnetization axis
Xpm—magnet width
Δpm—distance between neighboring magnets
Xem—magnetic conductor width
Cem—distance between neighboring magnetic conductors
Xs—distance between slots in a phase
Xph—distance between phases The present invention as described herein includes examples which can be divided into two basic configurations:
  solenoid winding—in which each electromagnetic unit is provided with its own coil, mounted on the frame of the electromagnetic unit; and distribution winding—in which one or more mutual coils are provided, each being configured for mounting thereon a plurality of electromagnetic units.

Under the second example of the distribution winding, two different examples are presented—one using a U-shaped electromagnetic unit and the other, using a G-shaped electromagnetic unit.

Figure 1:
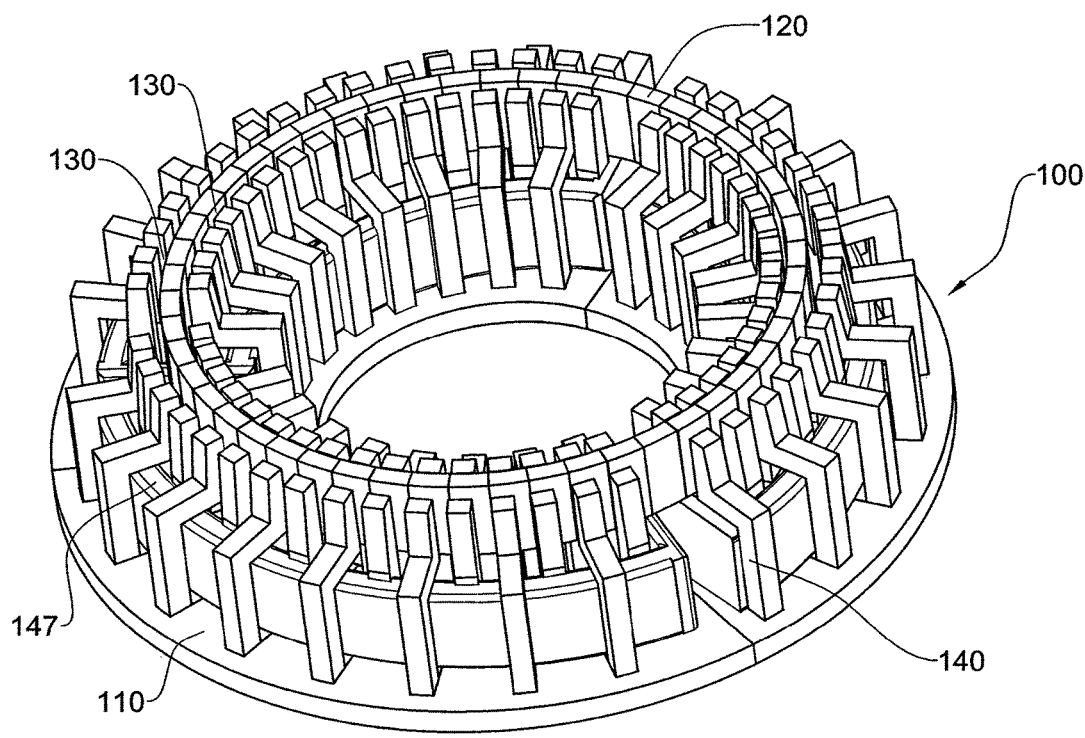
FIG. 1 is a schematic isometric view of a circular stator of an electrical machine according to one aspect of the subject matter of the present application.
Figure 55:
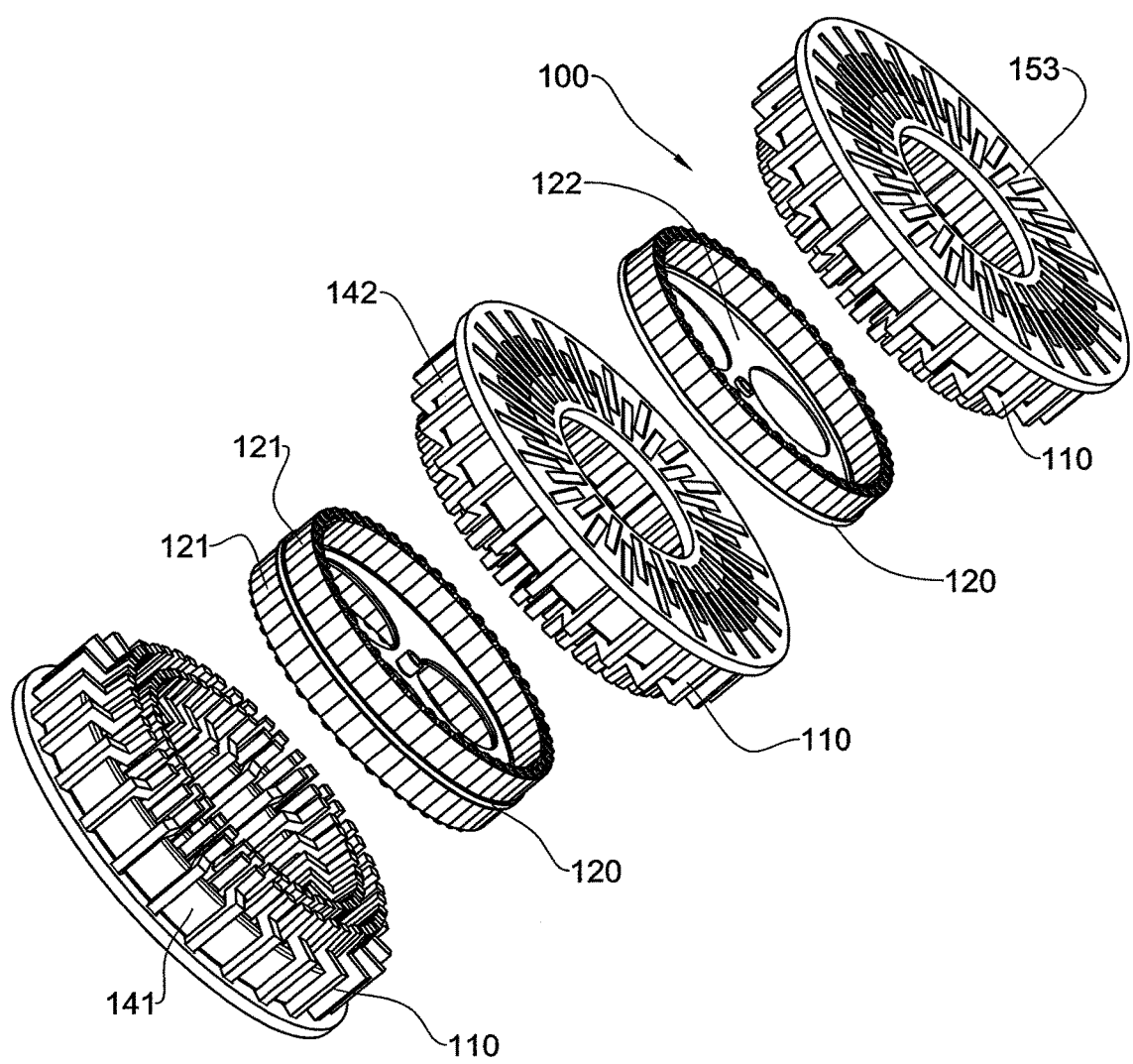
FIG. 55 is a schematic isometric exploded view of the electrical machine shown in FIG. 48.

Attention is first drawn to FIGS. 1 to 55, in which distribution winding with G-shaped electromagnetic units is presented.

The multipole electrical machine 100 comprises stator 110 and rotor 120, which moves (rotates) relative to the stator 110 with an air gap 130 between them (FIG. 1).

The stator 110 is assembled of the slots 140. Using the concept of the slot 140 as the basic Lego component, various TFPM types can be assembled: linear permanent magnet machines (LFPM), axial (AFPM) and radial (RFPM) magnetic flux permanent magnet machines. Let's consider the design of the stator slot 140 using the example of LFPM 100.

Stator Slot

Figure 2:
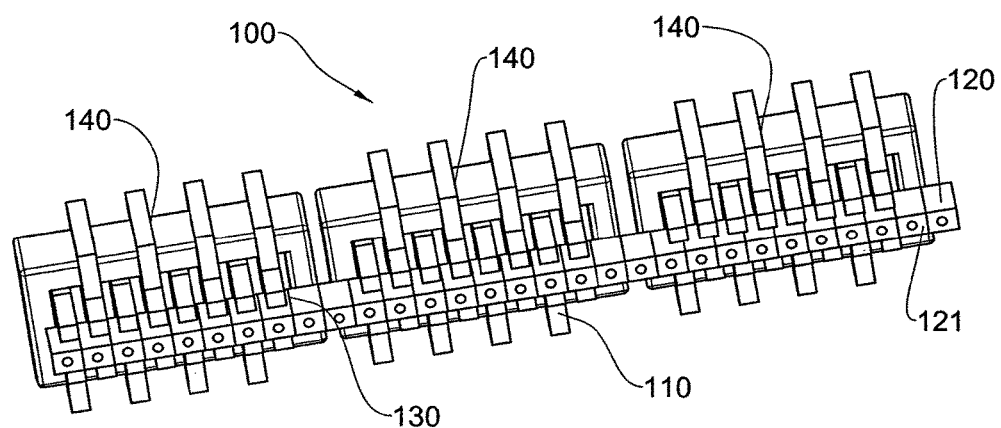
FIG. 2 is a schematic isometric view of a linear stator of the present application.
Figure 3:
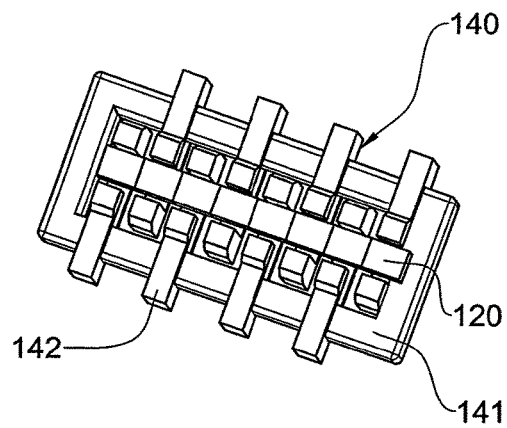
FIG. 3 is a schematic top view of the linear stator shown in FIG. 2.
Figure 4:
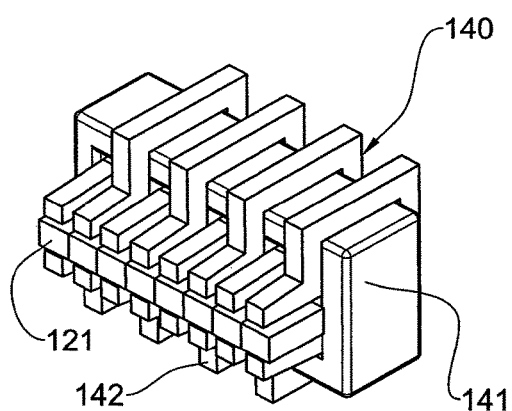
FIG. 4 is a schematic isometric view of the stator shown in FIG. 3.
Figure 5:
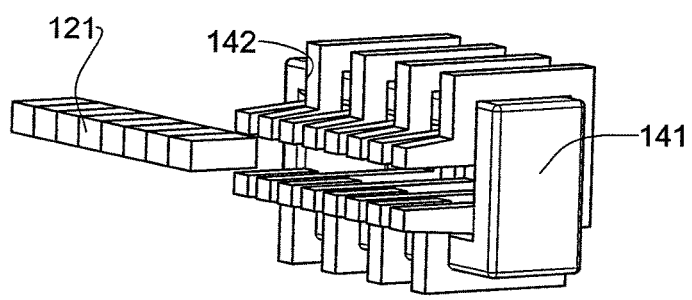
FIG. 5 is a schematic isometric view of the stator shown in FIG. 4, with the permanent magnet being removed.
Figure 6:
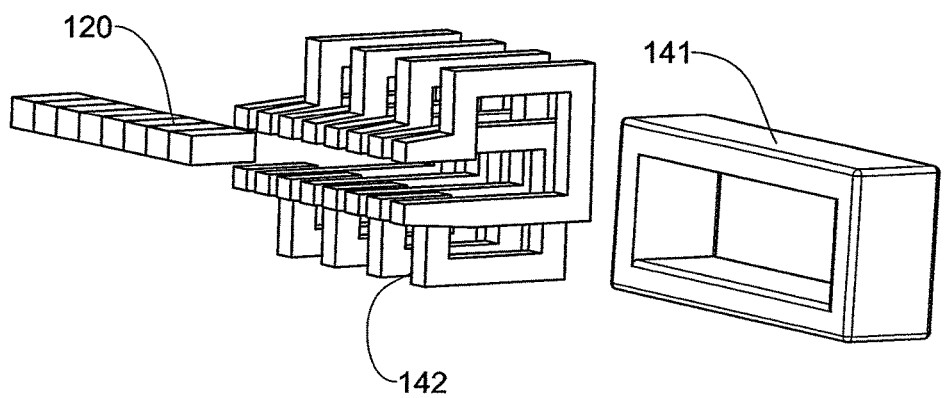
FIG. 6 is a schematic exploded view of the stator shown in FIG. 5.

Let's consider the design of the stator slot 140 using the example of LFPM 100 (FIG. 2). The multipole LFPM 100 comprises a stator 110 and an armature 120, linearly moving relatively to the stator 110 with two air gaps 130 between them. FIG. 2 shows the LFPM 100, in which the stator 110 is implemented as three slots 140, and the armature 120 comprises the alternating polarity permanent magnets 121.

FIGS. 3-6 show the stator slot 140, which contains magnetic conductors 142 and the winding 141. The magnetic conductors 142 are oriented in the plane, which is perpendicular to the linear machine 100 armature 120 travel direction (FIG. 2). The magnetic conductor 142 has a G-type solid design (FIGS. 7-8). It can be made of electrical steel laminations 146, assembled in a stack 143 (FIG. 7), or of the powder soft magnetic material (FIG. 8). FIG. 9 shows the slot 141 winding made by means of winding onto a holder or a form with the subsequent insulating and varnish penetrative treatment.

The section of the pole extension 144 of the magnetic conductor 142 is the magnetic flux concentrator. It is a rectangular triangle (with the obtuse angle), one of whose legs is more than twice bigger than another: $L_{pm} > 2 \times L_2$ (FIGS. 10A, 10B). The obtuse angle of the pole extension 144 is necessary to create the mechanical strength and limit the saturation of this section of the magnetic conductor 142 (FIGS. 10A, 10B).

Figure 11:
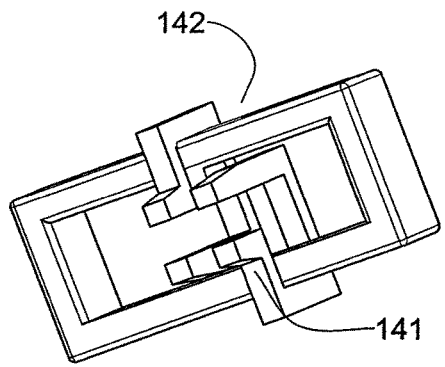
FIGS. 11 and 12 are schematic isometric views of steps of mounting electromagnetic units onto a mutual coil.
Figure 12:
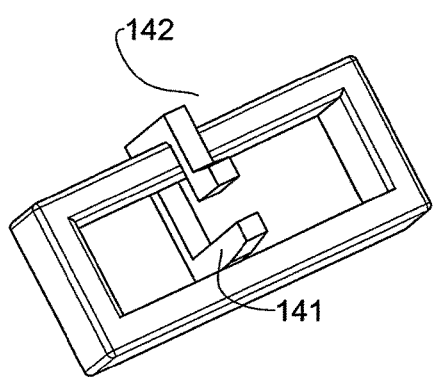
Figure 13A:
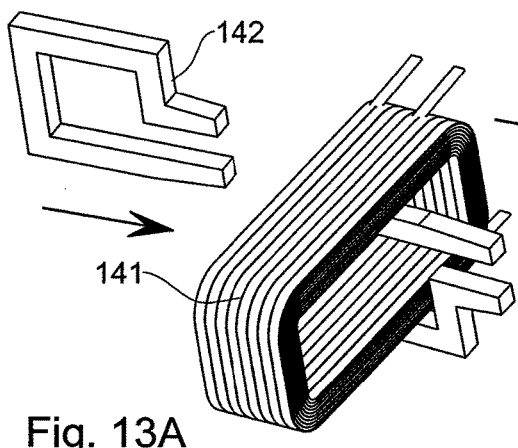
FIGS. 13A to 13D are schematic isometric views showing steps of mounting the electromagnetic units of the stator onto a mutual coil.
Figure 13B:
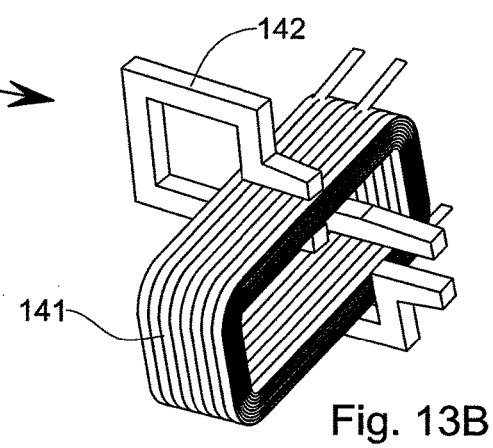
Figure 13C:
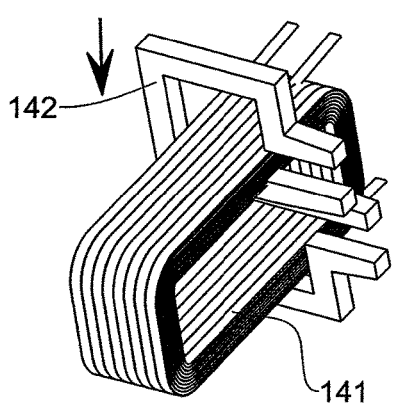
Figure 13D:
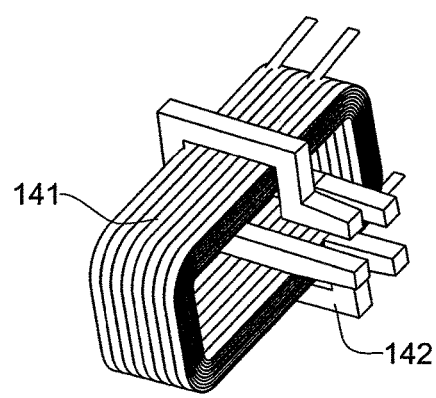

The G-shaped design of the solid magnetic conductor 142 allows installing the magnetic conductors 142 onto the winding 141 during the slot 140 assembling (FIGS. 11-12). The sequence of operations during the slot 140 assembly is shown in FIGS. 13A to 13D. The magnetic conductors 142 are installed and fixed in the fixture on the previously fabricated winding 141 (wounded onto the holder, insulated and treated with varnish) as is shown in FIGS. 13A-13D. The arrow shows the travel direction of the magnetic conductor 142 with respect to the winding 141. The G-shape of the magnetic conductor 142 allows installing it on the winding 141 during the slot 140 assembly in a manner that each neighboring magnetic conductor is installed on the opposite side of the winding 141. Each subsequent magnetic conductor 142 is turned to 180° with respect to the previous one so that the direction of the magnetic flux Φpm generated by the permanent magnets 121 of each the following magnetic conductor 142 located on one side of the winding 141, is opposite with respect to the previous conductor 142 located on the opposite site of the winding 141 (FIGS. 14A-14B).

For the generator operating mode of the electrical machine 100, the flux Φpm closes around the winding 141 wires and, when moving the magnets 121 with respect to the magnetic conductors 142 and the winding 141, it induces a signal in the winding 141 wires, i.e. it generates the electromotive force. When the electrical circuit of the winding 141 is closed, a current I flows through it (FIG. 15). The magnetic flux Φpm transverses the air gap 130 twice.

With particular reference now being drawn to FIGS. 16A to 16D, an electromagnetic unit is shown, generally designated 142, and comprising a neck portion formed with two end extensions E, defining therebetween a slot configured for receiving a portion of the rotor. The slot has a symmetry axis $X_S$.

The electromagnetic unit further comprises a frame F, having a first frame portion F1 extending a distance W1 to the left of the symmetry axis and a second frame portion F2, extending a distance W2<W1 to the right of the symmetry axis. In fact, the second frame portion F2 is a mere extension of the right hand end extension E.

Figure 56A:
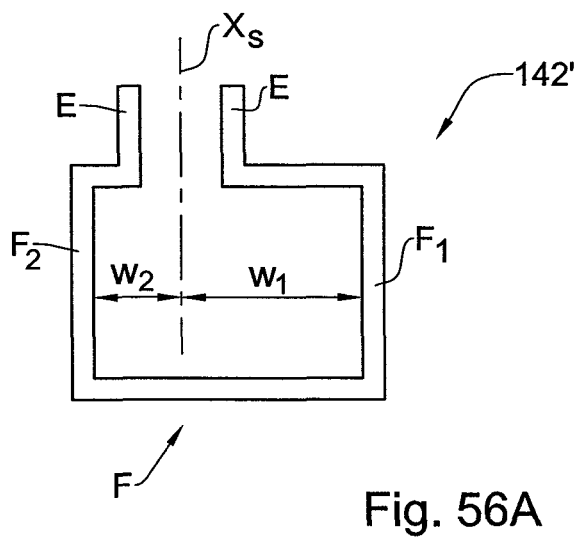
FIGS. 56A and 56B are schematic front views of two additional examples of a G-shaped electromagnetic unit.
Figure 56B:
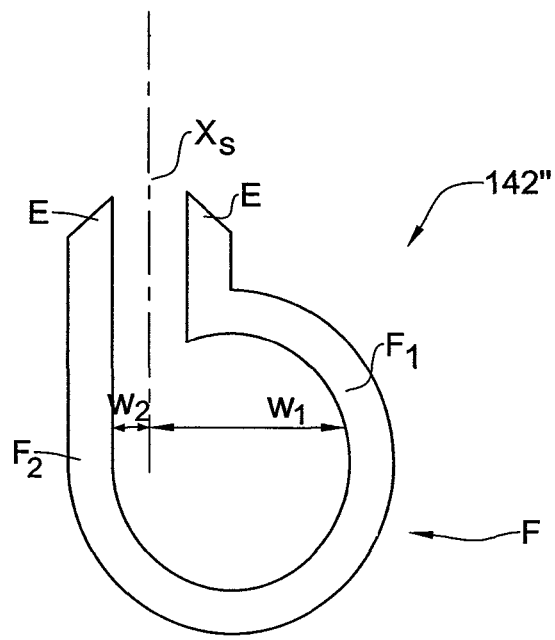

The above described geometric shape of the electromagnetic unit 142 will be referred herein as 'G-shaped'. It should be understood that the term 'G-shaped' includes additional variations of geometries, all presented in FIGS. 56A and 56B.

As will be described in detail further, at least the first frame portion of each electromagnetic unit 142 is configured for receiving therein a portion of the mutual coil of the electrical machine.

Stator

The main problem of the stator 110 structure is ensuring its solid design. I.e. the magnetic conductors 142 shall be firmly fixed and shall reliably withstand the force occurring between the rotor magnets 121 and the pole extensions 144 (also referred herein as 'end extension' E) of the magnetic conductors 142 during the rotor 120 spinning (moving the armature 120) with respect to the stator 110 (FIG. 2). Considering that the G-shaped magnetic conductor 142 represents a rigid metal structure, it is proposed to fix it at least in one of the transverse planes A-A, B-B or C-C, as is shown in FIG. 11. Depending on the size of the magnetic conductor 142, the location option and the number of transverse planes necessary for reliable fixing may be selected.

To fix magnetic conductors 142, the following options are provided for:

1. The slot heat-conducting frame 153 also referred to as "positioning plate" in the present application) (FIGS. 17A-17B) is the base for installing the magnetic conductors 142 and is made of non-magnetic material, for example, of aluminum or its alloys (corresponds to the C-C section). The frame 153 may be made of an epoxy-based heat-conducting compound or a layer of heat-conducting compound may be poured onto the slot aluminum frame 153. The slot frame 153 is fixed to the TFPM 150 outer casing. The aluminum frame 153 ensures heat removal from the winding 147 to the TFPM 150 outer casing.

2. The fixing heat-insulating board 154 (FIGS. 18A-18B) is made of non-magnetic non-electrically conductive material, e.g. kevlar (corresponds to the B-B section). The board 154 ensures fixing of magnetic conductors 142 between each other and with the outer casing 150. It partially protects (insulates from heat) the permanent magnets 121 zone from heat generated by the winding 147.

3. The stator slot 140 may comprise at least one limiting board 155 shown in FIGS. 19A-19B made of non-magnetic and/or non conductive material (corresponds to the A-A section). The board 155 may be installed in any place of the pole extensions 144 of the magnetic conductors 142, for example, as is shown in FIGS. 19A-19B—at the tip of pole extensions 144. The board 155 is fixed to magnetic conductors 142 using the glue. The board 155 may be fixed to the TFPM 150 outer casing.

4. The epoxy-based compound 156, which is poured in the area of pole extensions 144 of the magnetic conductors 142, which corresponds to the A-A section.

Each of the fixing option of the magnetic conductors 142 may be used independently or in any combination with other options considered above (FIGS. 20-23).

Figure 20:
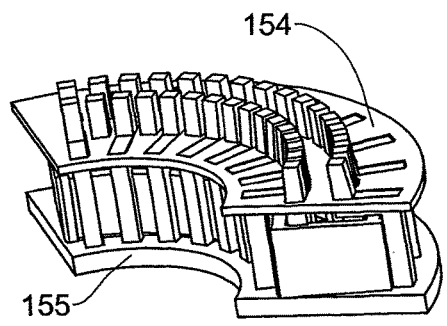
FIGS. 20 to 23 are various schematic isometric views of an assembled stator comprising a plurality of positioning plates.

FIG. 20 shows the option of applying the heat-conducting frame of the slot 153 with the fixing heat-insulating board 154.

Figure 21:
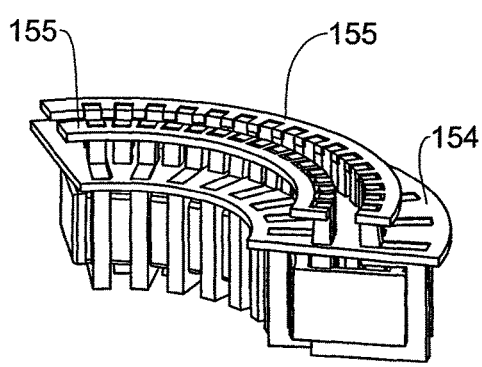

FIG. 21 demonstrates the option of applying the fixing heat-insulating board 154 with the limiting boards 155.

Figure 22:
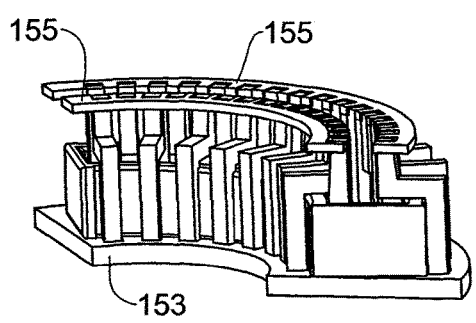

FIG. 22 shows the option of applying the heat-conducting frame of the slot 153 with the limiting boards 155.

Figure 23:
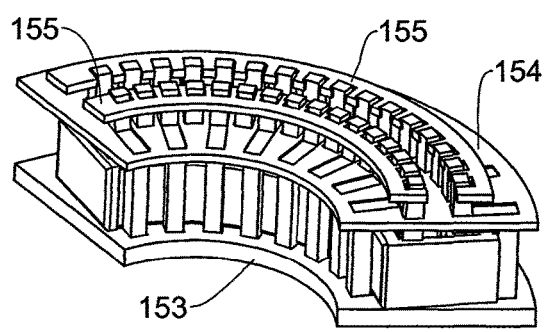

FIG. 23 shows the option of applying the heat-conducting frame of the slot 153 with the fixing heat-insulating board 154 and the limiting boards 155.

The assembly method of the stator 110 includes the slot 140 assembly:

1. Making of the magnet conductors 142 by means of assembling the pressed laminations 146 into the stack 143 or pressing the powder and forming of the solid magnetic conductor 142.
2. Making the winding 141 by means of winding onto the holder or a frame with the subsequent insulating and varnish penetrative treatment.
3. Installation of the magnetic conductors 142 onto the winding 141 as is shown in FIGS. 13A-13D.
4. The installation and attaching to a fixture with the glue of a passive part 145 of the magnetic conductors 142 to the slot frame 153.
5. Fixing with glue the winding 141 onto the magnetic conductors 142.
6. The pole extensions 144 of the magnetic conductors 142 are fixed between each other in a special fixture (various options may be adopted for magnetic conductors 142 fixing as described above).

After that, the assembled slots 140 are installed and fixed to the external body 150, for example, to the end shields 151 of the electrical machine 100.

The peculiarity of the slot 140 assembly technology is that the magnetic conductors 142 made previously are installed onto the ready winding 141 with their subsequent fixing with each other thus forming the slot 140.

Rotor (Armature)

Figure 24A:
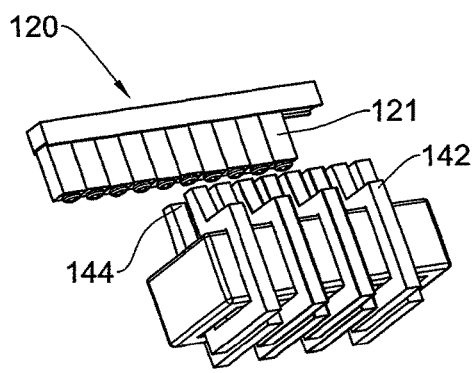
FIGS. 24A and 24B are schematic isometric exploded views of the stator with a linear permanent magnet.
Figure 24B:
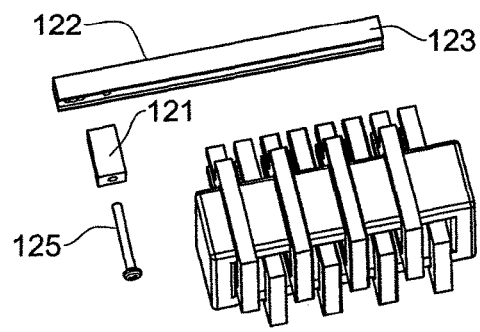
Figure 25:
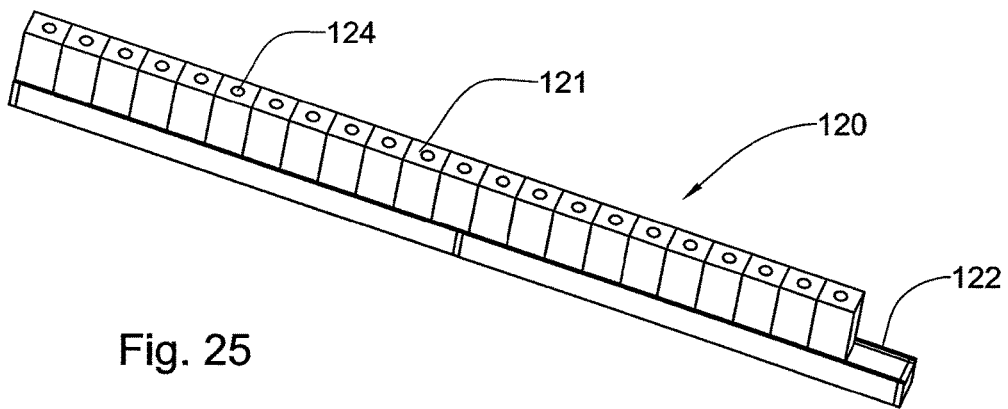
Figure 26:
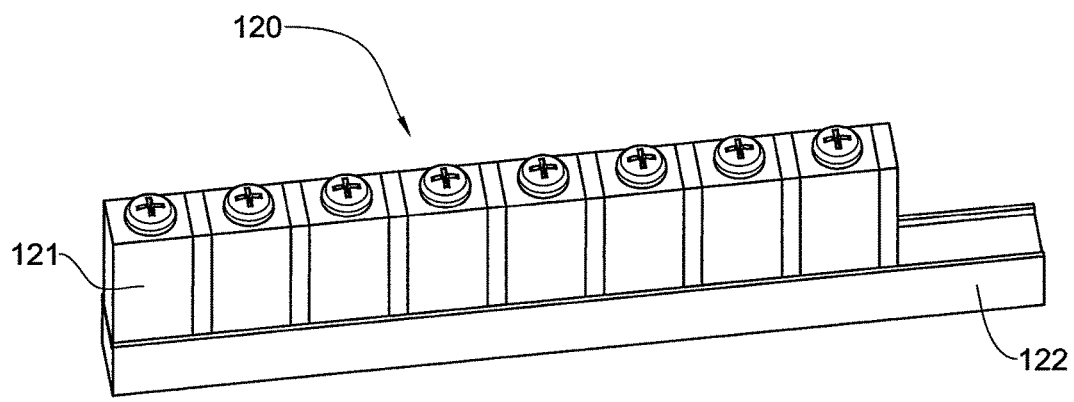

FIGS. 24-26 show the LFPM armature 120. Soft magnetic materials are absent in the armature 120 within the area of magnets 121 location. Both poles of each armature magnet 121 are embraced with the pole extensions 144 of the corresponding magnetic conductor 142 (FIG. 2).

The armature permanent magnets 121 are fixed to the base 122 with their lateral surface, on the opposite side of the magnetic conductors 142. The armature base 122 is made of non-magnetic material. The groove 123 is provided on the base 122 of the armature, at least one hole 124 (FIG. 27) is located in the lateral surface of the magnet 121, the screw connection 125 is employed.

Figure 27A:
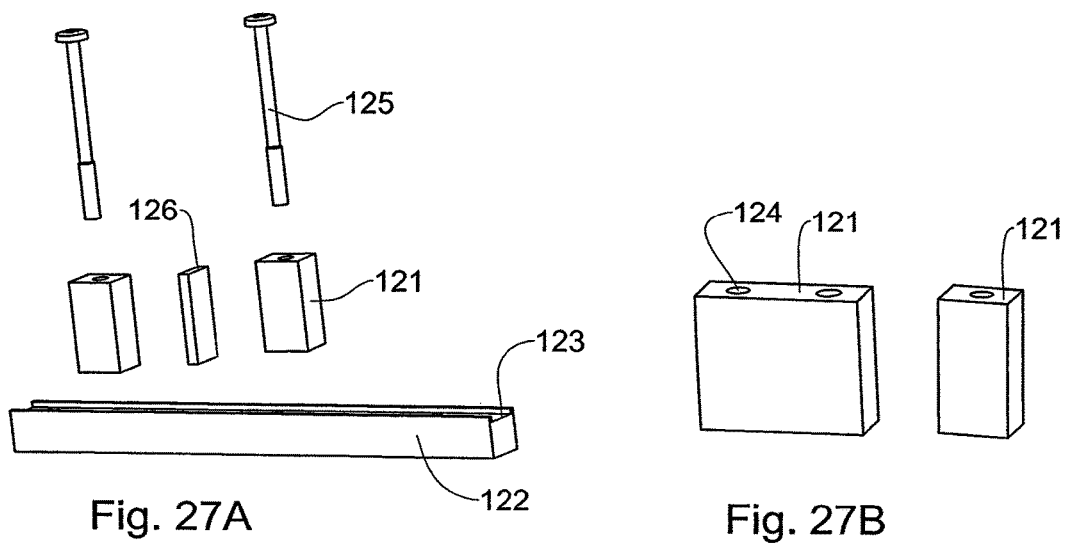
Figure 27B:
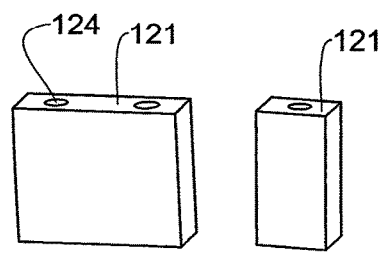

The magnets 121 on the armature 120 are fixed with the glue. FIG. 25 shows the armature 120 design option using the magnets 121 with no gaps, and FIG. 26 demonstrates the option with nonmagnetic inserts 126. FIG. 27 shows the armature base 122 with the groove 123 for the magnets 121, the magnets 121 with the holes 124, nonmagnetic inserts 126 and the screws 125. The location of the hole 124 on the lateral surface of the magnets 121 (FIG. 28) does not result in the losses of the working magnetic flux Φpm, as in case of the hole 124 location on the magnet 121 pole, which is applied for the known conventional RFPM 100 (FIG. 29) design.

The rotor (armature) 120 of electrical machine is provided with a fan 170 which is installed under the screws 125 fixing the permanent magnets 121 (FIGS. 30-33). The fan 170 is made of nonmagnetic material in the form of an impeller.

The impeller 170 may be made as separate elements 171 (FIG. 30) or as inserts 126 between magnets 121 (FIG. 31) or as a bladed strip 172 (FIGS. 32A-32B), or as a bladed ring 173 (FIG. 33). For the large-size electrical machines 100, the strip 172 and the ring 173 may be composed of several parts.

The fan 170 improves fixing of the magnets 121 to the rotor (armature) base 122 and ensures thermal convection.

Structure of the Electrical Machine

To ensure the installation of the solid magnetic conductors onto the winding, the width Lc and the height hc of the winding (FIG. 9) are limited with the relations (FIGS. 10A, 10B):

$$hc < Ls - 3 \times L_2 - hpm - 2 \times ho \quad [1]$$

$$Lc < La - Lpm - L_2 \quad [2]$$

To combine signals directed in the slot winding by each magnetic conductor, the following conditions shall be met (FIGS. 10A, 10B:

1. The number of the slot s (s=2, 3, 4 . . . ) magnetic conductors shall be equal to the doubled number of the pole pairs of the machine moving part 2ps, located inside the slot:

$$s = 2ps, \quad [3]$$

2. The pole pitch τp is equal to the slot pitch τs:

$$\tau p = \tau s \quad [4]$$

3. The pole pitch τp is equal to the sum of the magnet width Xpm and the distance between the neighboring magnets Δpm:

$$\tau p = Xpm + \Delta pm \quad [5]$$

4. The pole pitch τs is equal to the sum of the magnetic conductor width Xem and the distance between the neighboring magnetic conductors Cem:

$$\tau s = Xem + Cem, \text{ i.e.} \quad [6]$$

$$\tau p = \tau s = Xpm + \Delta pm = Xem + Cem \quad [7]$$

If each phase TFPM contains t slots, where t=1, 2, 3 . . . , for the signals to combine in a phase, the distance between the slots Xs is multiple of the pole pitch τp:

$$Xs = \tau p \times n, \text{ where } n = 1, 2, 3 \ldots \quad [8]$$

The value n is selected to be sufficient to locate two neighboring bending parts of the slot windings.

TFPM may have multiphase design. For example, for the for the three-phase TFPM, to shift the signals of each phase to 120°—the distance between the Xph phases:

$$Xph = \frac{1}{3} \times \tau p \times m, \quad [9]$$

where m=1, 2, 4, 5, 7, 8, 10 . . . (i.e. the positive integer non-divisible by 3) The value m is selected to be sufficient to locate two neighboring bending parts of the slot windings.

For a three-phased TFPM, the low cogging torque ripple value is ensured by an additional relation:

$$Cem = \frac{Xem}{1.3 - 1.8} \quad [10]$$

A low cogging torque ripple value is ensured by the relations [9] and [10], i.e. the selection of the distance between the phases, the selection of the magnetic conductor width and the distance between the conductors. In this case, the parasite torque ripples are compensated as a result of summation of ripples of all of the phases.

LFPM

The proposed transverse flux linear permanent magnet machine (LFPM) 100 was built using the principles considered before.

Figure 35B:
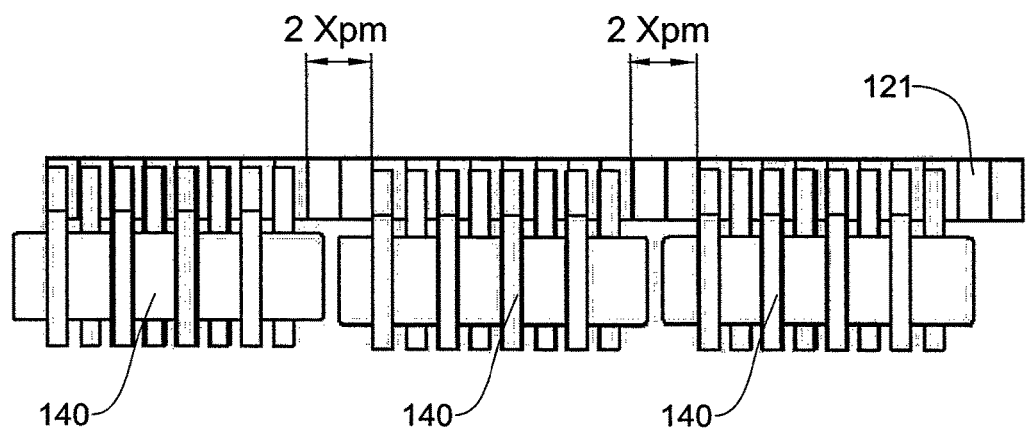

FIGS. 34-35B give an example, where the LFPM 100 phase contains three slots 140 (t=3), each slot 140 contains 8 magnets 121 (ps=8) and 8 magnetic conductors 142 (s=8), and the distance Xs between the slots 140 of the phase: Xs=τp×n=2Xpm (τp=Xpm, n=2).

Figure 36:
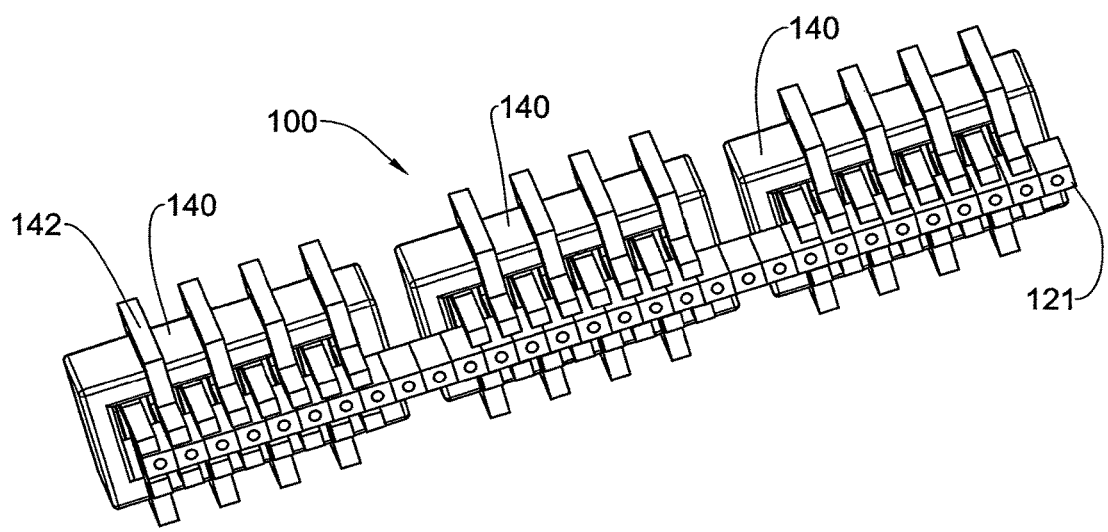
FIG. 36 is a schematic isometric view of the portion of the electrical machine shown in FIG. 34, when the linear permanent magnet is displaced.
Figure 37A:
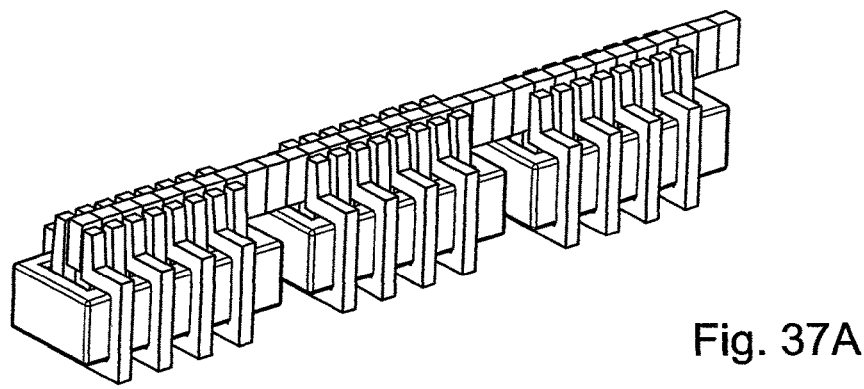
FIGS. 37A and 37B are schematic isometric and side views of the portion shown in FIG. 36.
Figure 37B:
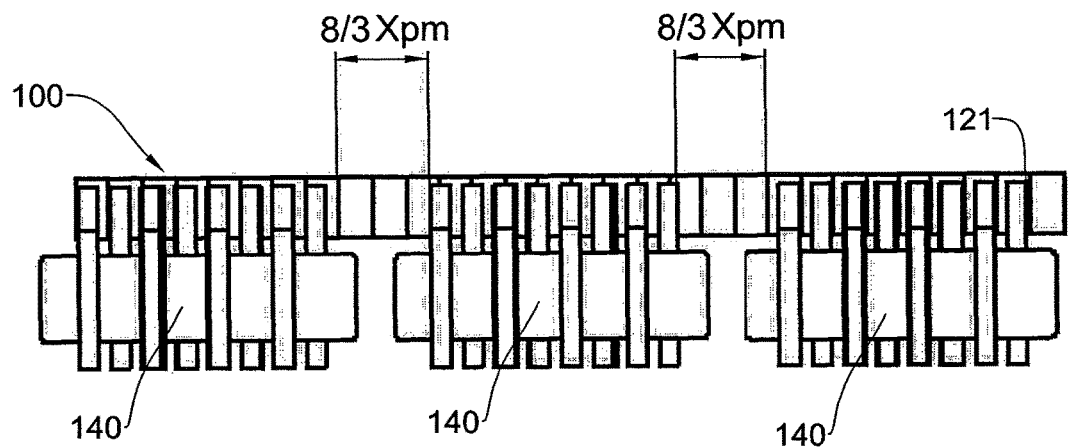

FIGS. 36-37B show an example, where each phase of the three-phased LFPM 100 contains one slot 140 and the distance Xph between the phases: Xph=⅓×τp×m=8/3 Xpm, (m=8).

Figure 38:
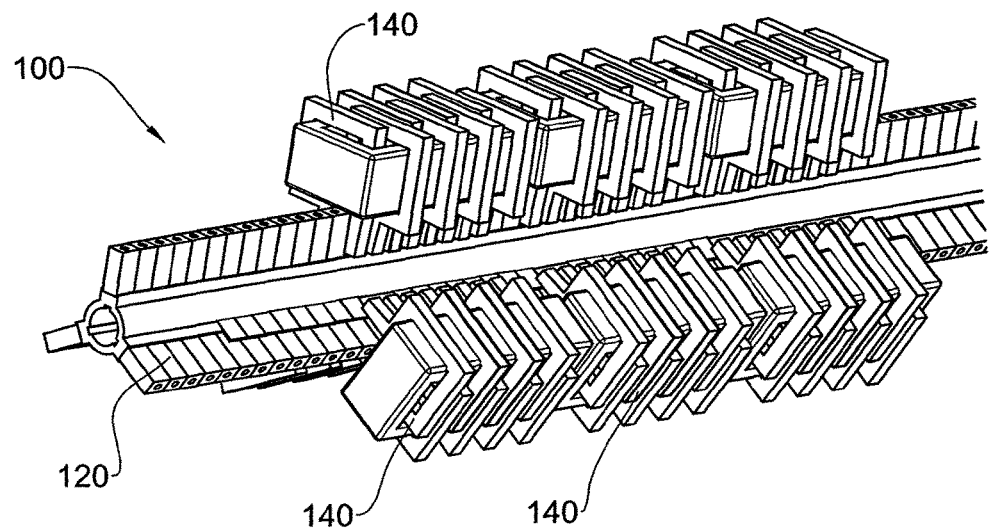
FIG. 38 is a schematic isometric view of another example of a linear configuration of the electrical machine.
Figure 39:
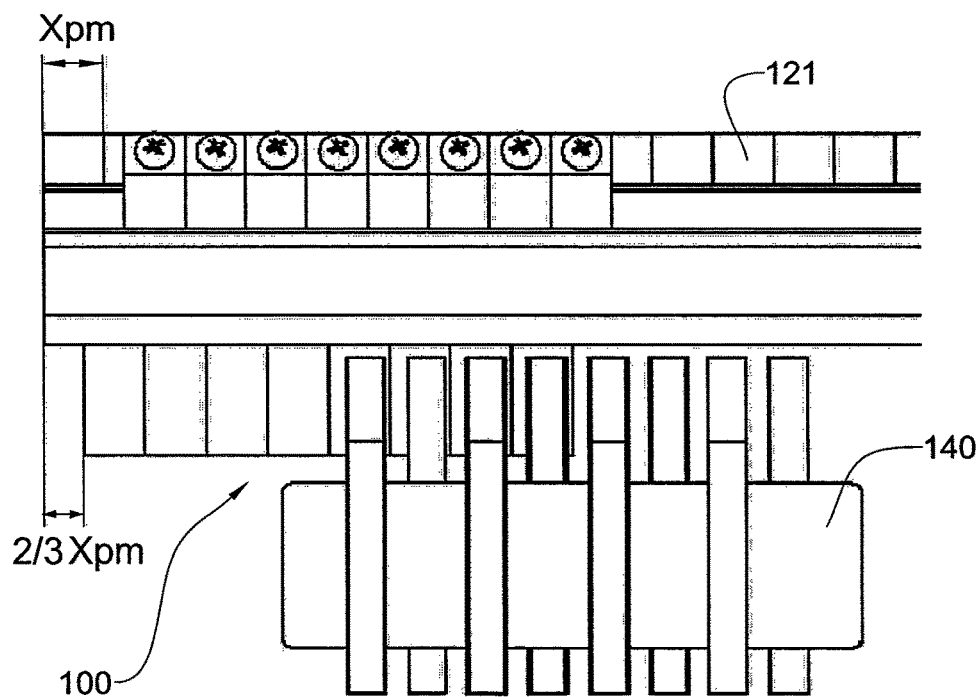
FIG. 39 is a schematic side view of the machine shown in FIG. 38.

FIGS. 38-39 give an example of the three-phased LFPM 100, when each phase contains three slots 140 in line, and the phases have the circumferential location pattern. Furthermore, the distance between the phases Xph along the armature 120 travel direction: Xph=⅓×τp×m=⅔Xpm, (m=2), and the distance Xs between the slots 140 in one phase along the armature 120 travel direction: Xs=τp×n=2Xpm (τp=Xpm, n=2).

Figure 40:
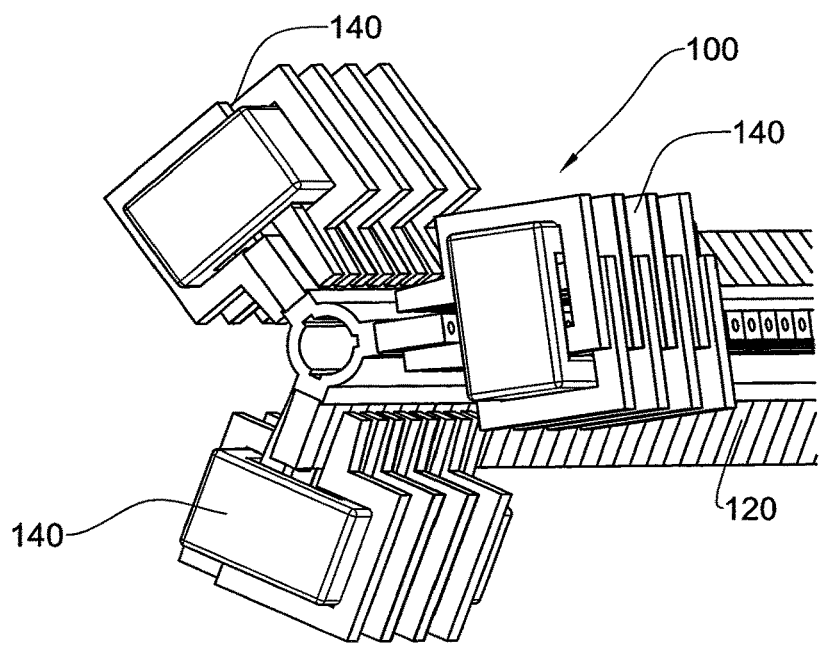
FIG. 40 is a schematic front isometric view of the electrical machine shown in FIG. 38.

FIG. 40 shows an example of the three-phased LFPM 100, where each phase contains one slot 140, with the circumferential position of the phases and the distance Xph between phases along the armature 120 travel: Xph=⅓×τp×m=⅔Xpm, (m=2).

Figure 41:
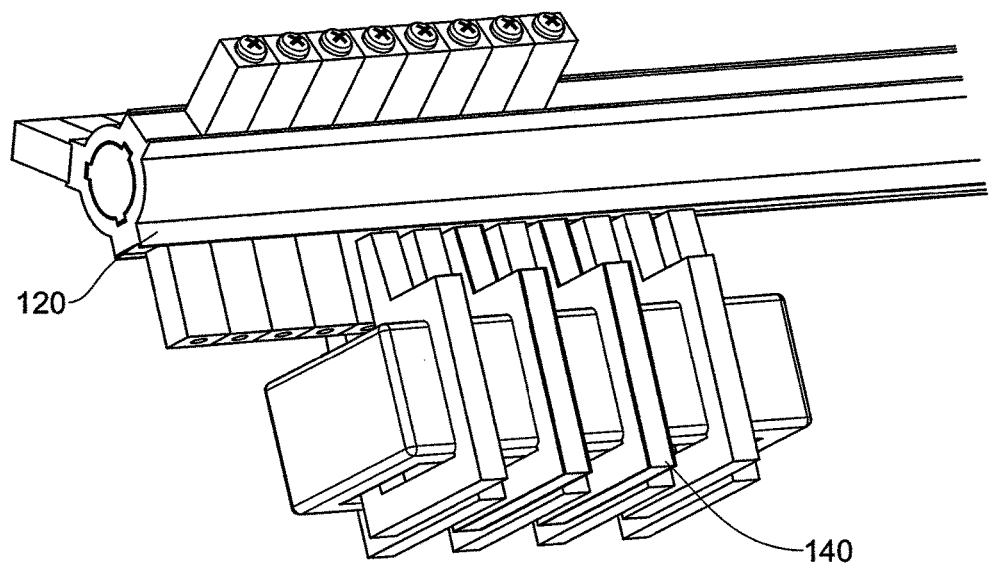
FIG. 41 is a schematic front isometric view of the electrical machine shown in FIG. 38, with a portion thereof being removed for clarity.
Figure 42:
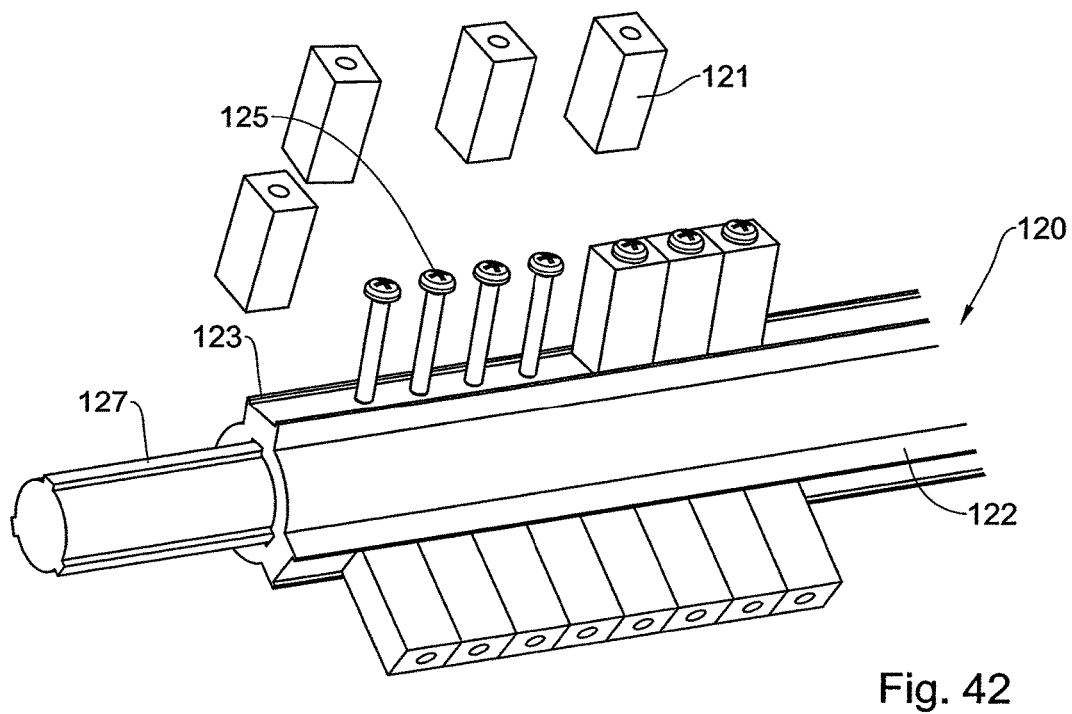
FIG. 42 is a schematic partial exploded view of a permanent magnet used in the electrical machine shown in FIG. 38.
Figure 44A:
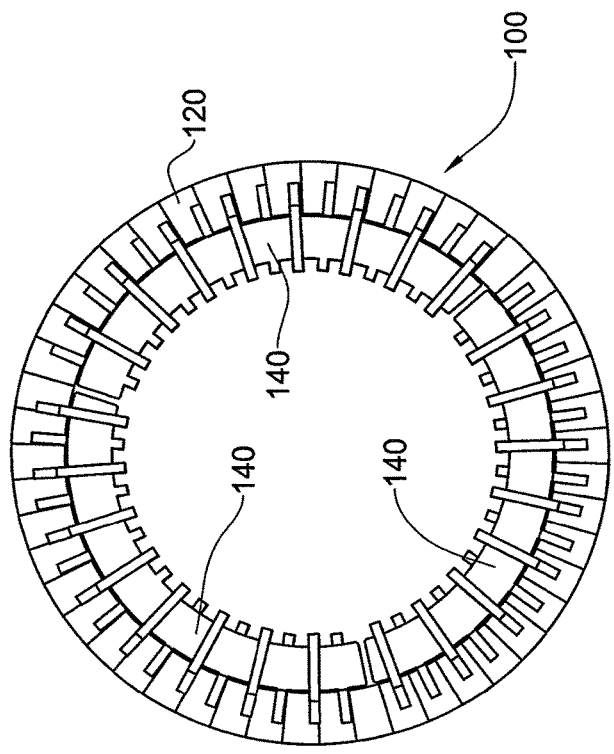
FIGS. 44A to 44B are schematic isometric views of a rotor used in the electrical machine shown in FIGS. 43A-43D.
Figure 44B:
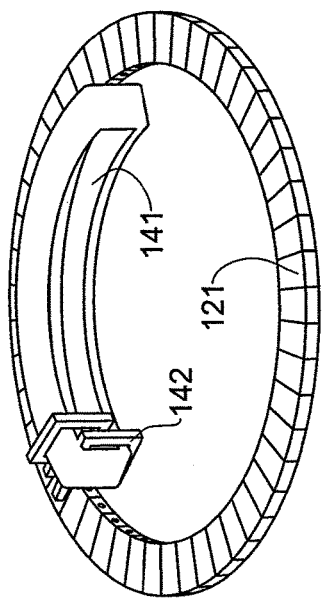
Figure 44C:
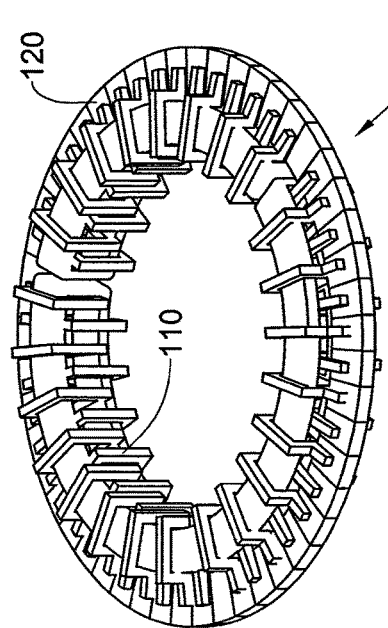
Figure 44D:
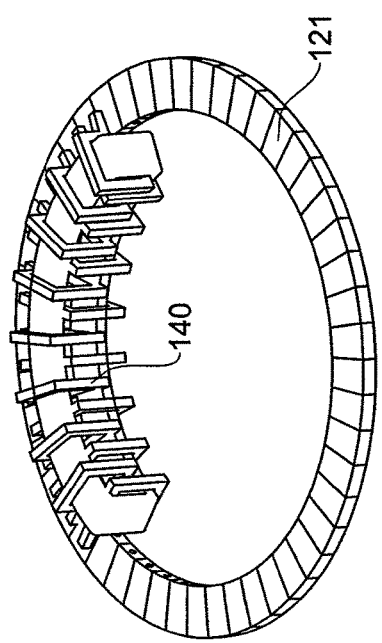

FIG. 41-42 show the method of fixing the magnets 121 with the screw connection 125 to the armature base 122, where the grooves 123 are provided for. There is given an example of the armature base 122 implementation as a hollow cylinder with the guides and the stem 127, where the armature 120 travels.

AFPM

The proposed axial flux permanent magnet machine (AFPM) 100 was built on the same principles as the linear one considered before. The magnetic conductors 142 are oriented in the plane going through the shaft 160 axis.

FIGS. 43A-43D show the example of a three-phased AFPM 100 design with the internal rotor 120.

FIGS. 44A-44D show the example of a three-phased AFPM 100 design with the external rotor 120.

The parameters of the represented AFPM 100 design options with the internal and external rotor 120: the number of pole pairs p=26 (i.e. the number of magnets 121 on the rotor 120 2p=52); the number of the magnetic conductors 142 of the slot s=16; the machine has a three-phased design, each phase has one slot 140 t=1; there are no gaps between the rotor magnets 121 Δpm=0, and the distance Xph between phases: Xph=4/3Xpm (FIG. 45).

RFPM

The proposed radial flux permanent magnet machine (RFPM) 100 was built on the same principles as the axial-flow, linear ones considered before. The surfaces of permanent magnets 121 and the surfaces of the magnetic conductors 142 pole extensions 144 facing them are implemented with the corresponding radii. The magnetic conductors 142 are oriented in the plane going through the shaft 160 axis.

FIGS. 46A-46F show another example of three-phased RFPM 100 design.

Figure 47:
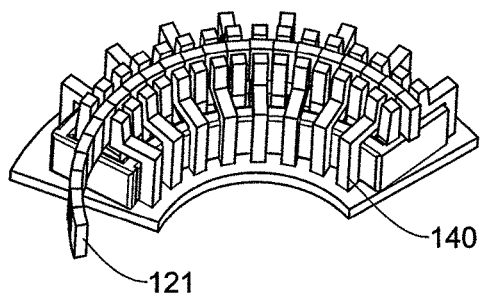
FIG. 47 is a schematic top view of the electrical machine shown in FIGS. 46A and 46B.
Figure 47:
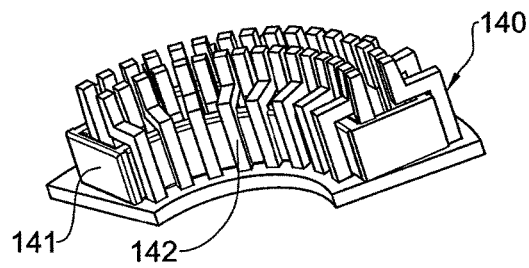
Figure 47:
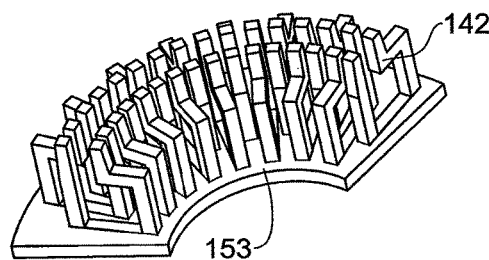
Figure 47:
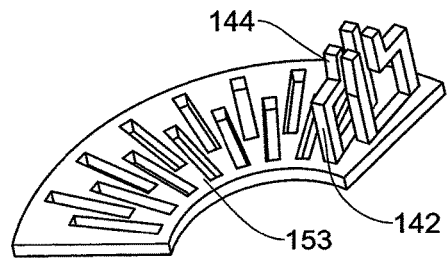
Figure 47:
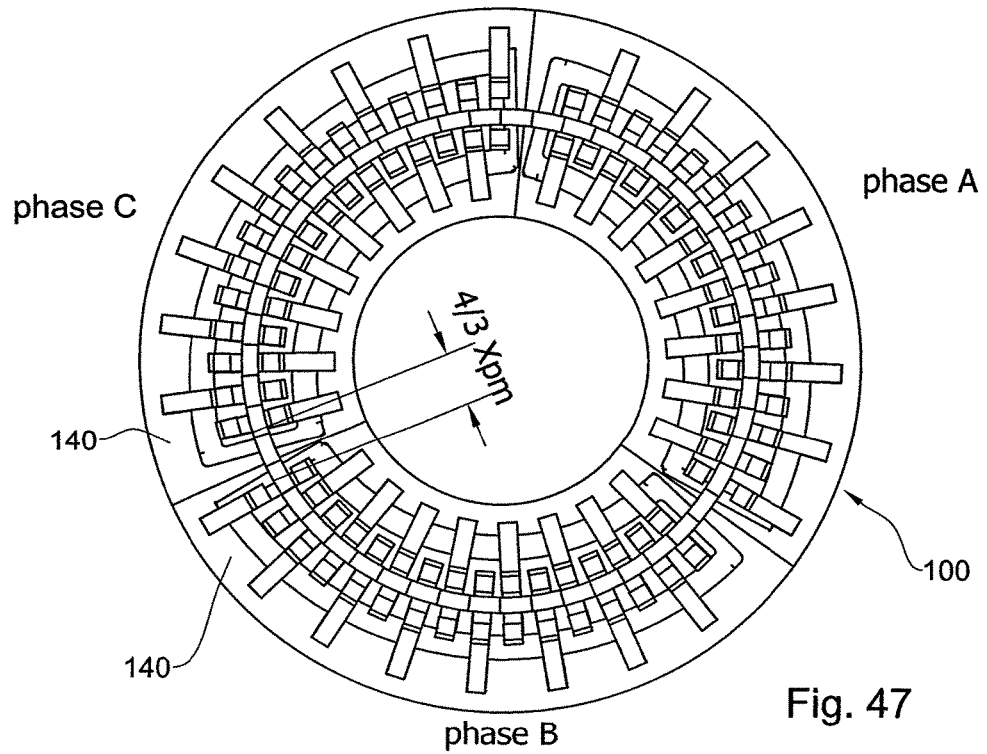

The parameters of the represented RFPM 100 design option: the number of pole pairs p=26; the number of the magnetic conductors 142 of the slot s=16; the machine has a three-phased design, each phase has one slot 140 t=1; there are no gaps between the rotor magnets 121 Δpm=0, and the distance Xph between phases: Xph=4/3Xpm (FIG. 47).

Figure 48:
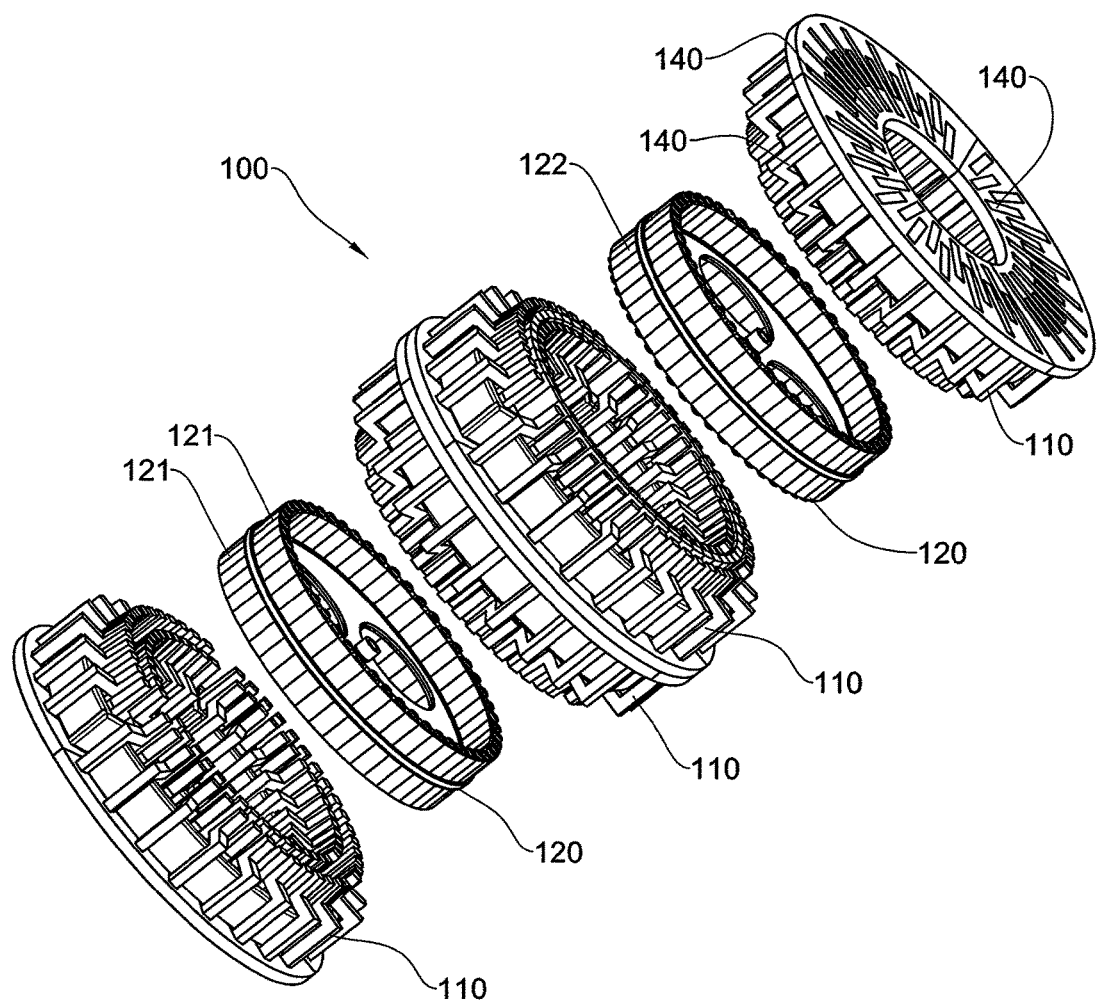
FIG. 48 is a schematic exploded view of the electrical machine.
Figure 49A:
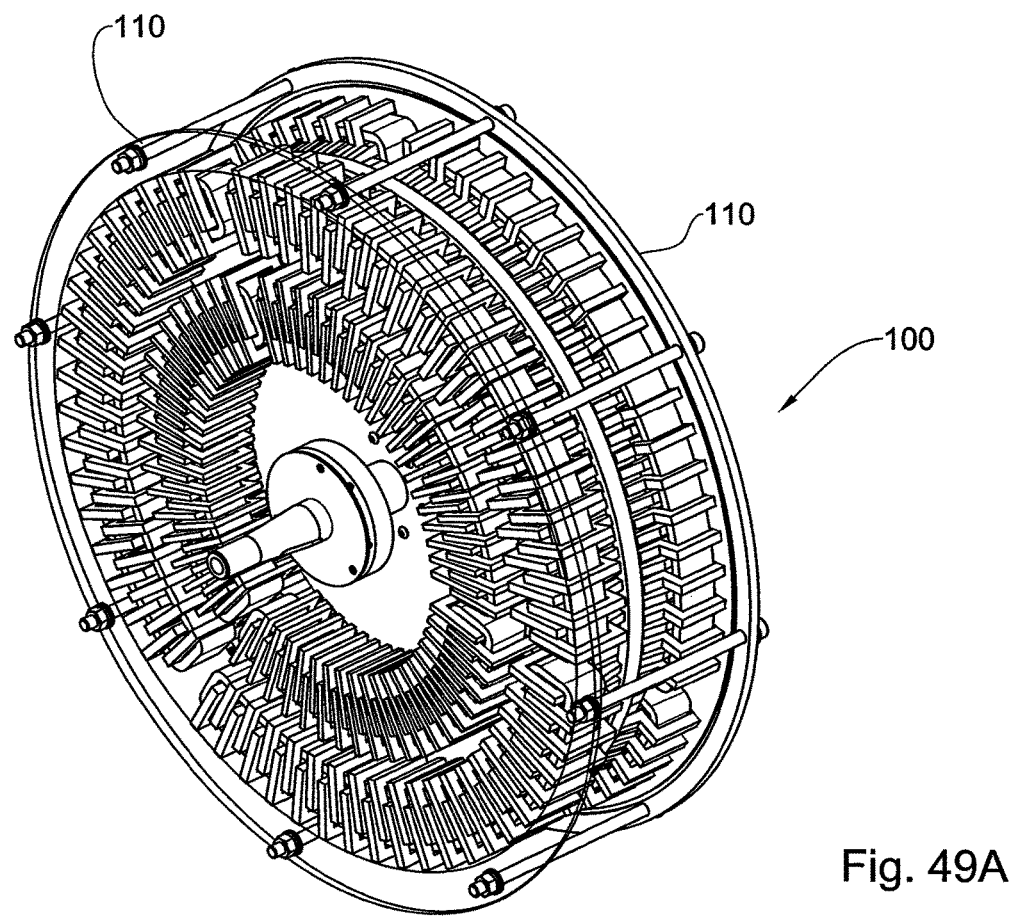
FIGS. 49A and 49B are schematic isometric and side views of the electrical machine shown in FIG. 48.
Figure 49B:
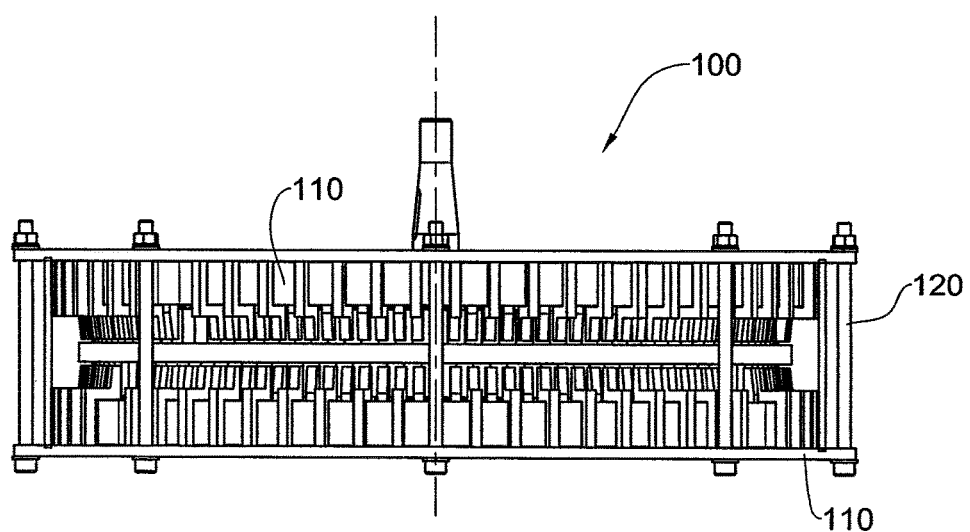
Figure 51A:
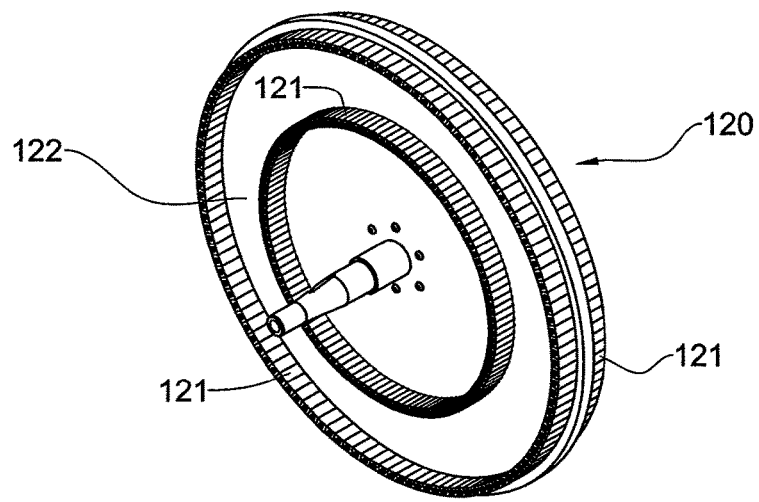
FIGS. 51A to 51C are schematic isometric, front and side views of a second sub-assembly of the electrical machine shown in FIG. 48.
Figure 51B:
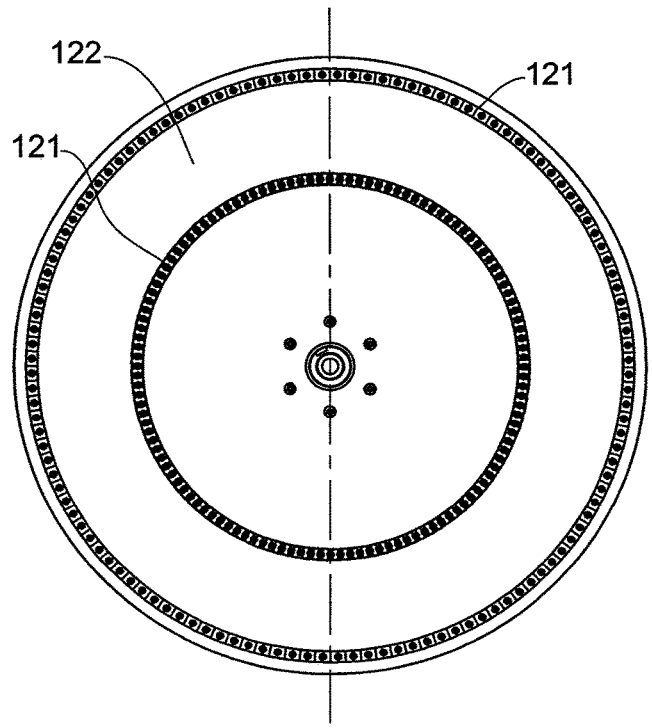
Figure 51C:
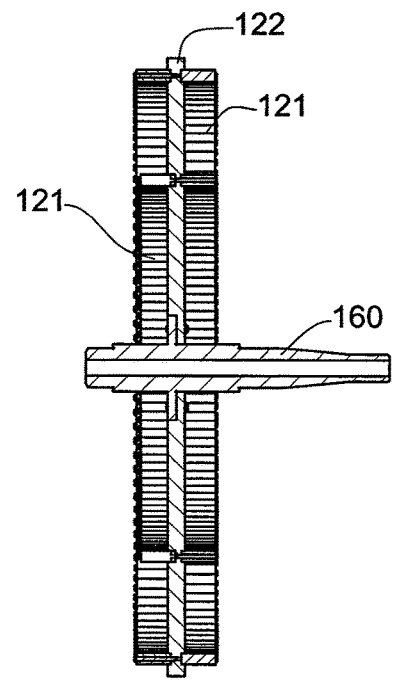

FIG. 48 shows an example of the three-phased four-section RFPM 100 design. Each of four similar sections of the stator 110 is implemented as three phases (slots 140) with the circumferential location pattern. The rotor 120 comprises two sections, each of them containing two groups of magnets 121 fixed on both sides on two bases of the rotor 122.

FIGS. 49-51C show an example of the double-layer and double-section three-phased RFPM 100 design. Each of two similar sections of the stator 110 (FIGS. 50A-50C) is implemented as the end shield 151, where two concentric layers of the slots 140 are fixed. The external and the internal layers comprise three slots 140 thus forming the phases A, B and C. The rotor 120 (FIGS. 51A-51C) contains two rings of the magnets 121 (the external and the internal one), fixed on two sides on the base of the rotor 122.

RFPM with the Circumferentially Distributed Winding (an AFPM with the External and the Internal Rotor May be Implemented in a Similar Manner)

FIGS. 52A-54C give an example of the one-phased RFPM 100 design, whose stator 110 contains the circumferentially distributed concentric windings 141.

The stator 110 (FIGS. 53A-53D) is the slot 140 comprising the G-shaped solid magnetic conductors 142 and two windings 141. If the first magnetic conductor 142 embraces one of the windings 141, then each of the following conductors 142 rotated to 180° shall embrace the other winding 141. The magnetic conductors 142 are installed on the heat-conducting frame of the slot 153.

The rotor 120 (FIGS. 54A-54C) contains the magnets 121 fixed on the rotor 122 base. The magnets 121 are fixed in the groove 123 of the rotor 122 base with the screws 125.

Three-Section RFPM with the Circumferentially Distributed Winding

FIG. 55 shows an example of a three-section three-phased RFPM 100 design with the circumferentially distributed windings 141.

Figure 52A:
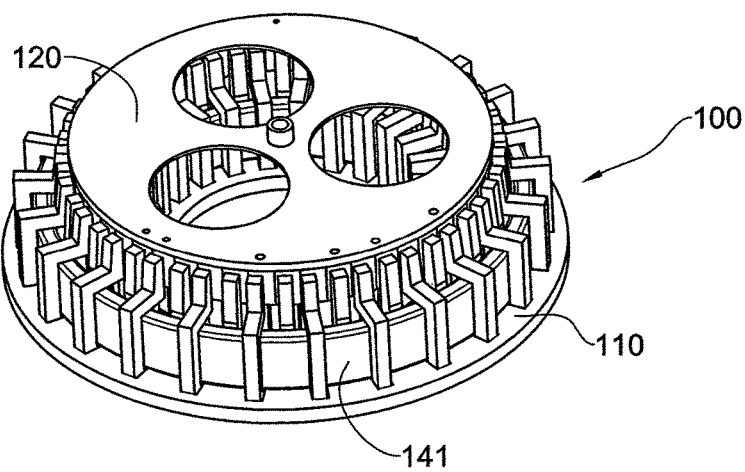
FIGS. 52A to 52C are schematic isometric, front and side views of a third sub-assembly of the electrical machine shown in FIG. 48.
Figure 52B:
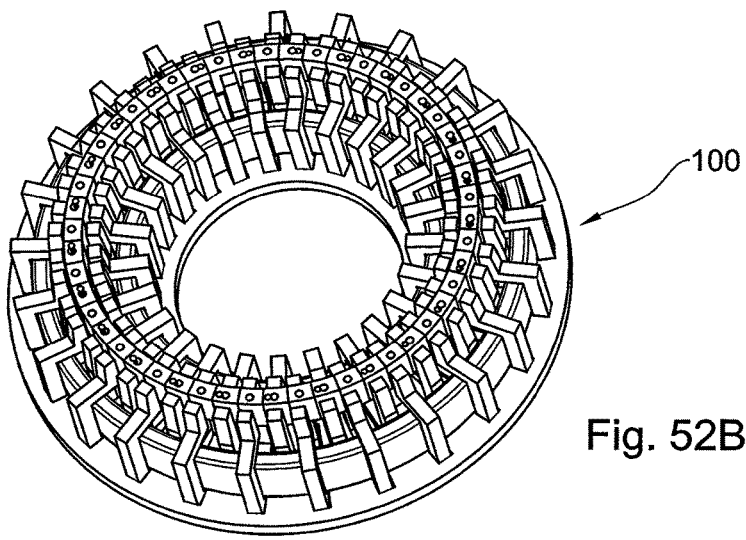
Figure 52C:
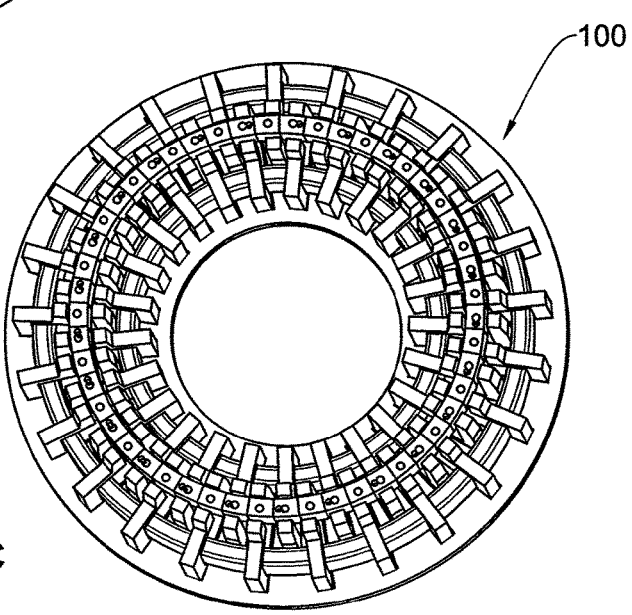

Each of three similar sections of the stator 110 is implemented as the slot 140 shown in FIGS. 52-53. Each of the stator 110 sections is the RFPM 100 phase. To shift the signals of each phase to 120°—the distance between the Xph phases:

$$Xph=⅓×τp×m, \quad [9]$$

where m=1, 2, 4, 5, 7, 8, 10 . . . (i.e. the positive integer non-divisible by 3) Each section is shifted relative to the previous one to the distance Xph.

Figure 54A:
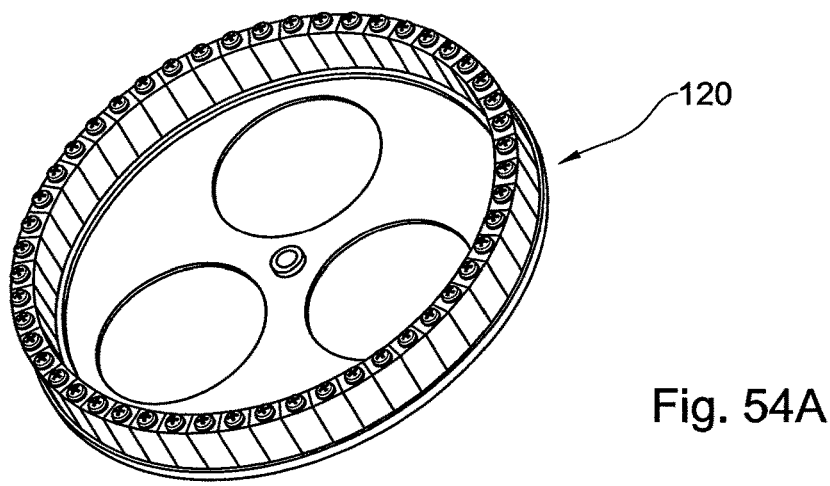
FIGS. 54A to 54C are schematic isometric views of a rotor sub-assembly of the electrical machine shown in FIG. 48.
Figure 54B:
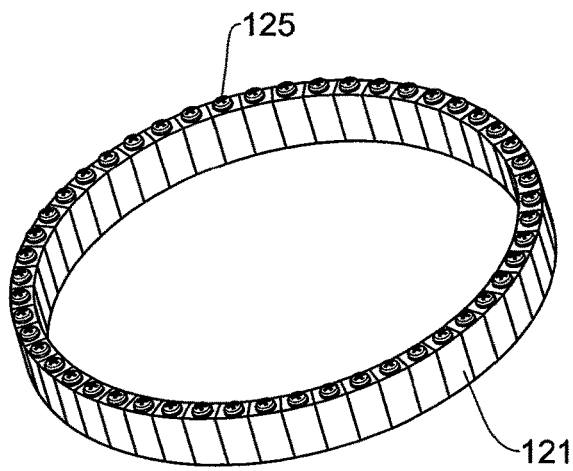
Figure 54C:
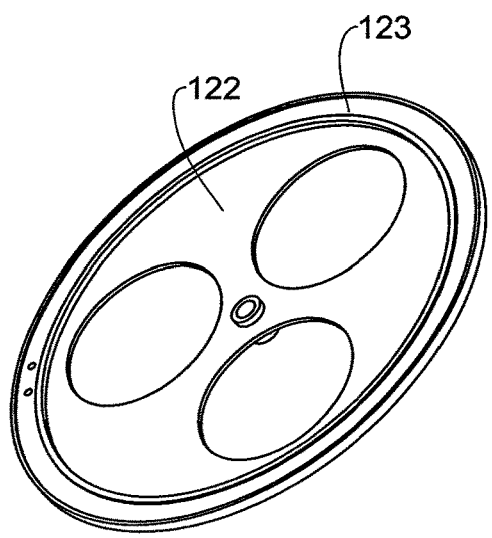

The rotor 120 comprises two sections, one of which includes two rings of the magnets 121 fixed on two sides on the rotor 122 base, and another is implemented in the same way as is shown in FIGS. 54A-54C.

Turning now to FIGS. 57 to 96, another example of an electrical machine will be discussed, also having at least one mutual coil, with the only difference lying in the design of the electromagnetic units. Specifically, whereas the previous example dealt with G-shaped electromagnetic units, the electrical machine of the present example employs U-shaped electromagnetic units.

Figure 57:
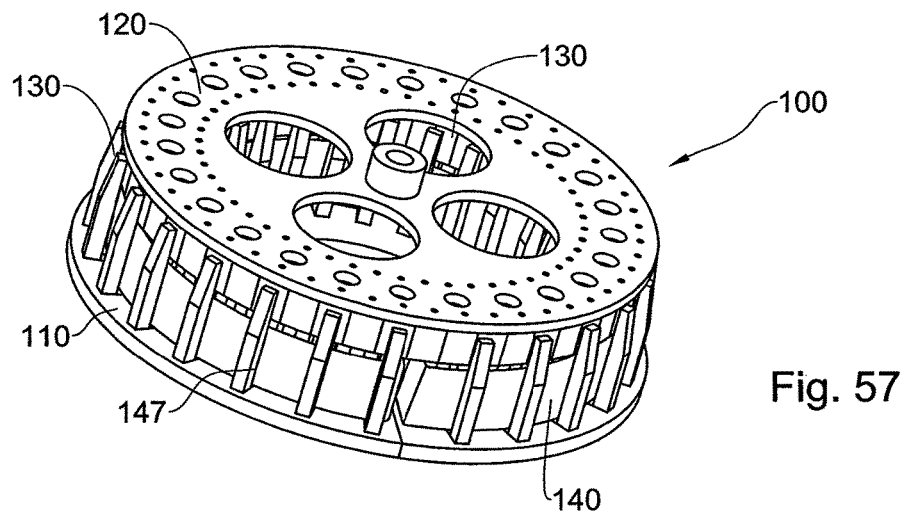
FIG. 57 is a schematic isometric view of a portion of an electrical machine according to another example of the present application.

The multipole electrical machine 100 comprises stator 110 and rotor 120, which moves (rotates) relative to the stator 110 with an air gap 130 between them (FIG. 57). The stator 110 is assembled of the slots 140. Using the concept of the slot 140 as the basic Lego component, various TFPM types can be assembled: linear permanent magnet machines (LFPM), axial (AFPM) and radial (RFPM) magnetic flux permanent magnet machines.

Stator Slot

Figure 58:
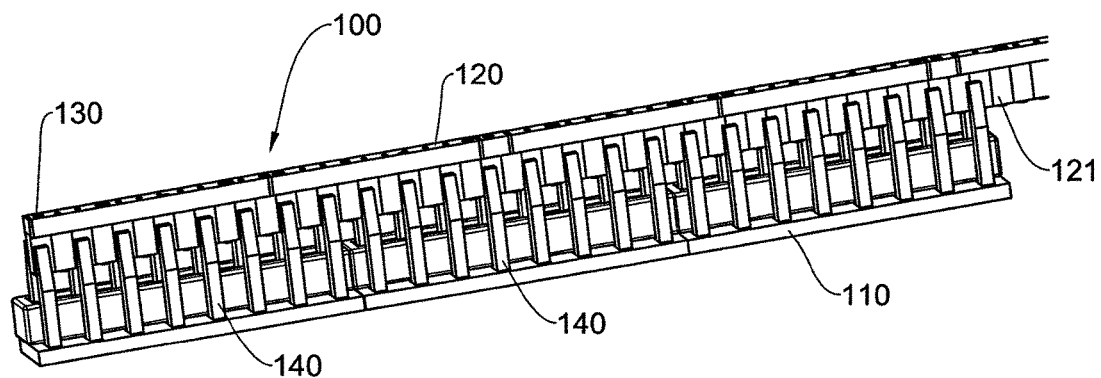
FIG. 58 is a schematic linear version of the electrical machine shown in FIG. 57.
Figure 59A:
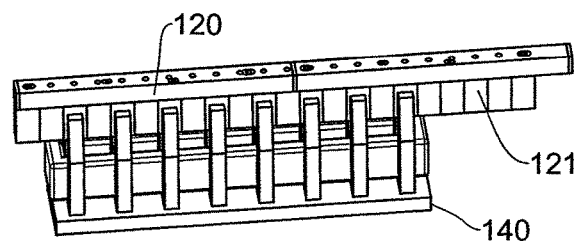
FIGS. 59A to 59C are schematic isometric views of a portion of the electrical machine shown in FIG. 58, shown during various assembly stages thereof.
Figure 59B:
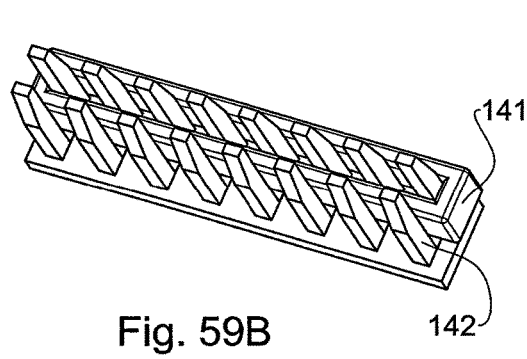
Figure 59C:
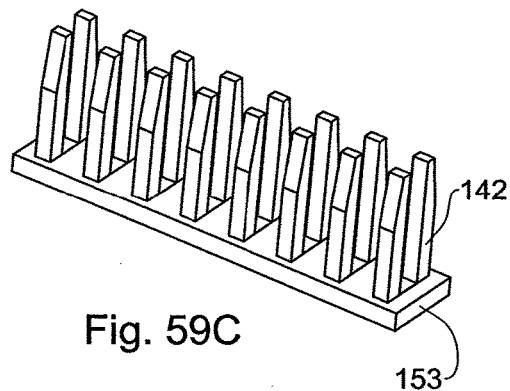
Figure 59D:
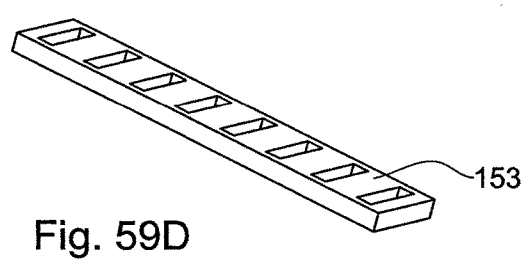
Figure 60A:
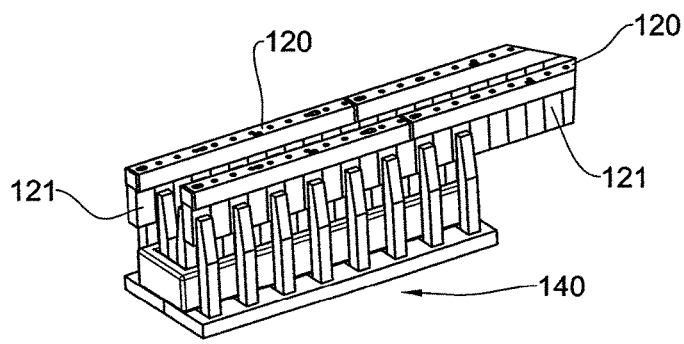
FIGS. 60A to 60D are schematic isometric views of another example of an electrical machine, shown during various assembly stages thereof.
Figure 60B:
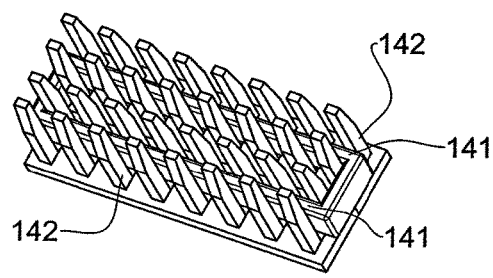
Figure 60C:
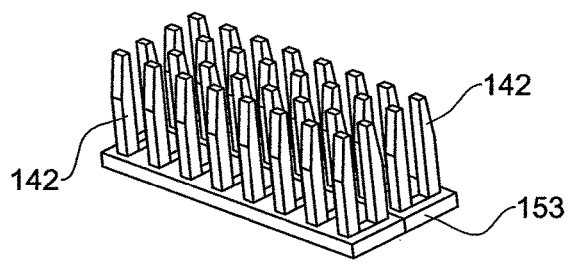
Figure 60D:
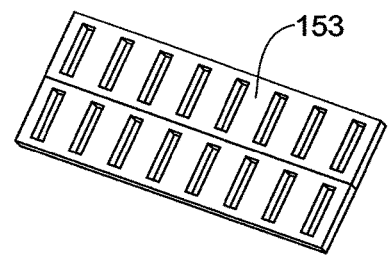
Figure 61A:
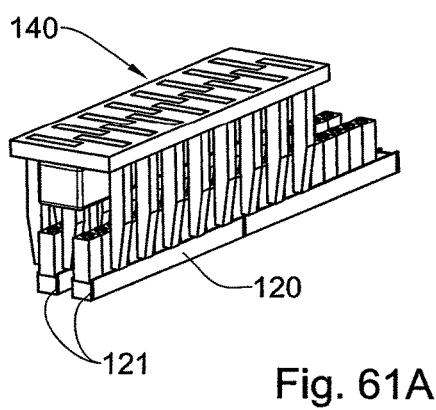
Figure 61B:
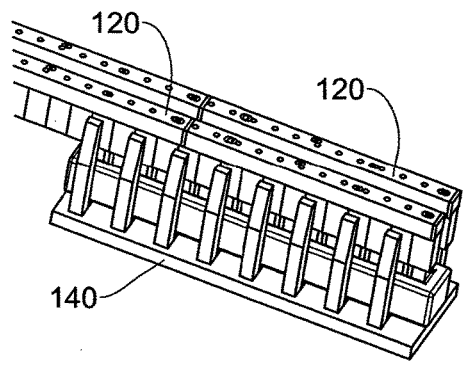
Figure 61C:
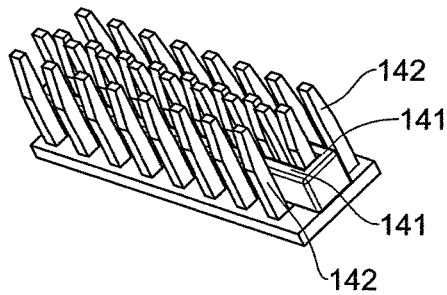
Figure 61D:
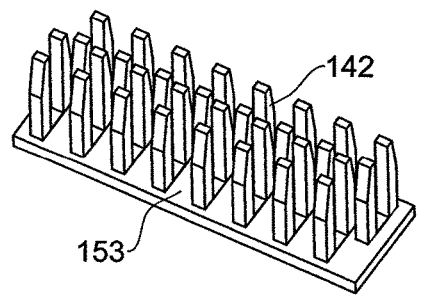

Let's consider the design of the stator slot 140 using the example of LFPM 100 (FIG. 58). The multipole LFPM 100 comprises a stator 110 and an armature 120, linearly moving relatively to the stator 110 with two air gaps 130 between them. FIG. 58 shows the LFPM 100, in which the stator 110 is implemented as three slots 140, and the armature 120 comprises the alternating polarity permanent magnets 121.

FIGS. 59A-61F show the design options of the stator slot 140, which contains the winding 141 and the magnetic conductors 142, as well as the LFPM 100 armature 120 design. The magnetic conductors 142 are oriented in the plane, which is perpendicular to the armature 120 travel direction of the linear machine 100 (FIG. 58).

FIGS. 59A-59D shows the stator slot 140, whose magnetic conductors 142 embrace one side of the winding 141. The magnetic conductors 142 are fixed in the heat-conducting frame (base) of the slot 153. The armature 120 comprises one strip of magnets 121.

FIGS. 60A-60D shows the stator slot 140, whose magnetic conductors 142 embrace both sides of the winding 141. The magnetic conductors 142 are fixed in the heat-conducting frame (base) of the slot 153. The armature 120 comprises two strips of magnets 121. The magnetic conductors 142 located on the one side of the winding 141 embrace the magnets 121 of the opposite polarity with respect to the magnetic conductors 142 located on the other side of the winding 141.

FIGS. 61A-61F shows the stator slot 140, whose magnetic conductors 142 embrace both sides of the winding 141. The magnetic conductors 142 are fixed in the heat-conducting frame (base) of the slot 153. The armature 120 comprises two strips of magnets 121. The magnetic conductors 142 located on the one side of the winding 141 embrace the magnets 121 of the opposite polarity with respect to the magnetic conductors 142 located on the other side of the winding 141 and are shifted to the amount of pole along the armature 120 travel direction. The magnetic conductor 142 has a U-type solid design (FIGS. 62-63). It can be made of electrical steel laminations 146, assembled in a stack 143 (FIG. 62), or of the powder soft magnetic material (FIG. 63). FIG. 64 shows the slot winding 141 made by means of winding onto a holder or a form installed on a holder with the subsequent insulating and varnish penetrative treatment. The winding 141 is connected with the windings 141 of other slots 140 thus forming the stator winding 147.

The U-shaped design of the solid magnetic conductor 142 allows installing and fixing the slot winding 141 inside the magnetic conductors 142 during the slot 140 assembling (FIGS. 59A-61F).

The pole extension 144 of the magnetic conductor 142 is the magnetic flux concentrator. Its section is a rectangular triangle (with the obtuse angle), one of whose legs is more than twice bigger than another:

$Lpm>2\times L2$ (FIGS. 65A-65B). The obtuse angle of the pole extension 144 is necessary to create the mechanical strength and limit the saturation of this section of the magnetic conductor 142 (FIGS. 65A-65B).

Figure 66:
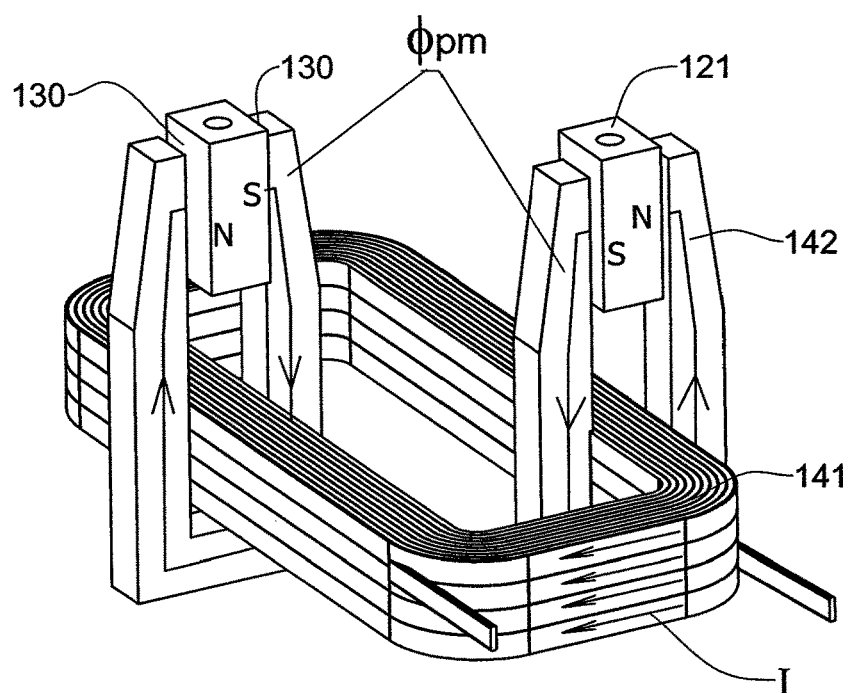
FIG. 66 is a schematic isometric view of the units shown in FIG. 65A, 65B, demonstrating the magnetic flux within the electromagnetic units.
Figure 67A:
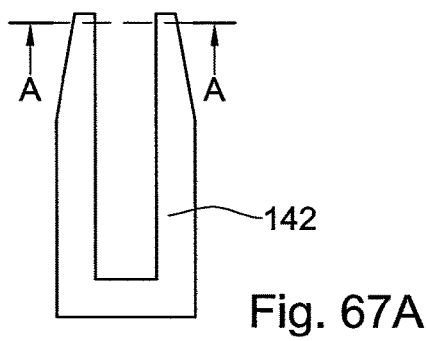
FIGS. 67A to 67D are schematic front views of an electromagnetic unit of the stator, showing different planes along which positioning plates can be placed during assembly of the stator.
Figure 67B:
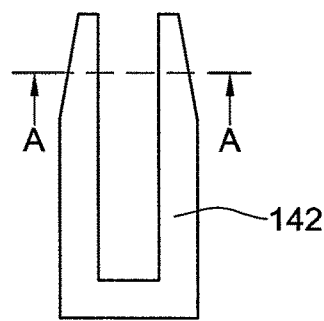
Figure 67C:
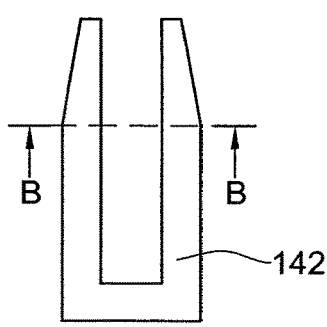
Figure 67D:
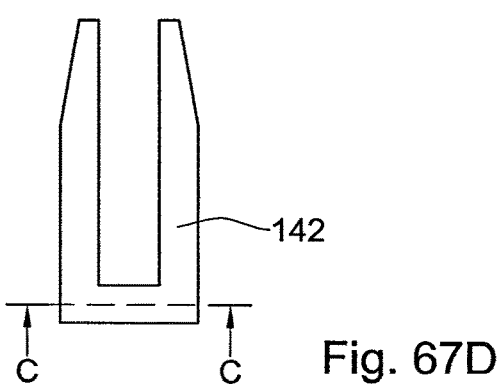
Figure 68A:
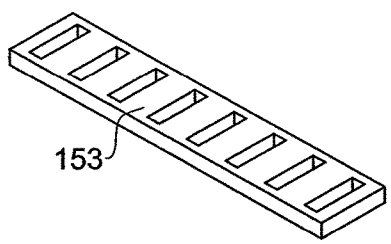
FIGS. 68A and 68B are schematic isometric views of a positioning plate and a portion of an electrical machine employing such a positioning plate.
Figure 68B:
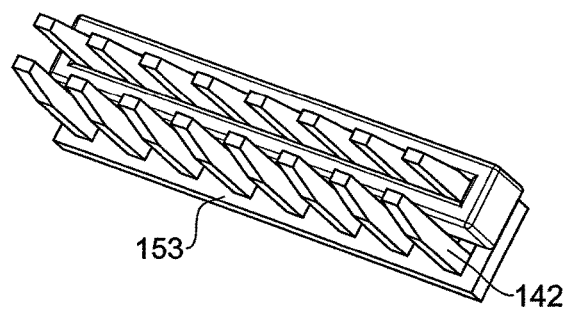

FIG. 66 shows the direction of the working magnetic flux Φpm generated by permanent magnets 121 in the magnetic conductors 142 for the stator slot options 140 shown in FIGS. 60A-61F.

The magnetic flux Φpm generated by permanent magnets 121 in the magnetic conductors 142 located at one side of the winding 141 has the reverse direction with respect to the flux Φpm in the magnetic conductors 142 located on the opposite side of the winding 141 (FIG. 66). For the generator operating mode of the electrical machine 100 the flux Φpm closes around the winding 141 wires and, when moving the magnets 121 with respect to the magnetic conductors 142 and the winding 141, it induces a signal in its wires, i.e. it generates the electromotive force. When the electrical circuit of the winding 141 is closed, a current I flows through it (FIG. 66). The magnetic flux Φpm transverses the air gap 130 twice.

Stator

The main problem of the stator 110 structure is ensuring its solid design. I.e. the magnetic conductors 142 shall be firmly fixed and shall reliably withstand the force occurring between the rotor magnets 121 and the pole extensions 144 of the magnetic conductors 142 during the rotor 120 spinning (moving the armature 120) with respect to the stator 110 (FIG. 58).

Considering that the U-shaped magnetic conductor 142 represents a rigid metal structure, it is proposed to fix it at least in one of the transverse planes A-A, B-B or C-C, as is shown in FIGS. 67A-67D. Depending on the size of the magnetic conductor 142, the location option and the number of transverse planes necessary for reliable fixing may be selected.

Figure 69:
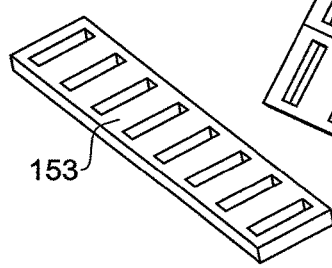
FIGS. 69 to 71 are schematic isometric views of various designs of positioning plates.
Figure 70:
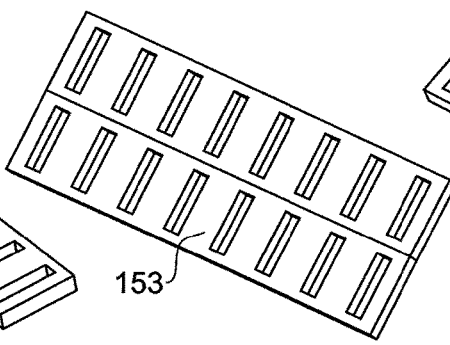
Figure 71:
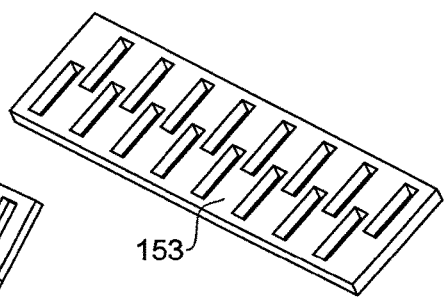
Figure 72A:
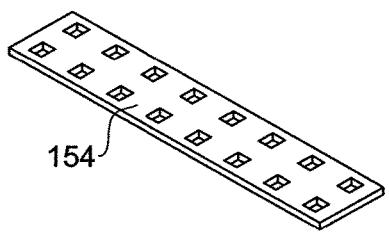
FIGS. 72A and 72B are schematic isometric views of a mid positioning plate and a portion of an electrical machine comprising the same.
Figure 72B:
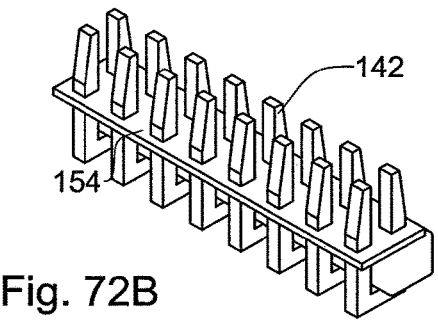

To fix magnetic conductors 142, the following options are provided for:

1. The slot heat-conducting frame 153 (FIGS. 68A-68B) is the base for installing the magnetic conductors 142 and is made of non-magnetic material, for example, of aluminum or its alloys (corresponds to the C-C section). The frame 153 may be made of an epoxy-based heat-conducting compound or a layer of heat-conducting compound may be poured onto the slot aluminum frame 153. The slot frame 153 is fixed to the TFPM 150 outer casing. The aluminum frame 153 ensures heat removal from the winding 147 to the TFPM 150 outer casing. FIGS. 69-71 show the design options of the heat-conductive frame of the stator slot 153 for the slot 140 design options represented in FIGS. 59A-61F.

2. The fixing heat-insulating board 154 (FIGS. 72A-72B) is made of non-magnetic non-electrically conductive material, e.g. kevlar (corresponds to the B-B section). The board 154 ensures fixing of magnetic conductors 142 between each other and with the outer casing 150. It partially protects (insulates from heat) the permanent magnets 121 zone from heat generated by the winding 147.

Figure 73A:
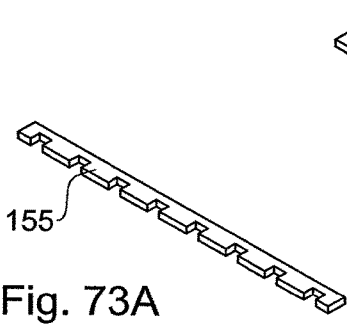
FIGS. 73A and 73B are schematic isometric views of a top positioning plate and a portion of an electrical machine comprising the same.
Figure 73B:
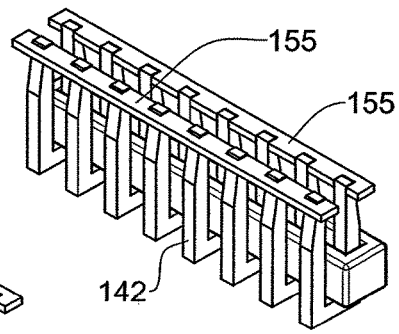

3. The stator slot 140 may comprise at least one limiting board 155 shown in FIG. 73A-73B made of non-magnetic and/or non conductive material (corresponds to the A-A section). The board 155 may be installed in any place of the pole extensions 144 of the magnetic conductors 142, for example, as is shown in FIG. 73A-73B—at the tip of pole extensions 144.

The board 155 is fixed to magnetic conductors 142 using the glue. The board 155 may be fixed to the TFPM 150 outer casing.

Figure 74:
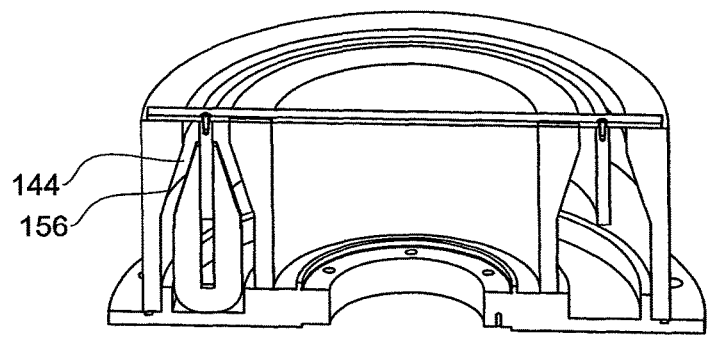
FIG. 74 is a schematic isometric cross-section view of a housing of an electrical machine.

4. The epoxy-based compound 156, which is poured in the area of pole extensions 142 of the magnetic conductors 142 (FIG. 74), which corresponds to the A-A section. FIG. 74 demonstrates an example of the fixture for pouring the compound 156.

Each of the fixing option of the magnetic conductors 142 may be used independently or in any combination with other options considered above (FIGS. 75-78).

Figure 75:
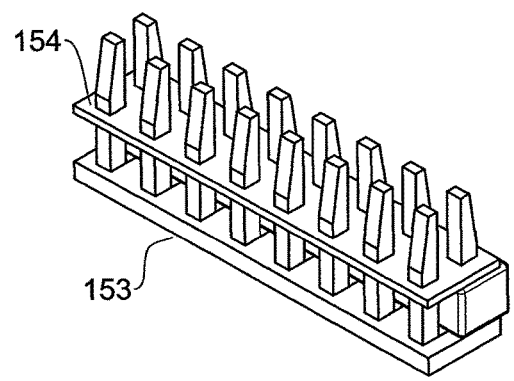
FIGS. 75 to 78 are schematic isometric views showing various stages of assembly of a stator of an electrical machine.

FIG. 75 shows the option of applying the heat-conducting frame of the slot 153 with the fixing heat-insulating board 154.

Figure 76:
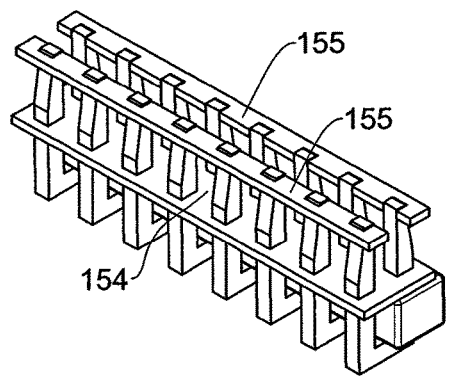

FIG. 76 demonstrates the option of applying the fixing heat-insulating board 154 with the limiting boards 155.

Figure 77:
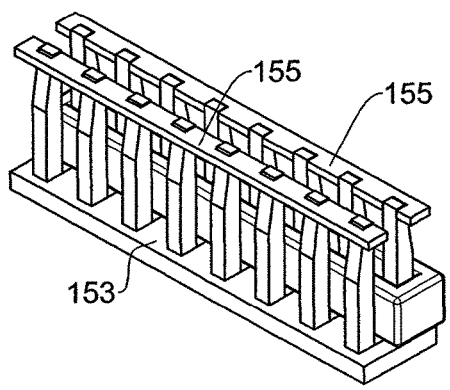

FIG. 77 shows the option of applying the heat-conducting frame of the slot 153 with the limiting boards 155.

Figure 78:
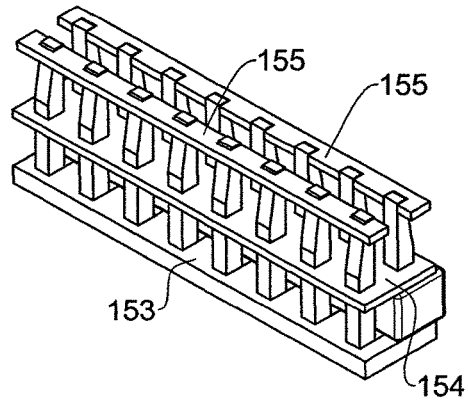

FIG. 78 shows the option of applying the heat-conducting frame of the slot 153 with the fixing heat-insulating board 154 and the limiting boards 155.

The assembly method of the stator 110 includes the slot 140 assembly:

7. Making of the magnet conductors 142 by means of assembling the pressed laminations 146 into the stack 143 or pressing the powder and forming of the solid magnetic conductor 142.
8. Making the winding 141 by means of winding onto the holder or a frame with the subsequent insulating and varnish penetrative treatment.
9. The installation and attaching to a fixture with the glue of a passive part 145 of the magnetic conductors 142 to the slot frame 153.
10. The winding 141 is installed and fixed with glue to the pole extensions 144 of the magnetic conductors 142.
11. The pole extensions of the magnetic conductors 144 are fixed between each other in a special fixture (various options may be adopted for magnetic conductors 142 fixing as described above).

After that, the assembled slots 140 are installed and fixed to the external body 150, for example, to the end shields 151 of the electrical machine 100.

The peculiarity of the slot 140 assembly technology is that the magnetic conductors 142 fabricated before are fixed between each other, and the previously made winding 141 is installed and fixed with the glue inside the magnetic conductors 142. The differences in the sequence of operations depend on the selected fixing method of the magnetic conductors 142.

Rotor (Armature)

The present example utilizes the same armature as previously described with respect to FIGS. 1 to 56. Soft magnetic materials are absent in the armature 120 within the area of magnets 121 location. Both poles of each armature magnet 121 are embraced with the pole extensions 144 of the corresponding magnetic conductor 142 (FIG. 2). The armature permanent magnets 121 are fixed to the base 122 with their lateral surface, on the opposite side of the magnetic conductors 142. The armature base 122 is made of non-magnetic material. The groove 123 is provided on the base 122 of the armature, at least one hole 124 (FIG. 25) is located in the lateral surface of the magnet 121, the screw connection 125 is employed. The magnets 121 on the armature 120 are fixed with the glue. FIG. 23 shows the armature 120 design option using the magnets 121 with no gaps, and FIG. 24 demonstrates the option with nonmagnetic inserts 126. FIG. 25 shows the armature base 122 with the groove 123 for the magnets 121, the magnets 121 with the holes 124, nonmagnetic inserts 126 and the screws 125.

The location of the hole 124 on the lateral surface of the magnets 121 does not result in the losses of the working magnetic flux Φpm, as in case of the hole 124 location on the magnet 121 pole, which is applied for the known conventional RFPM 100 design.

The rotor (armature) 120 of electrical machine is provided with a fan 170 which is installed under the screws 125 fixing the permanent magnets 121. The fan 170 is made of non-magnetic material in the form of an impeller.

The impeller 170 may be made as separate elements 171 or as inserts 126 between magnets 121 or as a bladed strip 172, or as a bladed ring 173. For the large-size electrical machines 100, the strip 172 and the ring 173 may be composed of several parts.

The fan 170 improves fixing of the magnets 121 to the rotor (armature) base 122 and ensures thermal convection.

Structure of the Electrical Machine

To combine signals directed in the slot winding by each magnetic conductor, the following conditions shall be met (FIG. 65A-65B):

The number of the slot s (s=1, 2, 3 . . . ) magnetic conductors shall be equal to the number of the pole pairs of the machine moving part ps, located inside the slot:

$$s=ps, \quad [1]$$

Two pole pitches p are equal to the slot pitch τs:

$$\tau p = \tau s \quad [2]$$

The pole pitch τp is equal to the sum of the magnet width Xpm and the distance between the neighboring magnets Δpm:

$$\tau p = Xpm + \Delta pm \quad [3]$$

The pole pitch τs is equal to the sum of the magnetic conductor width Xem and the distance between the neighboring magnetic conductors Cem:

$$\tau s = Xem + Cem, \text{ i.e.} \quad [4]$$

$$2\tau p = \tau s = 2 \times (Xpm + \Delta pm) = Xem + Cem \quad [5]$$

If each TFPM phase contains t slots, where t=1, 2, 3 . . . , for the signals to combine in a phase, the distance between the slots Xs:

$$Xs = \tau p \times n, \text{ where } n=1,2,3 \ldots \quad [6]$$

The value n is selected to be sufficient to locate two neighboring bending parts of the slot windings.

TFPM may have multiphase design. For example, for the for the three-phase TFPM, to shift the signals of each phase to 120°—the distance between the Xph phases:

$$Xph = \tfrac{2}{3} \times \tau p \times m, \quad [7]$$

where m=1, 2, 4, 5, 7, 8, 10 . . . (i.e. the positive integer non-divisible by 3) The value m is selected to be sufficient to locate two neighboring bending parts of the slot windings.

For a three-phased TFPM, the low cogging torque ripple value is ensured by an additional relation:

$$Cem = \frac{Xem}{1.3 - 1.8} + \tau p \quad [8]$$

A low cogging torque ripple value is ensured by the relations [7] and [8], i.e. the selection of the distance between the phases, the selection of the magnetic conductor width and the distance between the conductors. In this case, the parasite torque ripples are compensated as a result of summation of ripples of all of the phases.

LFPM

The proposed transverse flux linear permanent magnet machine (LFPM) 100 was built using the principles considered before.

Figure 79:
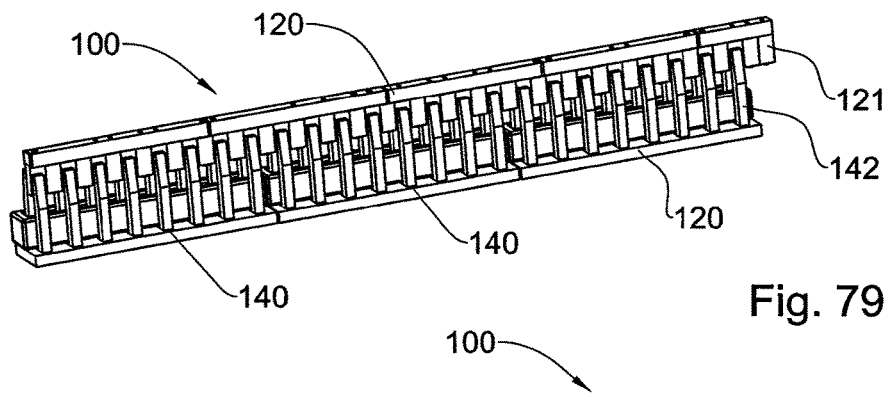
FIGS. 79 and 80 are schematic isometric and side views of a linear configuration of an electrical machine.

FIG. 79 shows an example where the LFPM 100 phase comprises three slots 140 (t=3), each slot 140 contains 16 magnets 121 (2ps=16) and 8 magnetic conductors 142 (s=8), and the distance between the slots 140 of the phase $Xs=\tau p \times n=0$ ($\tau p=Xpm$, $n=0$).

Figure 80:
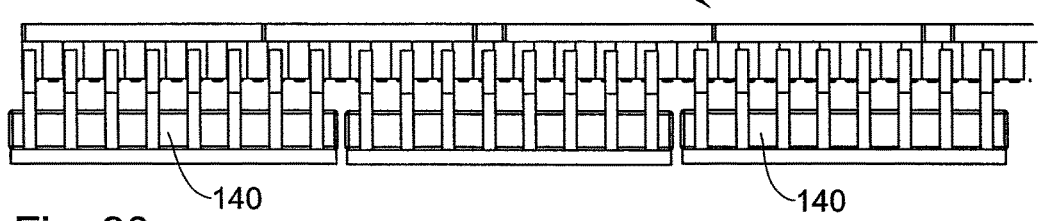

FIG. 80 shows an example where each phase of the three-phased LFPM 100 contains one slot 140 and the distance between the phases Xph:

$Xph=\frac{1}{3} \times \tau p \times m = \frac{2}{3} Xpm$, ($m=2$).

Figure 81:
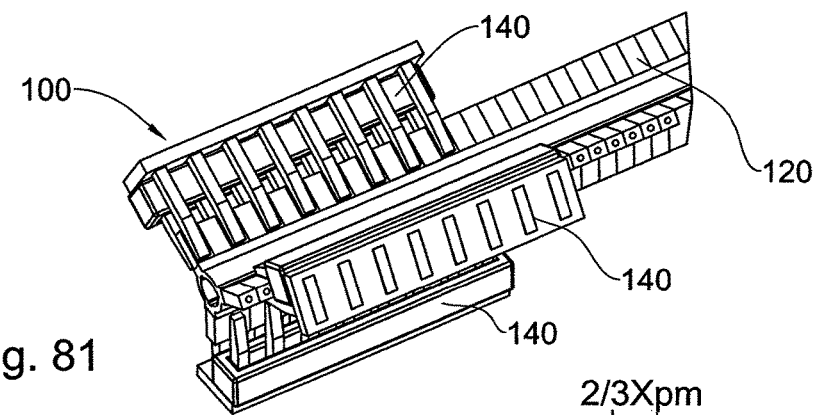
FIGS. 81 and 82 are schematic isometric and side views of another example of a linear configuration of an electrical machine.
Figure 82:
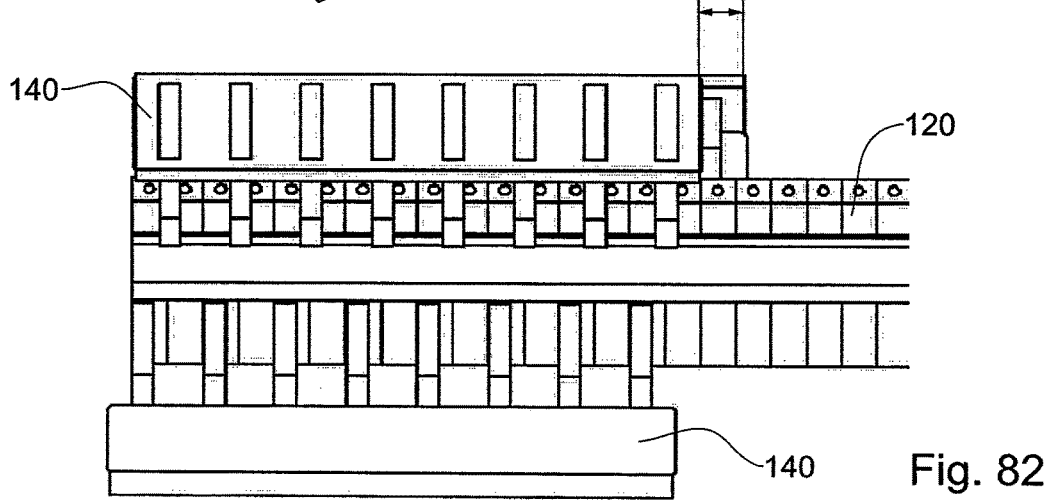

FIGS. 81-82 give an example of the three-phased LFPM 100, where each phase contains one slot 140 with the circumferential position of the phases. Furthermore, the distance between the phases Xph along the armature 120 travel direction:

$Xph=\frac{1}{3} \times \tau p \times m = \frac{2}{3} Xpm$, ($m=2$).

Figure 83:
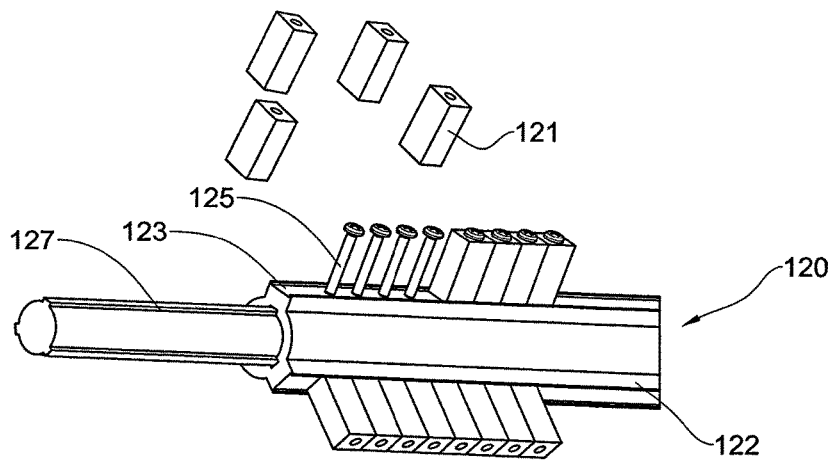
FIG. 83 is a schematic isometric exploded view of the electrical machine shown in FIGS. 81, 82.

FIG. 83 shows the method of fixing the magnets 121 with the screw connection 125 to the armature base 122, where the grooves 123 are provided for. There is given an example of the armature base 122 implementation as a hollow cylinder with guides and the stem 127, where the armature 120 travels.

FIGS. 79-83 show the LFPM 100 design options with employing the slot 140, shown in FIGS. 59A-59D. The LFPM 100 may also be implemented with employing the slots 140 shown in FIGS. 60A-61F, in which the armature 120 contains two strips with permanent magnets 121.

AFPM

The proposed axial flux permanent magnet machine (AFPM) 100 was built on the same principles as the linear one considered before. The magnetic conductors 142 are oriented in the plane going through the shaft 160 axis.

Figure 84A:
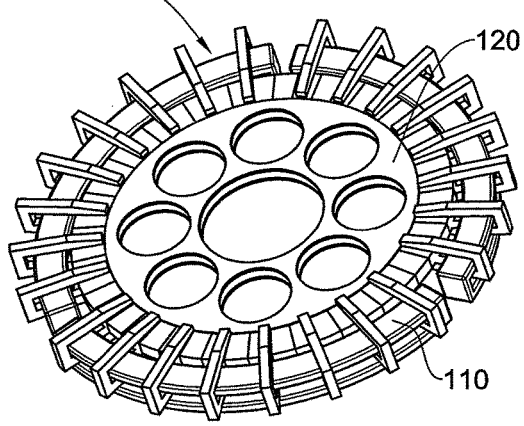
FIGS. 84A to 85D are schematic isometric views of a rotary configuration of an electrical machine, shown during various assembly stages thereof.
Figure 84B:
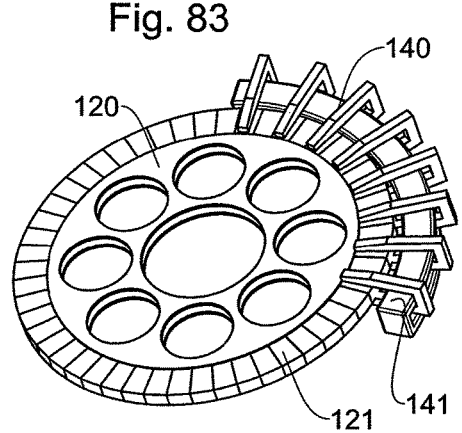
Figure 85A:
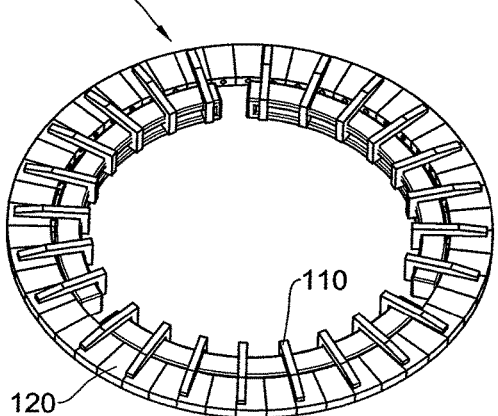
Figure 85B:
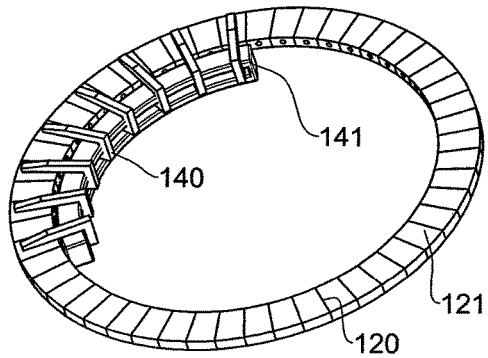

FIGS. 84A-84B shows the example of a three-phased AFPM 100 design with the internal rotor 120. FIGS. 85A-85B shows the example of a three-phased AFPM 100 design with the external rotor 120. The parameters of the represented AFPM 100 design options with the internal and external rotor 120: the number of pole pairs p=25, i.e. the number of magnets 121 on the rotor 2p=50; the number of the slot magnetic conductors 142 s=8; the machine 100 has a three-phased design, each phase has one slot 140 t=1; there are no gaps between the rotor magnets 121 Δpm=0, the distance between phases Xph=⅔Xpm, the rotor 120 contains one ring with the permanent magnets 121.

FIGS. 84A-85B show the AFPM 100 design options with employing the slot 140, shown in FIG. 59A-59D. The AFPM 100 may also be implemented with employing the slots 140 shown in FIGS. 60A-61F, in which the rotor 120 contains two rings with permanent magnets 121.

RFPM

The proposed radial flux permanent magnet machine (RFPM) 100 was built on the same principles as the axial-flow, linear ones considered before. The surfaces of permanent magnets 121 and the surfaces of the magnetic conductors 142 pole extensions 144 facing them are implemented with the corresponding radii. Magnetic conductors 142 are oriented in the plane going through the shaft 160 axis.

Figure 86A:
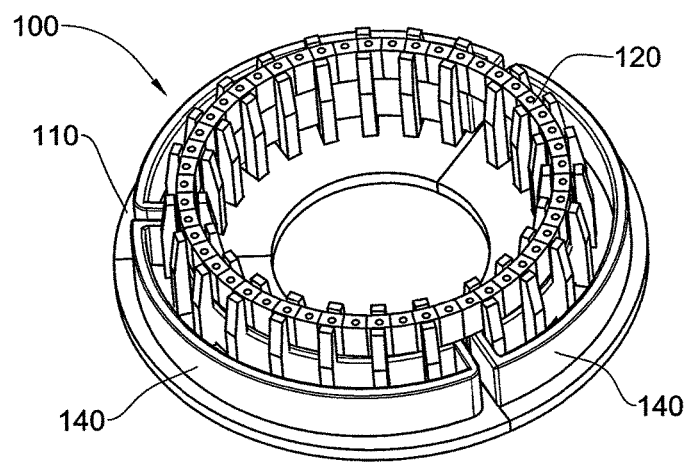
FIGS. 86A to 86E are schematic isometric views of another example of a rotary configuration of an electrical machine.
Figure 86B:
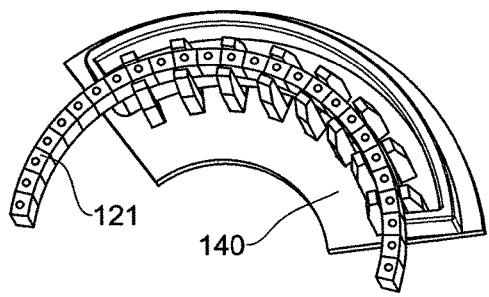
Figure 86C:
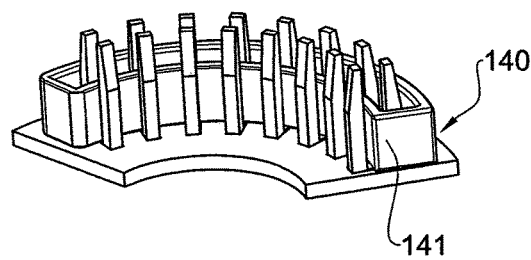
Figure 86D:
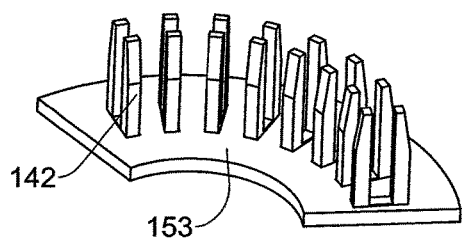
Figure 86E:
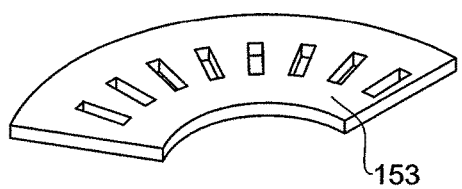
Figure 87:
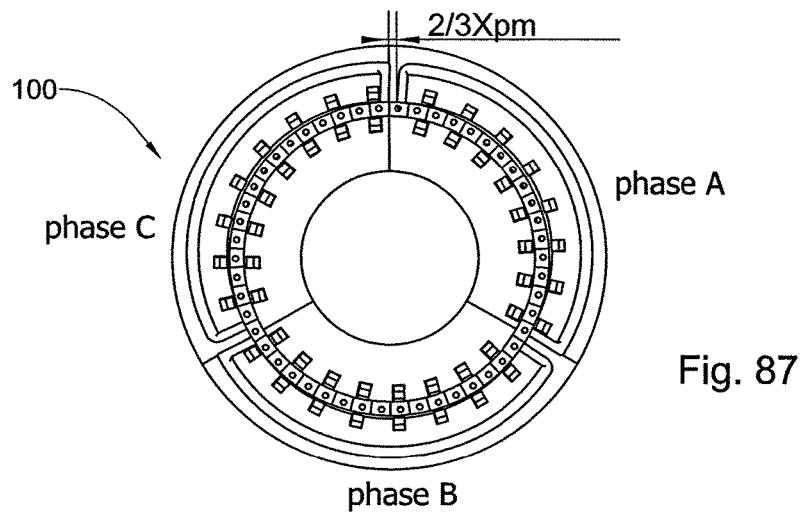
FIG. 87 is a schematic top view of the electrical machine shown in FIGS. 86A to 86E.
Figure 88A:
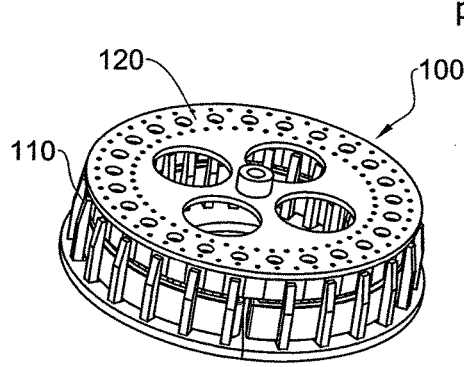
FIGS. 88A to 88*j* are schematic isometric views of another example of a rotary configuration of an electrical machine.
Figure 88B:
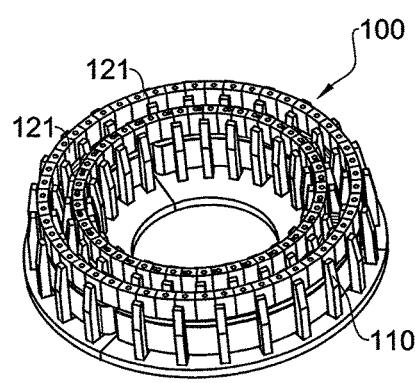
Figure 88C:
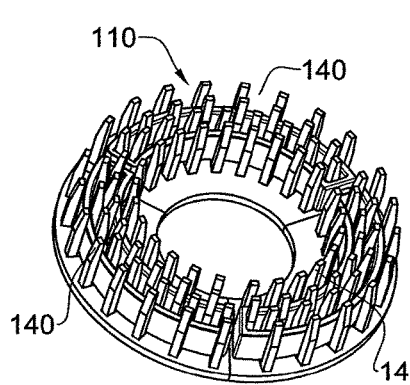
Figure 88D:
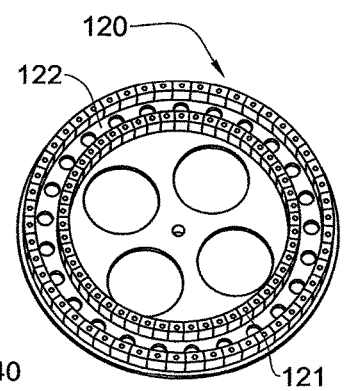
Figure 88E:
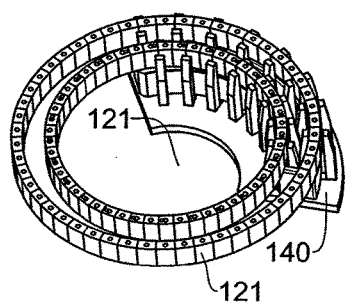
Figure 88F:
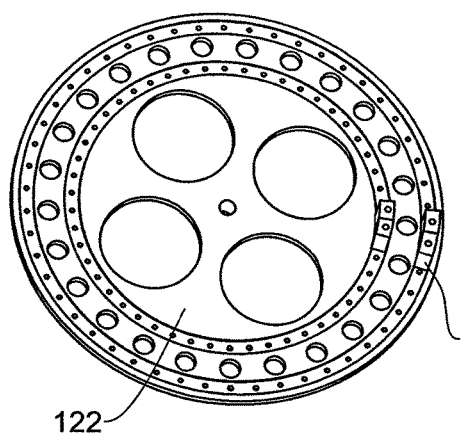
Figure 88G:
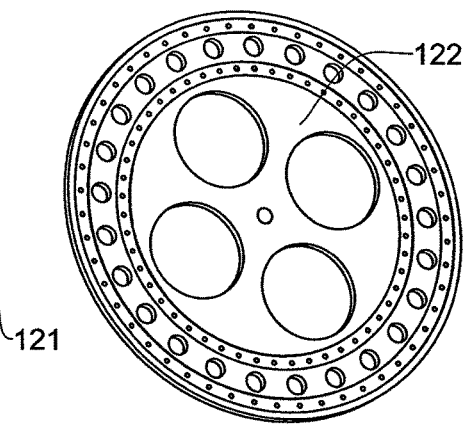
Figure 88H:
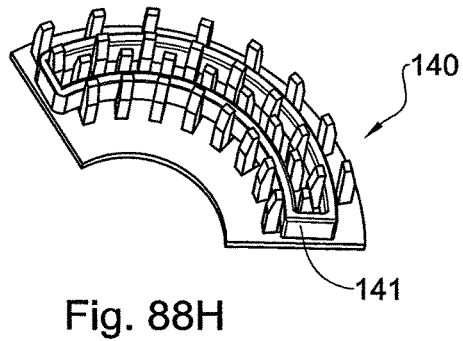
Figure 88I:
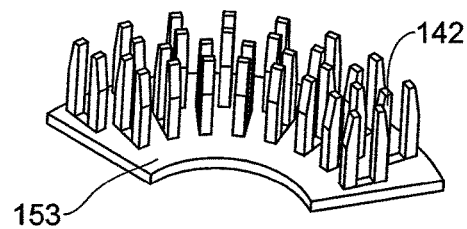
Figure 88J:
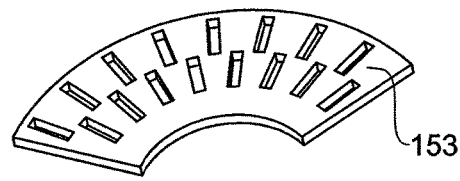
Figure 89A:
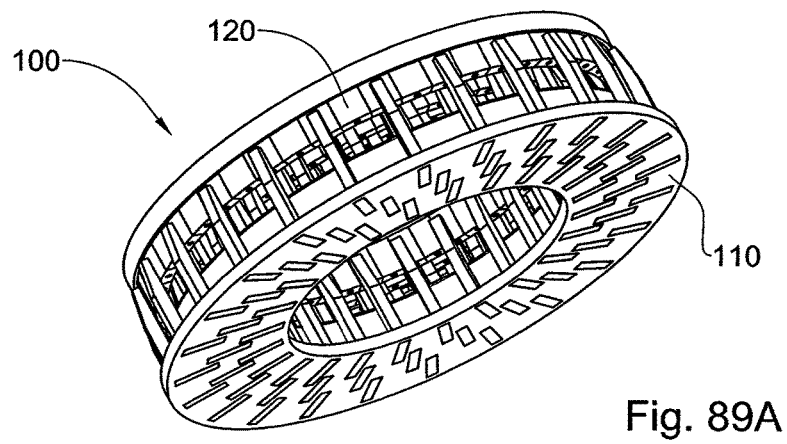
FIG. 89A is a schematic rear isometric view of an electrical machine according to another example of the present application.
Figure 90E:
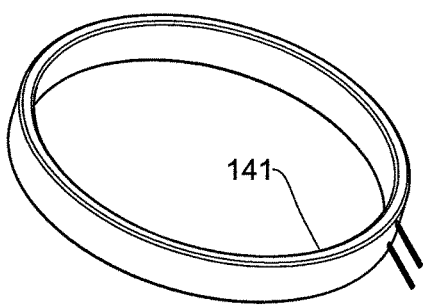
Figure 90F:
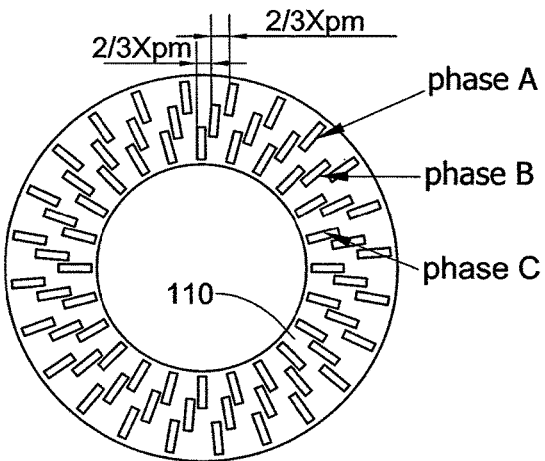
Figure 91A:
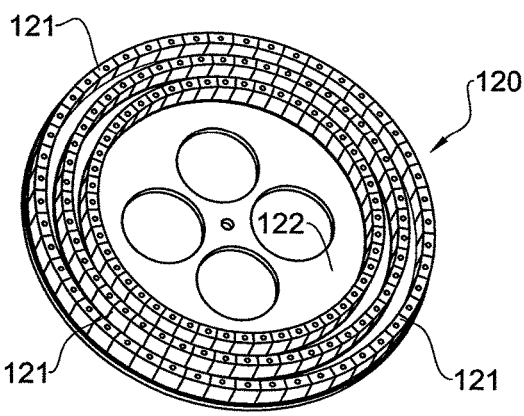
FIGS. 91A to 91D are schematic isometric views of portions of the rotor used in the electrical machine of FIGS. 89A-89B.
Figure 91B:
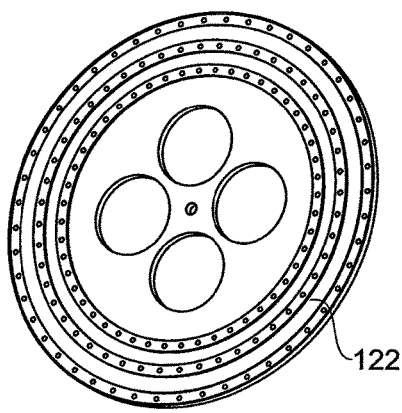
Figure 91C:
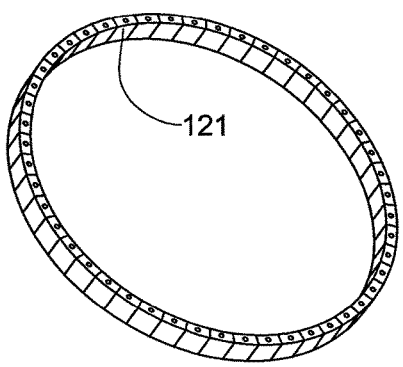
Figure 91D:
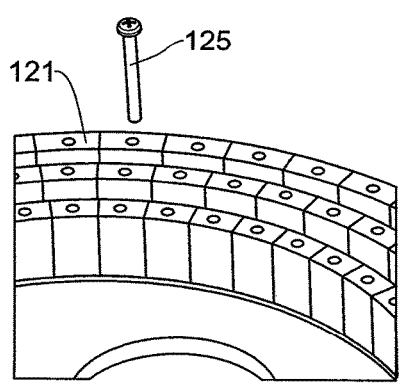

FIGS. 86A-87 show an example of the three-phased RFPM 100 design with employing the slot 140, shown in FIG. 59A-59D.

The parameters of the represented RFPM 100 design option: the number of the pole pairs p=25; the number of the magnetic conductors 142 of the slot s=8; the machine 100 has a three-phased design, each phase contains one slot 140 t=1; there are no gaps between the rotor magnets 121 Δpm=0, the distance between phases Xph=⅔Xpm (FIG. 87), the rotor 120 comprises one ring with the permanent magnets 121.

FIG. 88 demonstrates an example of the three-phased RFPM 100 design based on the slot 140, shown in FIG. 61A-61F. The parameters of the represented RFPM 100 option: the number of the pole pairs p=25; the number of the magnetic conductors 142 of the slot s=16; the machine 100 has a three-phased design, each phase contains one slot 140 t=1; there are no gaps between the rotor magnets 121 Δpm=0, the distance between phases Xph=⅔Xpm, the rotor 120 comprises two rings with the permanent magnets 121 (an AFPM 100 with the external and the internal rotor 120 may be implemented in a similar manner).

The RFPM with the Circumferentially Distributed Winding (an AFPM with the External and the Internal Rotor May be Implemented in a Similar Manner)

FIGS. 89A-91D show an example of the three-phased RFPM 100 design based on the slot 140, with three circumferentially distributed windings 141.

The considered RFPM 100 design is implemented based on the slot 140 building principle shown in FIGS. 61A-61F. The RFPM 100 with employing the slots 140 building principles shown in FIGS. 59A-60D may be implemented likewise.

FIG. 90A-90F shows the stator 110 implemented as three groups of the magnetic conductors 142 with the circumferential location pattern. Each group of the magnetic conductors 142 has their own concentric winding 141 forming a phase. Each group of the magnetic conductors 142 is shifted with respect to the neighboring group to the distance of ⅔Xpm, which ensures the displacement of the phases A, B and C of the windings 141 to the angle of 120°. FIGS. 91A-91D shows the rotor 120 made as three rings of the permanent magnets 121 fixed on the base 122.

The parameters of the represented RFPM 100 design option (FIGS. 89A-91D) the number of the pole pairs p=24; the number of the magnetic conductors 142 in the group s=24, forming a phase together with the winding 141; the machine 100 has a three-phased design, there are no gaps between the rotor magnets 121 Δpm=0, the rotor 120 contains three rings with permanent magnets 121.

The Double-Section RFPM with the Circumferentially Distributed Winding

Figure 92A:
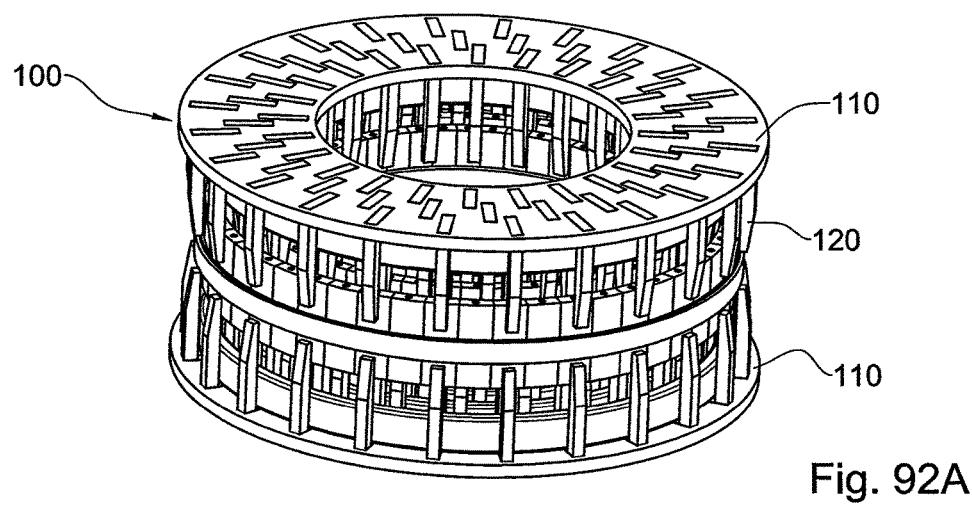
FIG. 92A is a schematic isometric view of another example of an electrical machine of the present application.
Figure 92B:
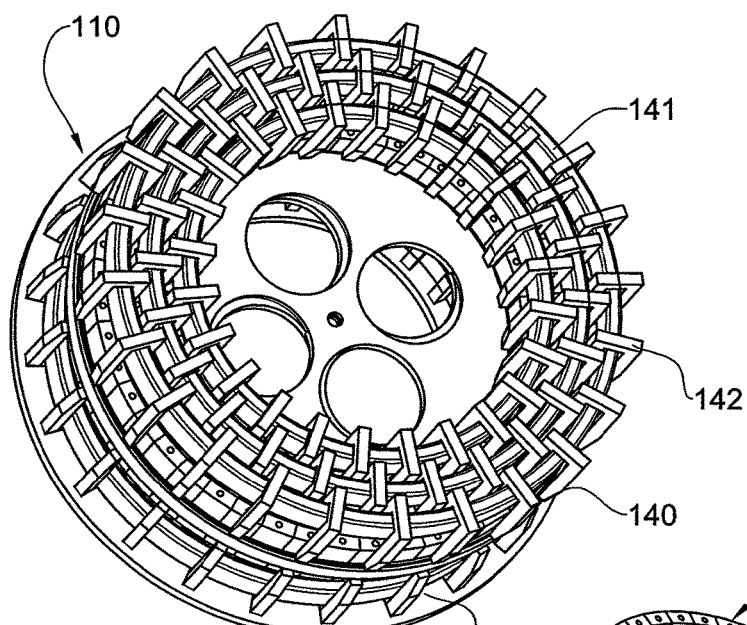
FIGS. 92B and 92C are schematic isometric views of the rotor and stator of the electrical machine of FIG. 92A.
Figure 92C:
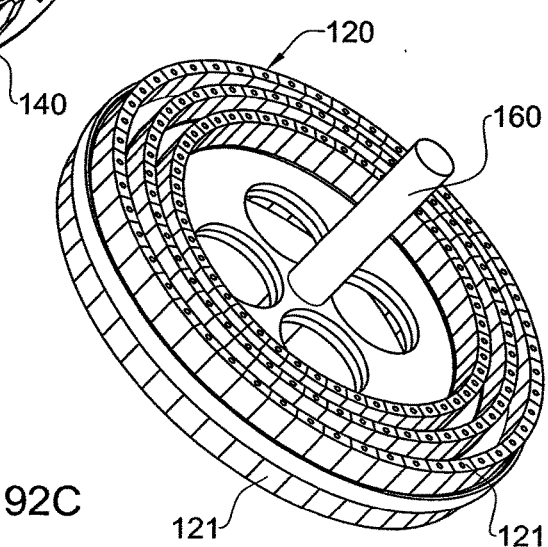

FIGS. 92A-92C show an example of the three-phased RFPM 100 design based on the slot 140, with three circumferentially distributed windings 141. The rotor 120 comprises three groups of electromagnets 121, fixed on two sides on the rotor base 122.

Each of two sections (slots) 140 of the stator 110 is implemented as three groups of the magnetic conductors 142 with the circumferential location pattern. Each group of the magnetic conductors 142 has their own concentric winding 141. Each group of the magnetic conductors 142 is shifted with respect to the neighboring group to the distance of ⅔Xpm, which ensures the displacement of the phases A, B and C of the windings 141 to the angle of 120°.

Figure 93:
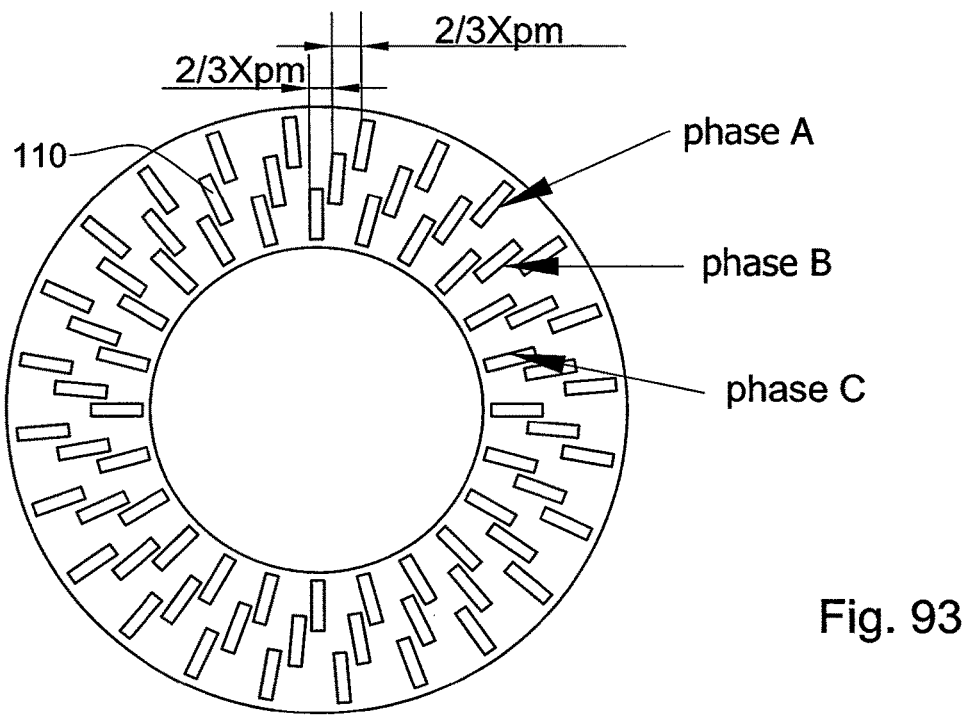
FIGS. 93 and 94 are schematic top views of the positioning plate of the stator of the electrical machine shown in FIG. 92A.
Figure 94:
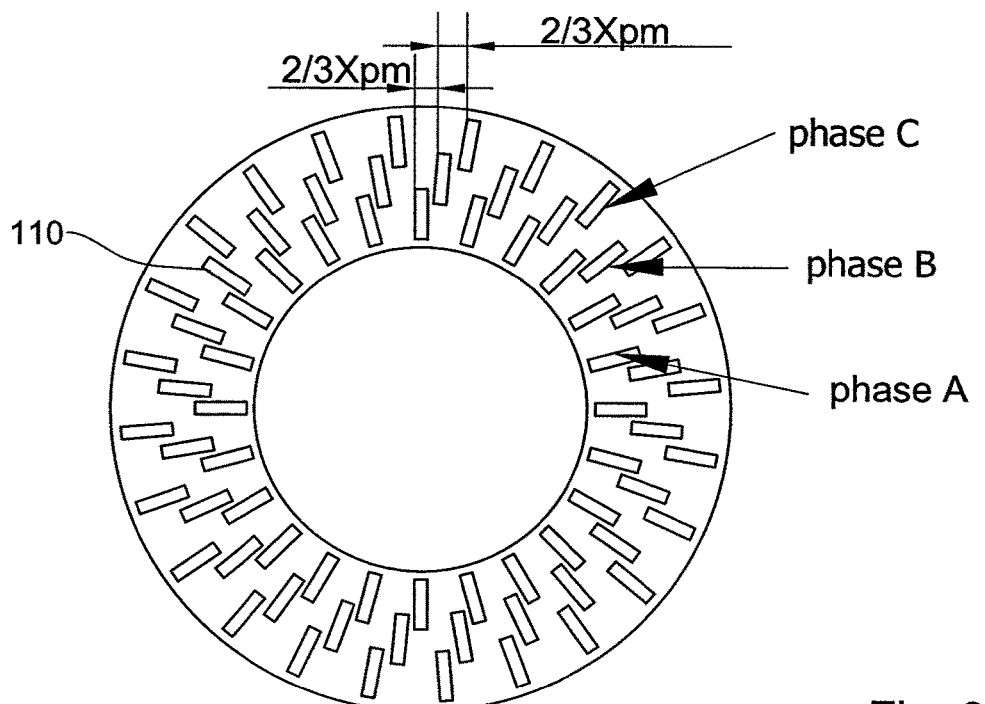

To ensure the symmetric position of the winding 147 phase parameters in case of a star or a delta connection of the phases—the phase A of the first section is connected with the phase C of the second section, the phase C of the first section is connected with the phase A of the second section, and the phases B of the both sections are connected with each other (FIGS. 93-94).

The parameters of the represented RFPM 100 design option (FIGS. 92A-94): the number of the pole pairs p=24; the number of the magnetic conductors 142 in the group s=24; the machine 100 has a three-phased design, there are no gaps between the rotor magnets 121 Δpm=0, the rotor 120 contains three rings with permanent magnets 121.

The Four-Section RFPM with the Circumferentially Distributed Winding

Figure 95:
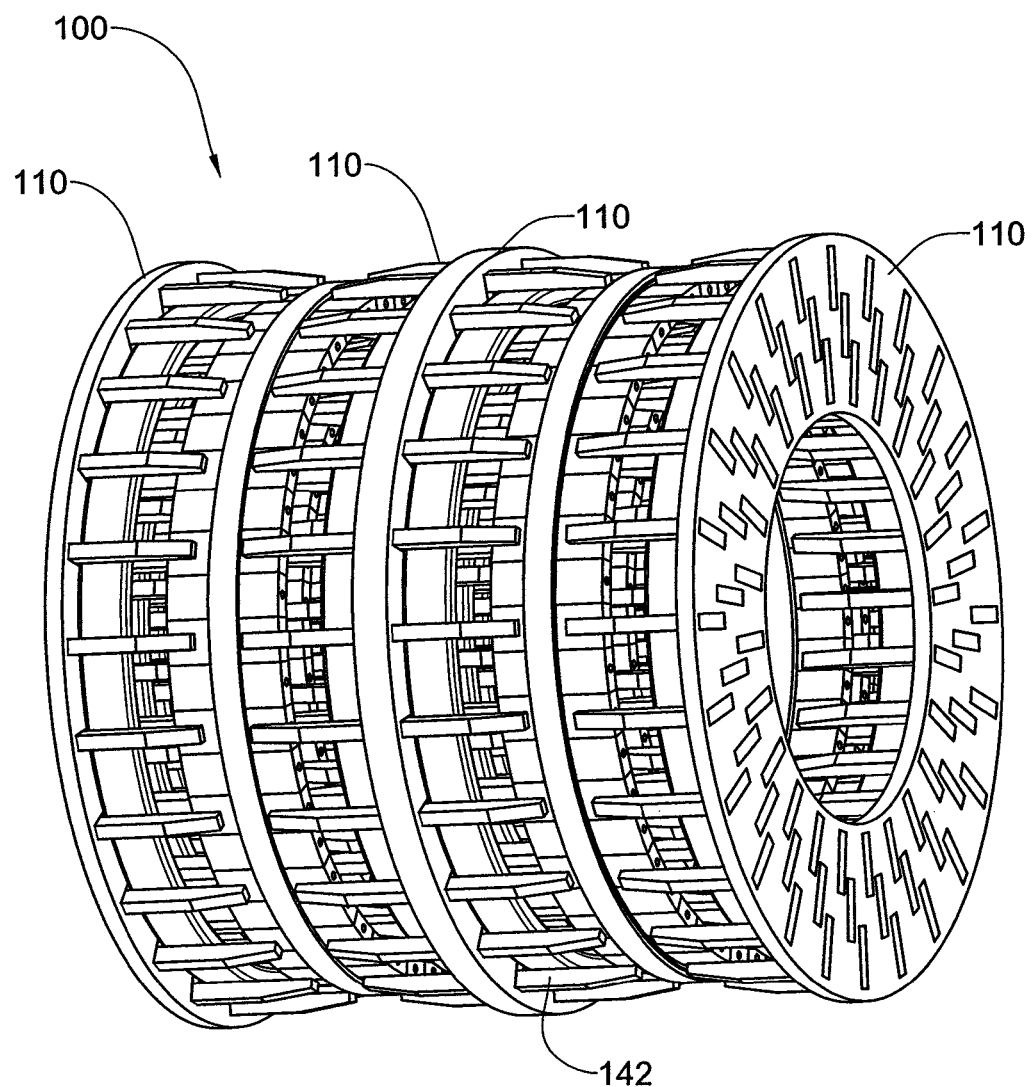
FIG. 95 is a schematic isometric view of another example of an electrical machine of the present application.
Figure 96:
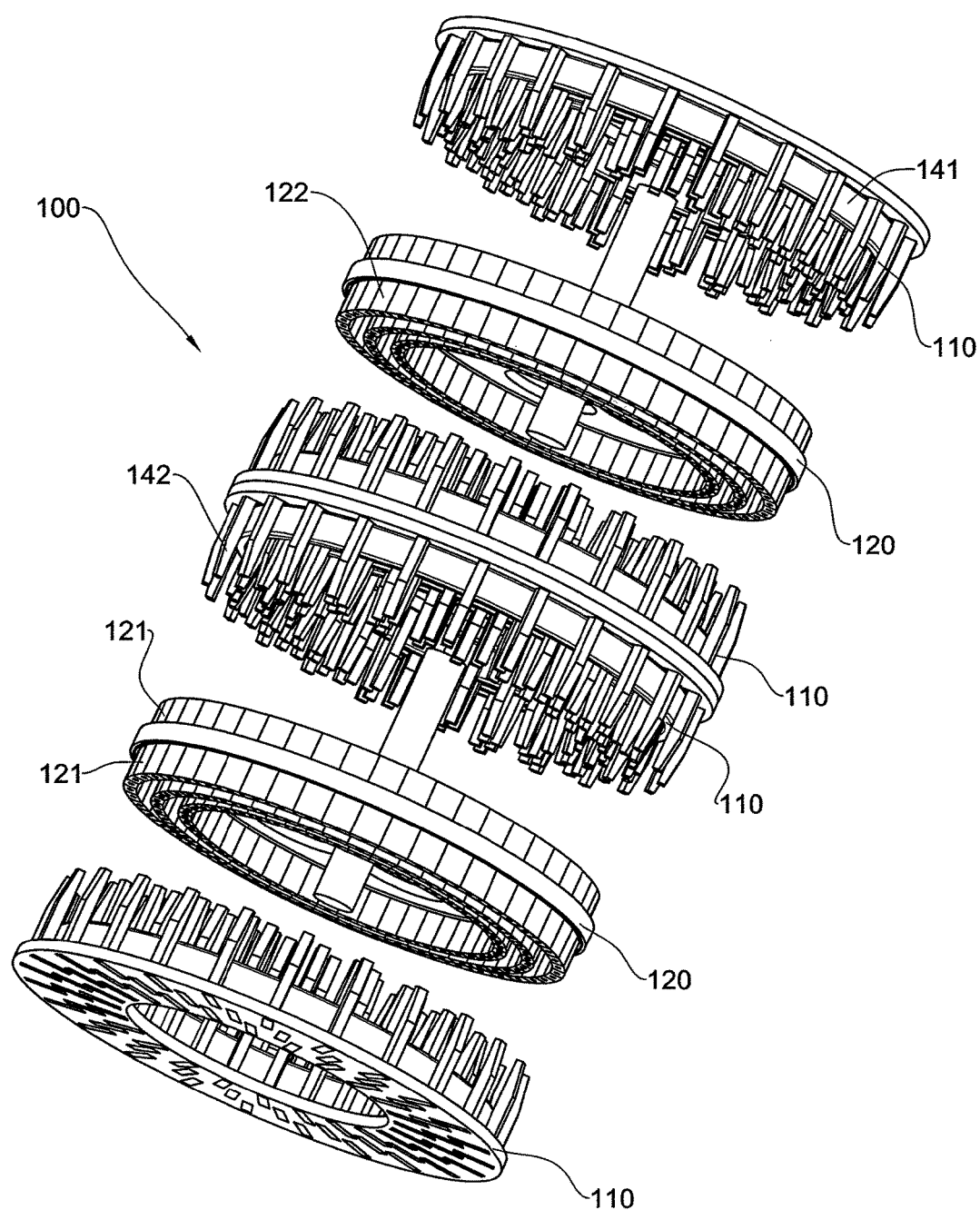
FIG. 96 is a schematic isometric exploded view of the electrical machine shown in FIG. 95.

FIGS. 95-96 show an example of a four-section three-phased RFPM 100 design with the circumferentially distributed windings 141.

Each of four similar sections of the stator 110 is implemented as three groups of the magnetic conductors 142 with the circumferential location pattern. Each group of the magnetic conductors 142 has their own concentric winding 141.

The rotor 120 comprises two sections, each of them containing three groups of magnets 121 fixed on both sides on two bases of the rotor 122.

Turning now to FIGS. 97 to 138, yet another example of an electrical machine is shown, utilizing U-shaped electromagnetic units. The difference between the present example and the previously described example lies in the fact that a plurality of solenoid coils are used, each being configured for being mounted onto its respective electromagnetic unit (as opposed to a mutual coil as described in the previous examples).

Figure 97:
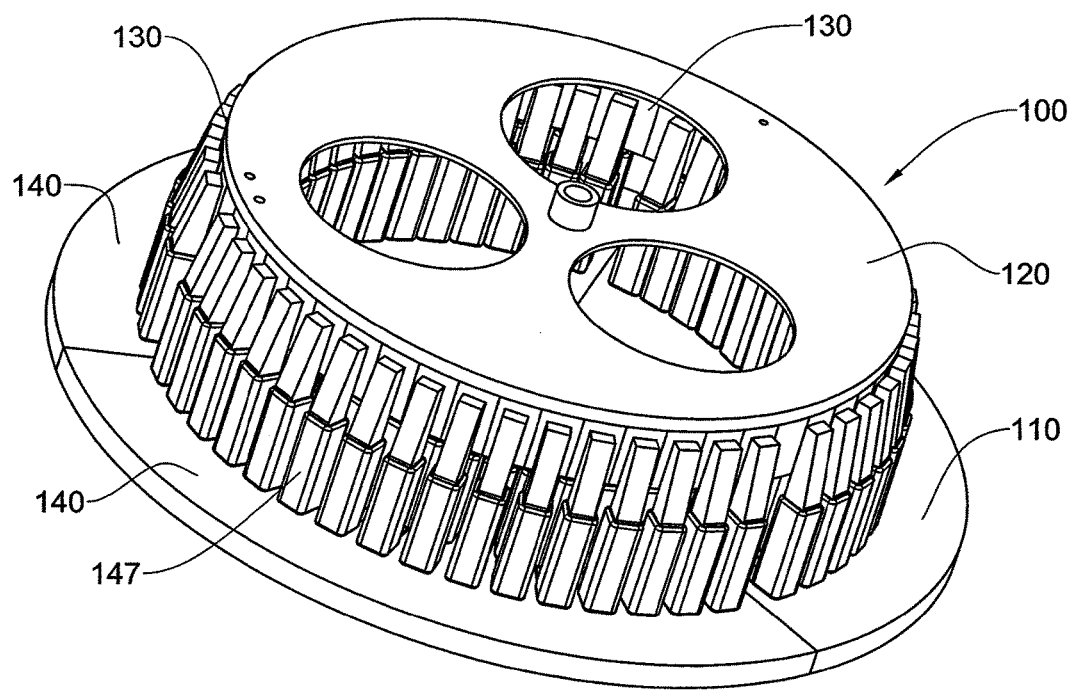
FIG. 97 is a schematic isometric view of an electrical machine according to another example of the subject matter of the present application.

The multipole electrical machine 100 comprises stator 110 and rotor 120, which moves (rotates) relative to the stator 110 with an air gap 130 between them (FIG. 97).

The stator 110 is assembled of the slots 140. Using the concept of the slot 140 as the basic Lego component, various TFPM types can be assembled: linear permanent magnet machines (LFPM), axial (AFPM) and radial (RFPM) magnetic flux permanent magnet machines.

Stator Slot

Figure 98:
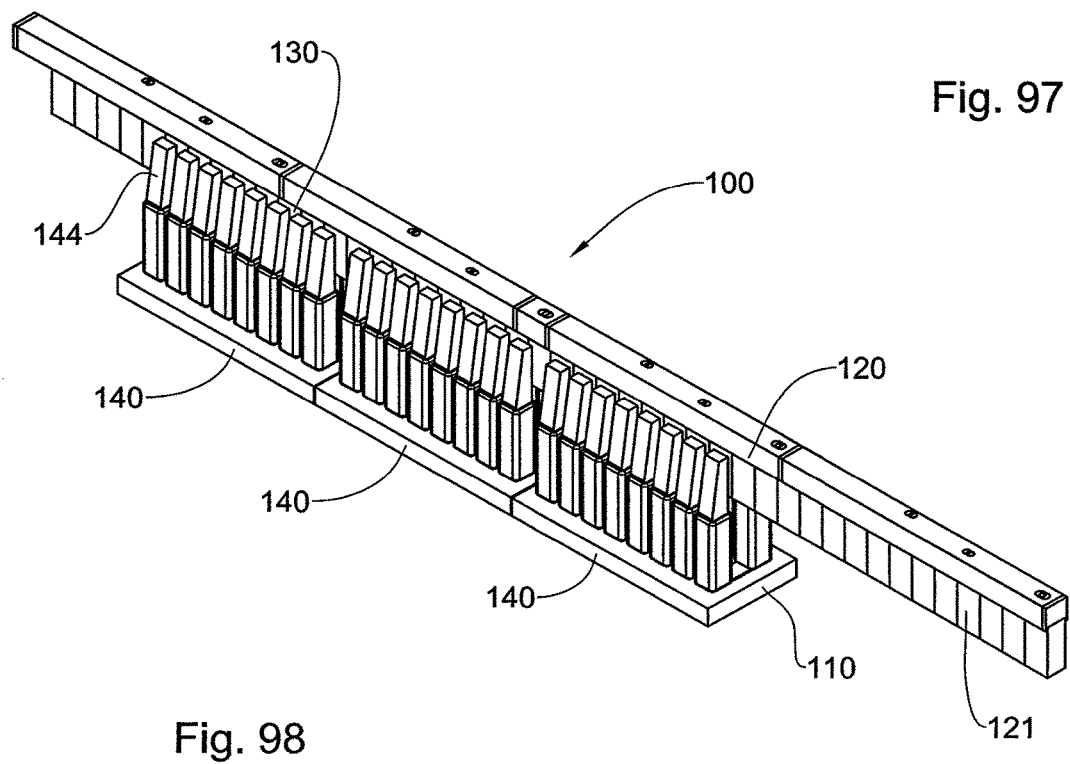
FIG. 98 is a schematic isometric view of a linear version of the electrical machine shown in FIG. 97.
Figure 99:
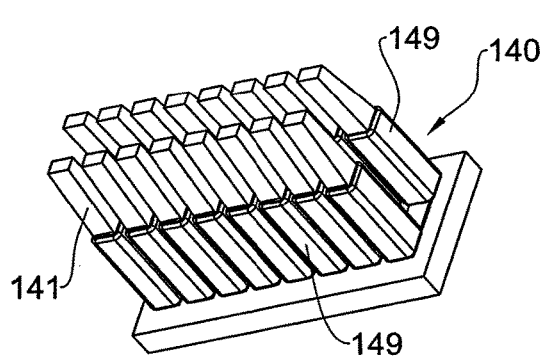
FIG. 99 is a schematic isometric view of a basic unit of the stator of the electrical machine shown in FIG. 98.
Figure 100:
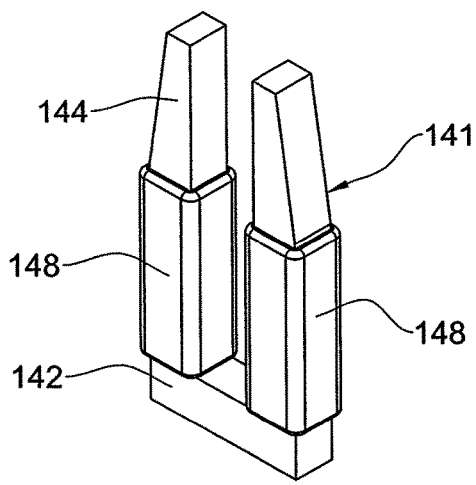
FIG. 100 is a schematic isometric view of an electromagnetic unit used in the stator shown in FIG. 99.

Let's consider the design of the stator slot 140 using the example of LFPM 100 (FIG. 98).

The multipole LFPM 100 comprises a stator 110 and an armature 120, linearly moving relatively to the stator 110 with two air gaps 130 between them.

FIG. 98 shows the LFPM 100, in which the stator 110 is implemented as three slots 140, and the armature 120 comprises the alternating polarity permanent magnets 121.

Figure 101:
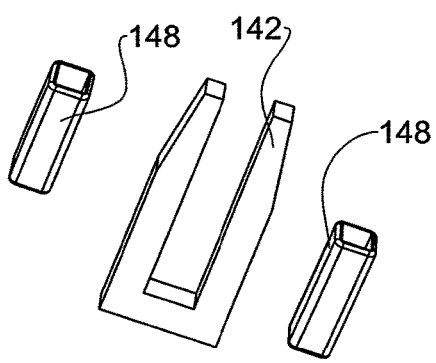
FIGS. 101 to 104 are schematic isometric views of basic components of the stator shown in FIG. 98.

Stator slot 140 (FIG. 99) comprises a group of electromagnets 141, connected by at least one common winding sleeve 149. Stator slot 140, shown in FIG. 99 comprises two winding sleeves 149. Each electromagnet 141 (FIG. 100) comprises a magnetic conductor 142 and at least one solenoid coil 148 (FIG. 101). Electromagnet 141, shown in FIG. 100 comprises two coils 148. The magnetic conductors 142 are oriented in the plane, which is perpendicular to the armature 120 movement direction of the linear machine 100 (FIG. 98).

Figure 102:
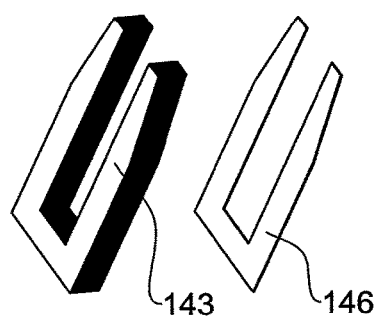
Figure 103:
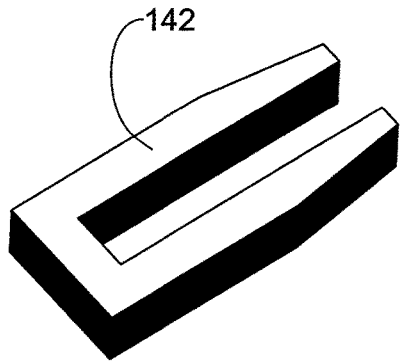
Figure 104:
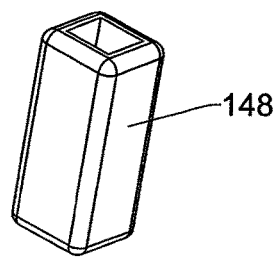

The magnetic conductor 142 has a U-type solid design (FIGS. 102-103). It can be made of electrical steel laminations 146, assembled in a stack 143 (FIG. 102), or of the powder soft magnetic material (FIG. 103). A solenoid coil 148 may be wound onto a form or be formless as is shown in FIG. 104. The coils 148 are installed onto the pole extensions 144 of the U-shaped magnetic conductor 142, as is demonstrated in FIG. 100. FIGS. 105-108 show one of the slot 140 design options. FIG. 105 shows the winding sleeve of the slot 149, which is manufactured by means of continuous winding of the coils 148 onto the holder or forms installed on the holder with no interconnections between each other with the subsequent insulating and varnish penetrative treatment. Slot winding sleeves 149 may be connected with the sleeves 149 of other slots 140, as well as between each other—in series or in parallel, thus forming the stator winding 147 (FIG. 97). The U-shaped design of the solid magnetic conductor 142 allows installing the sleeves of coils 149 onto the pole extensions 144 of the slot magnetic conductors 142 during the slot 140 assembling.

The pole extension 144 of the magnetic conductor 142 is the magnetic flux concentrator. Its section is a rectangular triangle (with the obtuse angle), one of whose legs is more than twice bigger than another:

$$Lpm > 2 \times L2 \qquad \text{(FIGS. 109A-109B)}.$$

The obtuse angle of the pole extension 144 is necessary to create the mechanical strength and limit the saturation of this section of the magnetic conductor 142 (FIG. 109A-109B).

Figure 110:
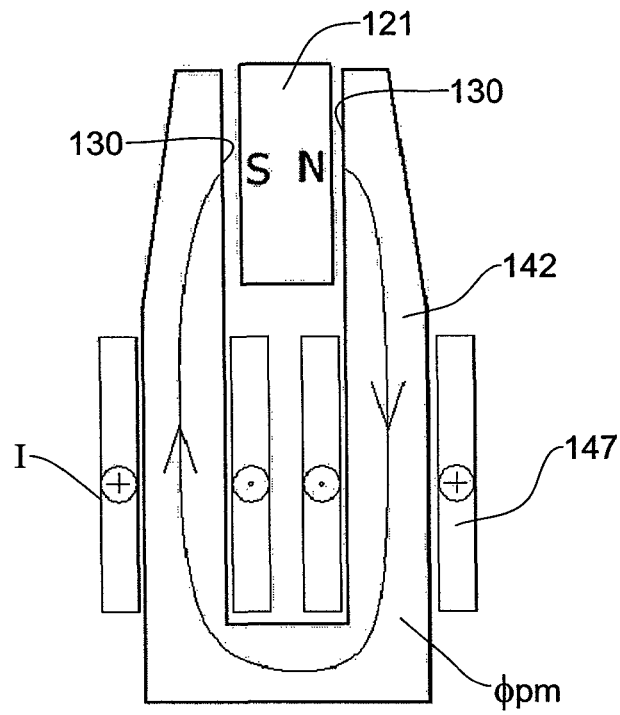
FIG. 110 is a schematic front view of the electromagnetic unit of FIGS. 109A-109B, showing the magnetic flux passing therethrough.
Figure 111A:
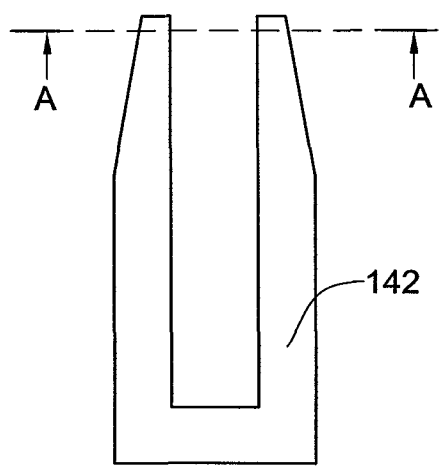
FIGS. 111A to 111D are schematic are schematic front views of an electromagnetic unit of the stator, showing different planes along which positioning plates can be placed during assembly of the stator.
Figure 111B:
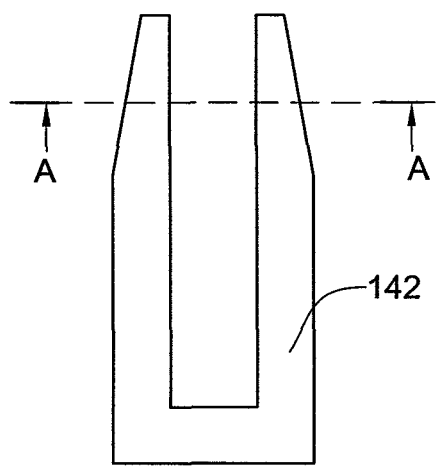
Figure 111C:
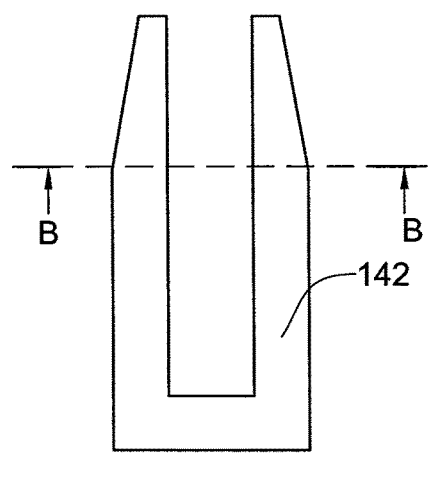
Figure 111D:
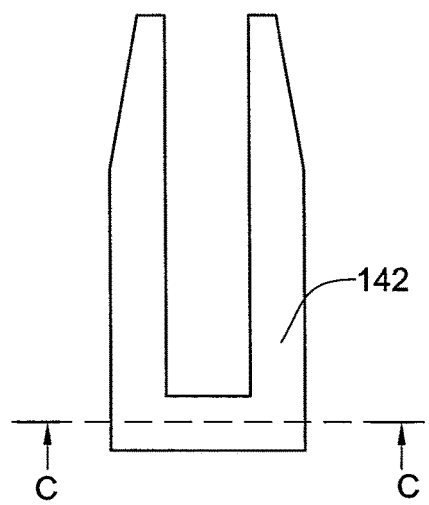
Figure 112A:
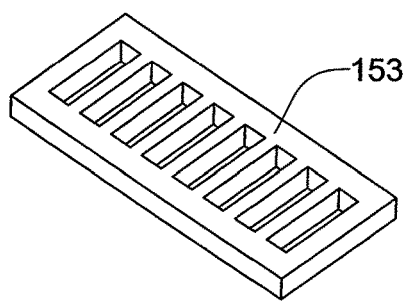
FIGS. 112A and 112B are schematic isometric views of a stator mounted on a base plate and a base positioning plate.
Figure 112B:
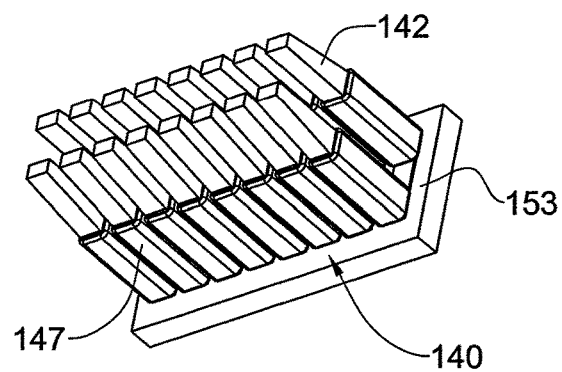
Figure 113A:
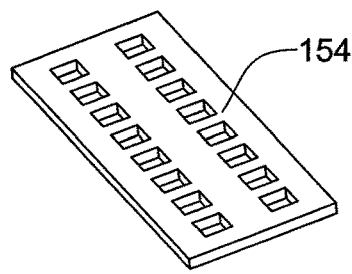
FIGS. 113A and 113B are schematic isometric views of a stator mounted on a mid positioning plate and of the mid positioning plate.
Figure 113B:
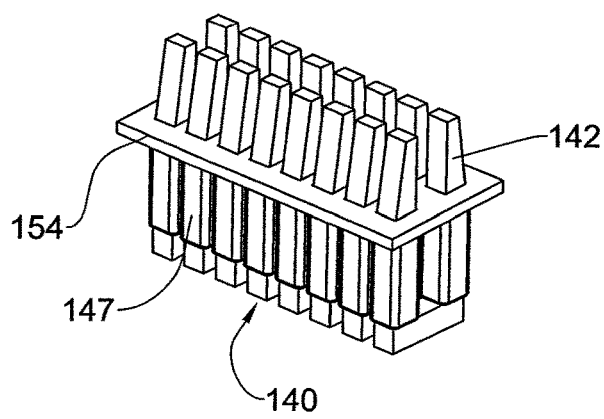

FIG. 110 shows the direction of the working magnetic flux Φpm generated by permanent magnets 121 in the magnetic conductor 142. The magnetic flux Φpm transverses the air gap 130 twice. For the generator operating mode of the electrical machine 100 the flux Φpm closes around the winding 147 wires and, when moving the magnets 121 with respect to the magnetic conductors 142 and the winding 147, it induces a signal in its wires, i.e. it generates the electromotive force. When the electrical circuit of the winding 147 is closed, a current I flows through it.

Stator

The main problem of the stator 110 structure is ensuring its solid design. I.e. the magnetic conductors 142 shall be firmly fixed and shall reliably withstand the force occurring between the rotor magnets 121 and the pole extensions 144 of the magnetic conductors 142 during the rotor 120 spinning (moving the armature 120) with respect to the stator 110 (FIG. 98). Considering that the U-shaped magnetic conductor 142 represents a rigid metal structure, it is proposed to fix it at least in one of the transverse planes A-A, B-B or C-C, as is shown in FIGS. 111A-111D. Depending on the size of the magnetic conductor 142, the location option and the number of transverse planes necessary for reliable fixing may be selected.

To fix magnetic conductors 142, the following options are provided for:

5. The slot heat-conducting frame 153 (FIG. 112A-112B) is the base for installing the magnetic conductors 142 and is made of non-magnetic material, for example, of aluminum or its alloys (corresponds to the C-C section). The frame 153 may be made of an epoxy-based heat-conducting compound or a layer of heat-conducting compound may be poured onto the slot aluminum frame 153.

The slot frame 153 is fixed to the TFPM 150 outer casing. The aluminum frame 153 ensures heat removal from the winding 147 to the TFPM 150 outer casing.

6. The fixing heat-insulating board 154 (FIG. 113A-113B) is made of non-magnetic non-electrically conductive material, e.g. kevlar (corresponds to the B-B section). The board 154 ensures fixing of magnetic conductors 142 between each other and with the outer casing 150.

It partially protects (insulates from heat) the permanent magnets 121 zone from heat generated by the winding 147.

7. The stator slot 140 may comprise at least one limiting board 155 shown in FIGS. 114A-114B made of non-magnetic and/or non conductive material (corresponds to the A-A section). The board 155 may be installed in any place of the pole extensions 144 of the magnetic conductors 142, for example, as is shown in FIGS. 114A-114B—at the tip of pole extensions 144. The board 155 is fixed to magnetic conductors 142 using the glue. The board 155 may be fixed to the TFPM 150 outer casing.

8. The epoxy-based compound 156, which is poured in the area of pole extensions 144 of the magnetic conductors 142 (FIGS. 115-116), which corresponds to the A-A section. FIG. 115 demonstrates an example of the fixture for pouring the compound 156, and FIG. 116 shows the example of RFPM 100 with the compound 156 in the area of pole extensions 144.

Each of the fixing option of the magnetic conductors 142 may be used independently or in any combination with other options considered above (FIGS. 117-120).

Figure 117:
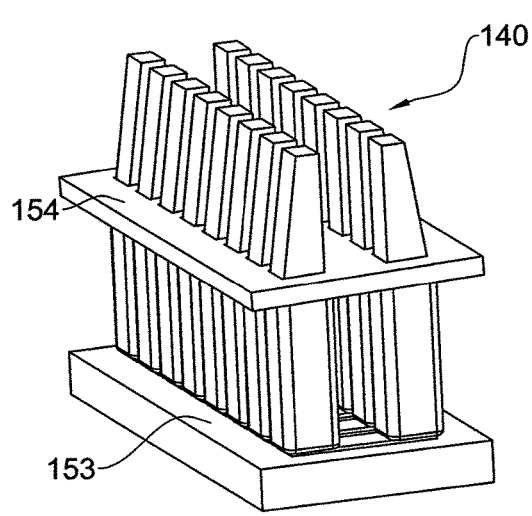
FIGS. 117 to 120 are schematic isometric views of a stator during various stages of assembly thereof.

FIG. 117 shows the option of applying the heat-conducting frame of the slot 153 with the fixing heat-insulating board 154.

Figure 118:
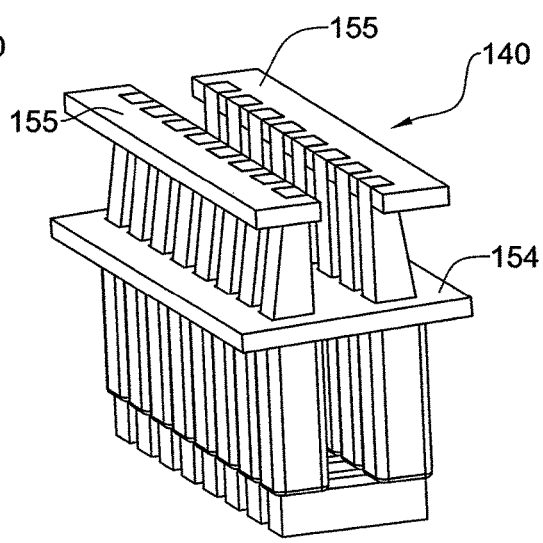

FIG. 118 demonstrates the option of applying the fixing heat-insulating board 154 with the limiting boards 155.

Figure 119:
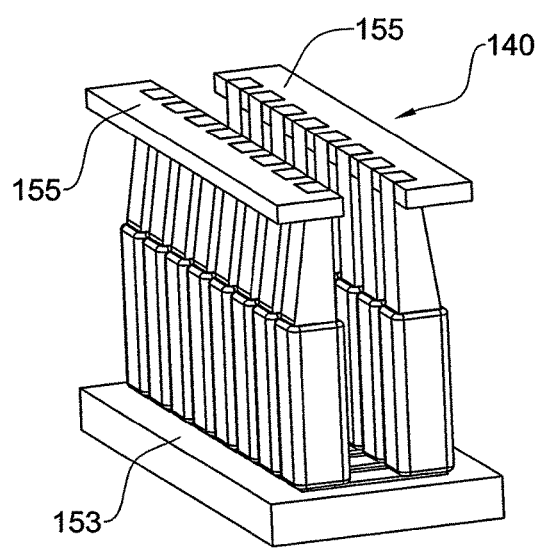

FIG. 119 shows the option of applying the heat-conducting frame of the slot 153 with the limiting boards 155.

Figure 120:
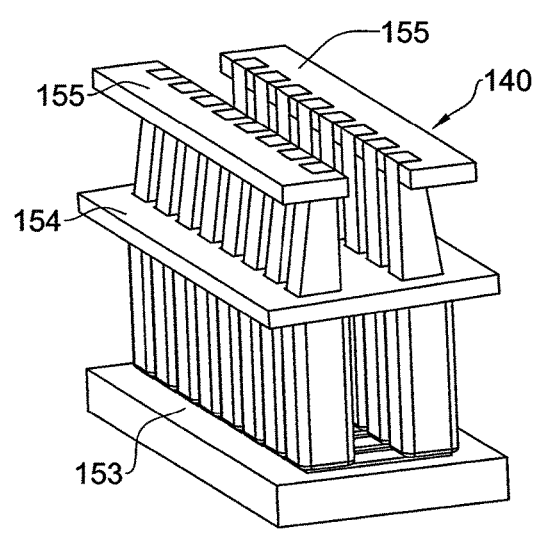

FIG. 120 shows the option of applying the heat-conducting frame of the slot 153 with the fixing heat-insulating board 154 and the limiting boards 155.

The assembly method of the stator 110 includes the slot 140 assembly:

12. Making of the magnet conductors 142 by means of assembling the pressed laminations 146 into the stack 143 or pressing the powder and forming of the solid magnetic conductor 142.
13. Making the winding sleeves 149 by means of continuous winding of the coils 148 onto the holder or forms installed on the holder with no interconnection between them, with the subsequent insulation and varnish penetrative treatment.
14. The installation and attaching to a fixture with the glue of a passive part 145 of the magnetic conductors 142 to the slot frame 153.
15. The winding 149 sleeves are installed and fixed with glue to the pole extensions 144 of the magnetic conductors 142.
16. The pole extensions 144 of the magnetic conductors 142 are fixed between each other in a special fixture (various options may be adopted for magnetic conductors 142 fixing as described above).

After that, the assembled slots 140 are installed and fixed to the external body 150, for example, to the end shields 151 of the electrical machine 100.

The peculiarity of the slot 140 assembly technology is that the magnetic conductors 142 made before are fixed between each other, and the previously made winding sleeves 149 are installed and glued onto the pole extensions 144 of the magnetic conductors 142. The differences in the sequence of operations depend on the selected fixing method of the magnetic conductors 142.

Rotor (Armature)

Figure 121:
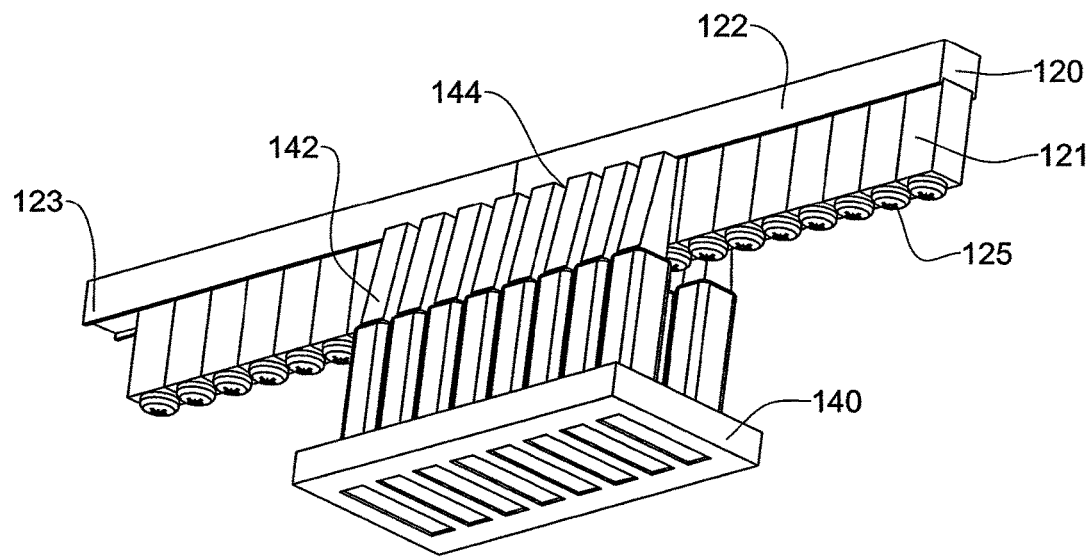
FIG. 121 is a schematic bottom isometric view of a linear stator.

FIG. 121 shows the stator slot 140 and the LFPM armature 120. Soft magnetic materials are absent in the armature 120 within the area of magnets 121 location. Both poles of each armature 121 magnet are embraced with the pole extensions 144 of the corresponding magnetic conductor 142. As is seen in FIG. 121, the armature permanent magnets 121 are fixed to the base 122 with their lateral surface, on the opposite side of the magnetic conductors 142. The armature base 122 is made of non-magnetic material. The groove 123 is provided on the base 122 of the armature, at least one hole 124 is located in the lateral surface of the magnet 121, the screw connection 125 is employed. The magnets 121 on the armature 120 are fixed with the glue. FIG. 26 shows the armature 120 design option using the magnets 121 with no gaps, and FIG. 27 demonstrates the option with nonmagnetic inserts 126. FIG. 28 shows the armature base 122 with the groove 123 for the magnets 121, the magnets 121 with the holes 124, nonmagnetic inserts 126 and the screws 125.

The location of the hole 124 on the lateral surface of the magnets 121 does not result in the losses of the working magnetic flux Φpm, as in case of the hole 124 location on the magnet 121 pole, which is applied for the known conventional RFPM 100 design.

Rotor (armature) of electrical machine 120 is provided with a fan 170 which is installed under the screws 125 fixing the permanent magnets 121. The fan 170 is made of nonmagnetic material in the form of an impeller.

The impeller 170 may be made as separate elements 171 or as inserts 126 between magnets 121 or as a bladed strip 172, or as a bladed ring 173. For the large-size electrical machines 100, the strip 172 and the ring 173 may be composed of several parts.

The fan 170 improves fixing of the magnets 121 to the rotor (armature) base 122 and ensures thermal convection.

Structure of the Electrical Machine

To combine signals directed in the slot winding by each electric magnet, the following conditions shall be met (FIG. 109A-109B):

The number of the slot s (s=2, 3, 4 . . . ) magnetic conductors shall be equal to the doubled number of the pole pairs of the machine moving part 2ps, located inside the slot:

$$s=2ps \quad [1]$$

The pole pitch τp equal to the slot pitch τs:

$$\tau p = \tau s \quad [2]$$

The pole pitch τp is equal to the sum of the magnet width Xpm and the distance between the neighboring magnets Δpm:

$$\tau p = Xpm + \Delta pm \quad [3]$$

The pole pitch τs is equal to the sum of the magnetic conductor width Xem and the distance between the neighboring magnetic conductors Cem:

$$\tau s = Xem + Cem, \text{ i.e.} \quad [4]$$

$$\tau p = \tau s = Xpm + \Delta pm = Xem + Cem \quad [5]$$

If each TFPM phase contains t slots, where t=1, 2, 3 . . . , for the signals to combine in a phase, the distance between the slots Xs:

$$Xs = \tau p \times n, \text{ where } n=0,1,2 \ldots \quad [6]$$

TFPM may have multiphase design. For example, for the for the three-phase TFPM, to shift the signals of each phase to 120°—the distance between the Xph phases:

$$Xph = \tfrac{1}{3} \times \tau p \times m, \quad [7]$$

where m=1, 2, 4, 5 . . . (the positive integer non-divisible by 3)

For a three-phased TFPM, the low cogging torque ripple value is ensured by an additional relation:

$$Cem = \frac{Xem}{1.3 - 1.8} \quad [8]$$

A low cogging torque ripple value is ensured by the relations [7] and [8], i.e. the selection of the distance between the phases, the selection of the magnetic conductor width and the distance between the conductors. In this case, the parasite torque ripples are compensated as a result of summation of ripples of all of the phases.

LFPM

The proposed transverse flux linear permanent magnet machine (LFPM) 100 was built using the principles considered before.

Figure 122:
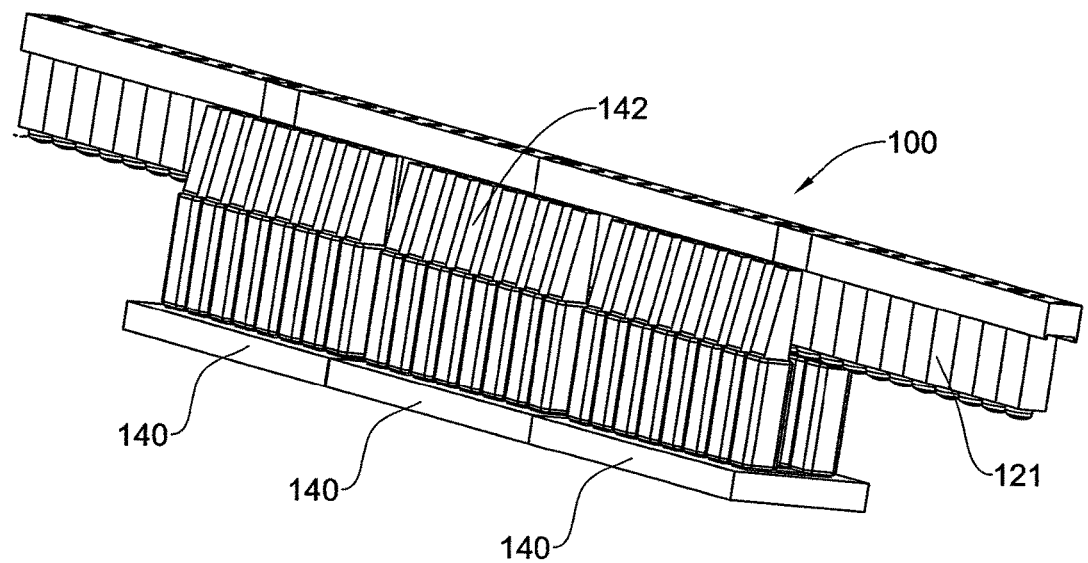
FIG. 122 is a schematic isometric view of a linear stator shown in FIG. 121.
Figure 123:
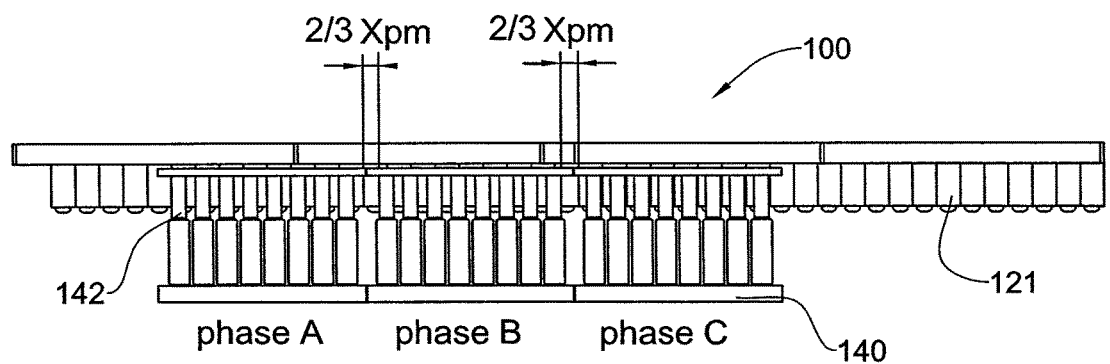
FIG. 123 is a schematic side view of a linear stator shown in FIG. 121

FIGS. 122-123 give an example when each phase of the three-phased LFPM 100 contains one slot 140, each slot 140 comprises 8 magnetic conductors 142 (s=8), which encompass 8 magnets 121 (2ps=8), and the distance between phases Xph=⅓×τpxm=⅔ Xpm, (m=2).

Figure 124:
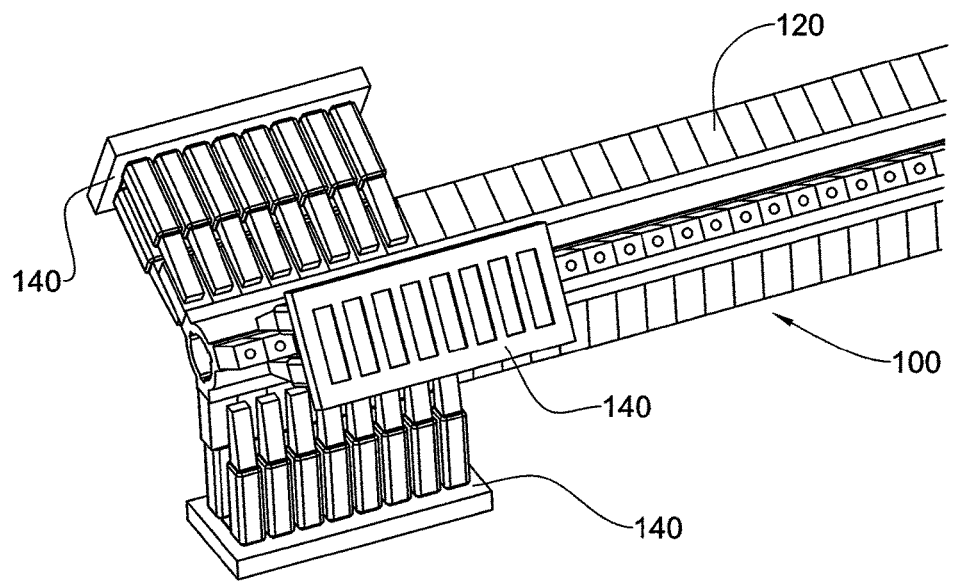
FIG. 124 is a schematic isometric view of another configuration of a linear electrical machine.
Figure 125:
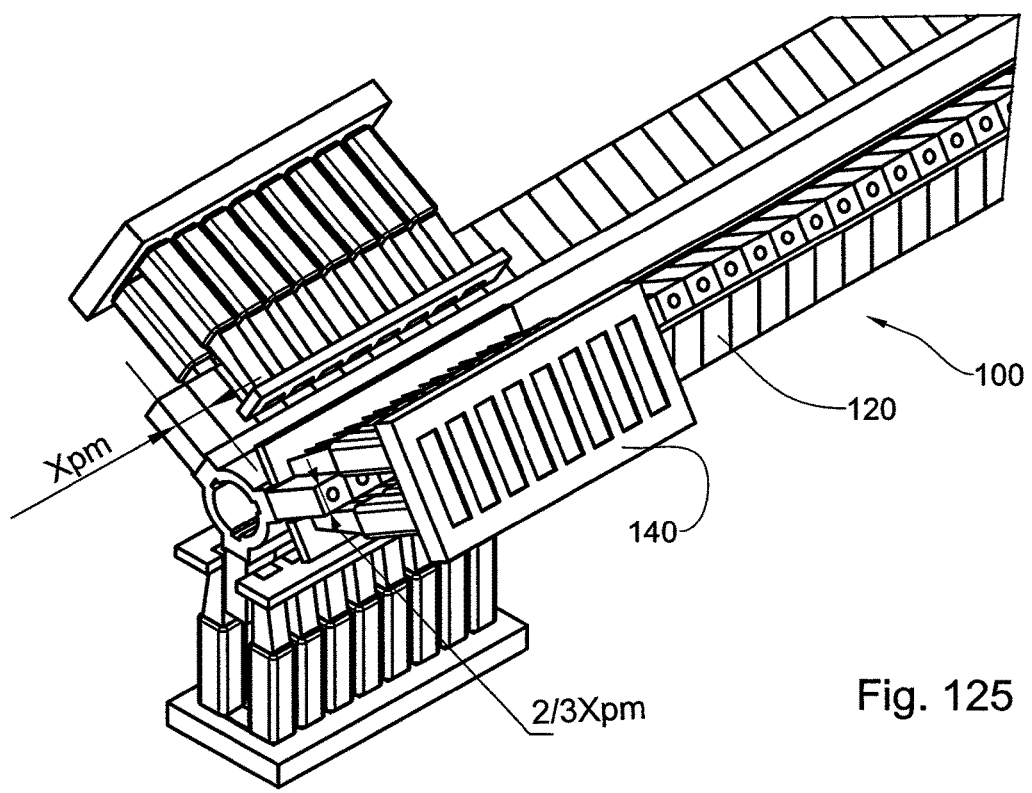
FIG. 125 is a schematic isometric view of the linear electrical machine shown in FIG. 124.

FIGS. 124-125 give an example of the three-phased LFPM 100, where each phase contains one slot 140, with the circumferential position of the phases and the distance between phases along the armature 120 movement Xph=⅓×τpxm=⅔Xpm, (m=2).

Figure 126:
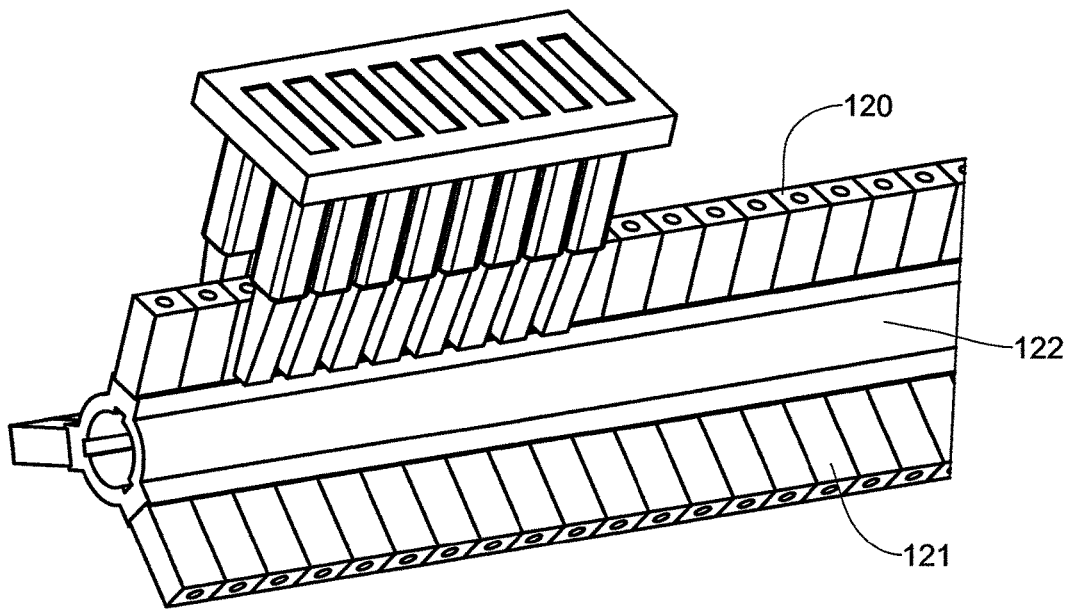
FIG. 126 is a schematic isometric view of a portion of the electrical machine shown in FIG. 125.
Figure 128C:
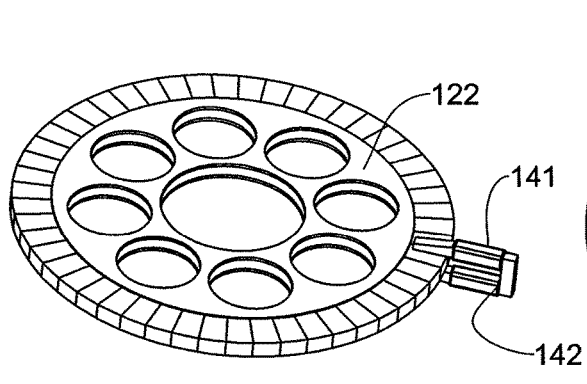
FIGS. 128A to 129D are schematic isometric views of a rotor of an electrical machine, during various assembly stages thereof.
Figure 128D:
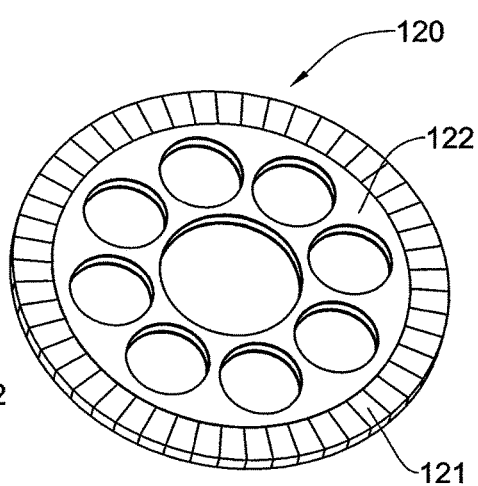
Figure 129A:
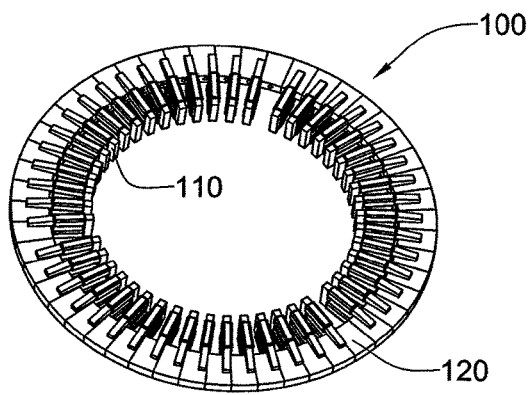
Figure 129B:
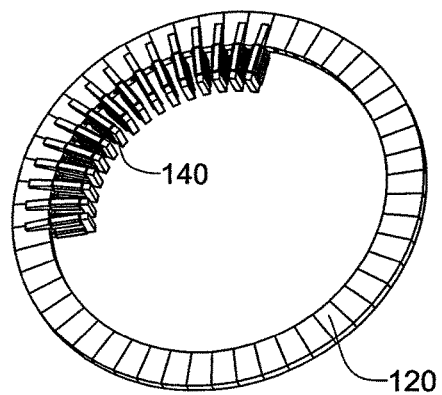

FIGS. 126-127 demonstrate the armature 120, where the magnets 121 are fixed with a screw 125 to the base 122, where grooves 123 are provided for. There is given an example of the armature base 122 implementation as a hollow cylinder with guides and the stem 127, where the armature 120 travels.

AFPM

The proposed axial flux permanent magnet machine (AFPM) 100 was built on the same principles as the linear one considered before. Magnetic conductors 142 are oriented in the plane going through the shaft 160 axis.

FIG. 128A-128D shows the example of a three-phased AFPM 100 design with the internal rotor 120. FIG. 129A-129D shows the example of a three-phased AFPM 100 design with the external rotor 120.

The parameters of the represented AFPM 100 design options with the internal and external rotor 120: the number of pole pairs p=25 (i.e. the number of magnets 121 on the rotor 2p=50); the number of the magnetic conductors 142 of the slot s=16; machine 100 has a three-phased design, each phase has one slot 140 t=1; no gaps between the rotor magnets 121 Δpm=0, and the distance between phases Xph=⅔Xpm (FIG. 130).

RFPM

The proposed radial flux permanent magnet machine (RFPM) 100 was built on the same principles as the axial-flow, linear ones considered before. The surfaces of permanent magnets 121 and the surfaces of the magnetic conductors 142 pole extensions 144 facing them are implemented with the corresponding radii. Magnetic conductors are oriented in the plane going through the shaft 160 axis.

Figure 131:
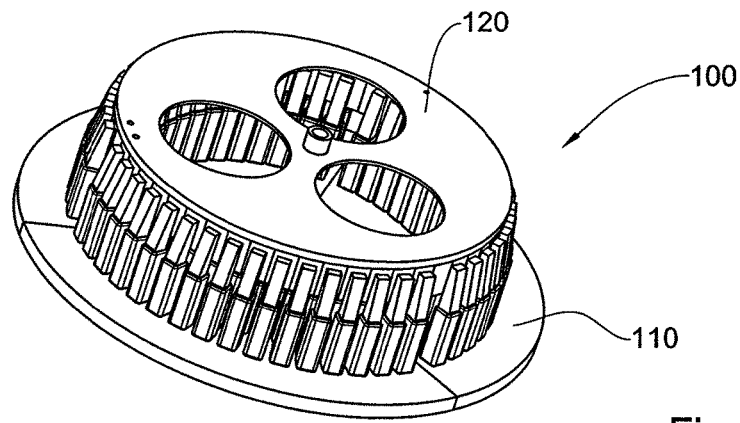
FIG. 131 is a schematic isometric view of a semi-assembled electrical machine.
Figure 132:
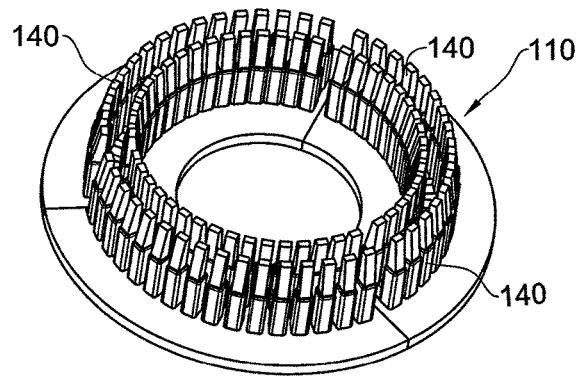
FIGS. 132 to 134D are schematic isometric views of parts of the electrical machine shown in FIG. 131, during various assembly stages thereof.
Figure 133:
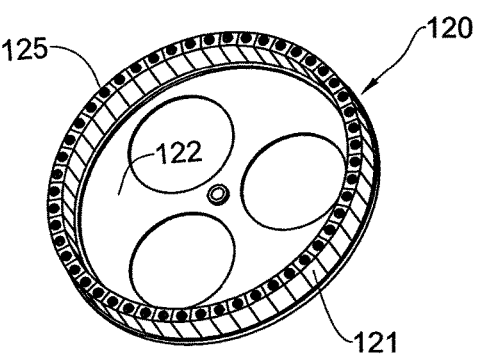

FIGS. 131-135 show an example of a three-phased RFPM 100 design. FIG. 131 shows the stator 110 and the rotor 120. FIG. 132 shows the stator 110. FIG. 133 shows the rotor 120.

Figure 134A:
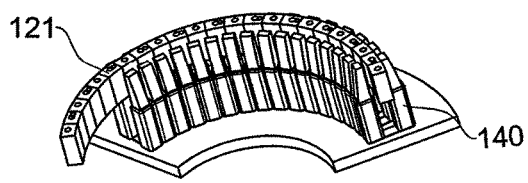
Figure 134B:
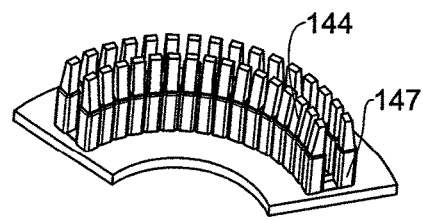

FIG. 134 shows the stator 140 slot and its components.

The parameters of the represented RFPM 100 design option: the number of pole pairs p=25; the number of the slot magnetic conductors 140 s=16; three-phased machine 100, each phase contains one slot 140 t=1; no gaps between the rotor magnets 121 Δpm=0, and the distance between phases Xph=⅔Xpm (FIG. 135).

Figure 137:
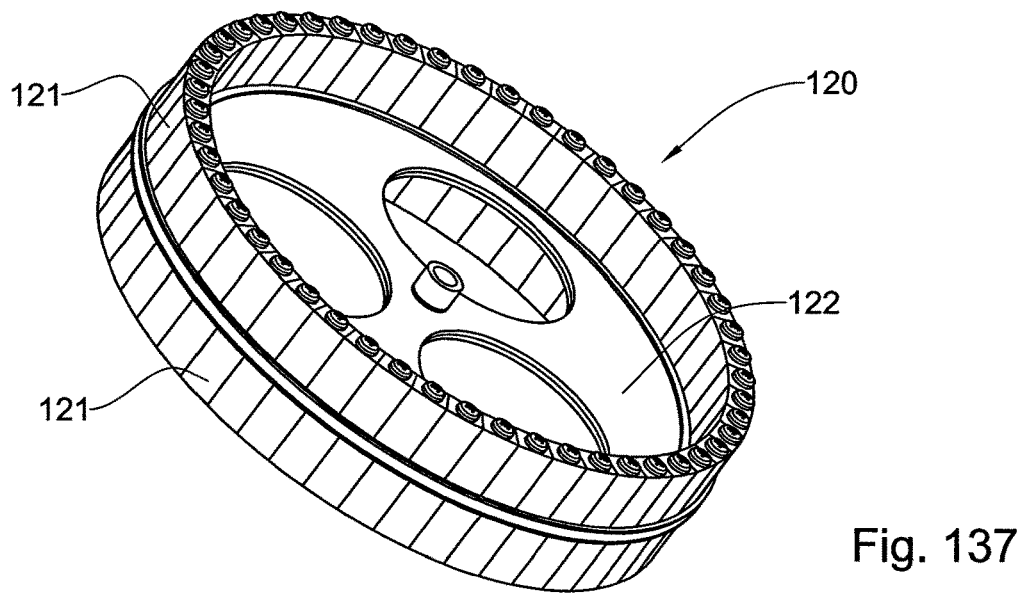
FIG. 137 is a schematic isometric view of a rotor of the electrical machine shown in FIG. 136.

Double-Section RFPM 100:

FIGS. 136-137 show another example of the three-phased RFPM 100 design implementation. The stator 110 has two similar sections, each of them containing three slots 140 (FIG. 136). The rotor 120 comprises two groups of electromagnets 121, fixed on two sides on its base 122 (FIG. 137).

Four-Section RFPM

Figure 138:
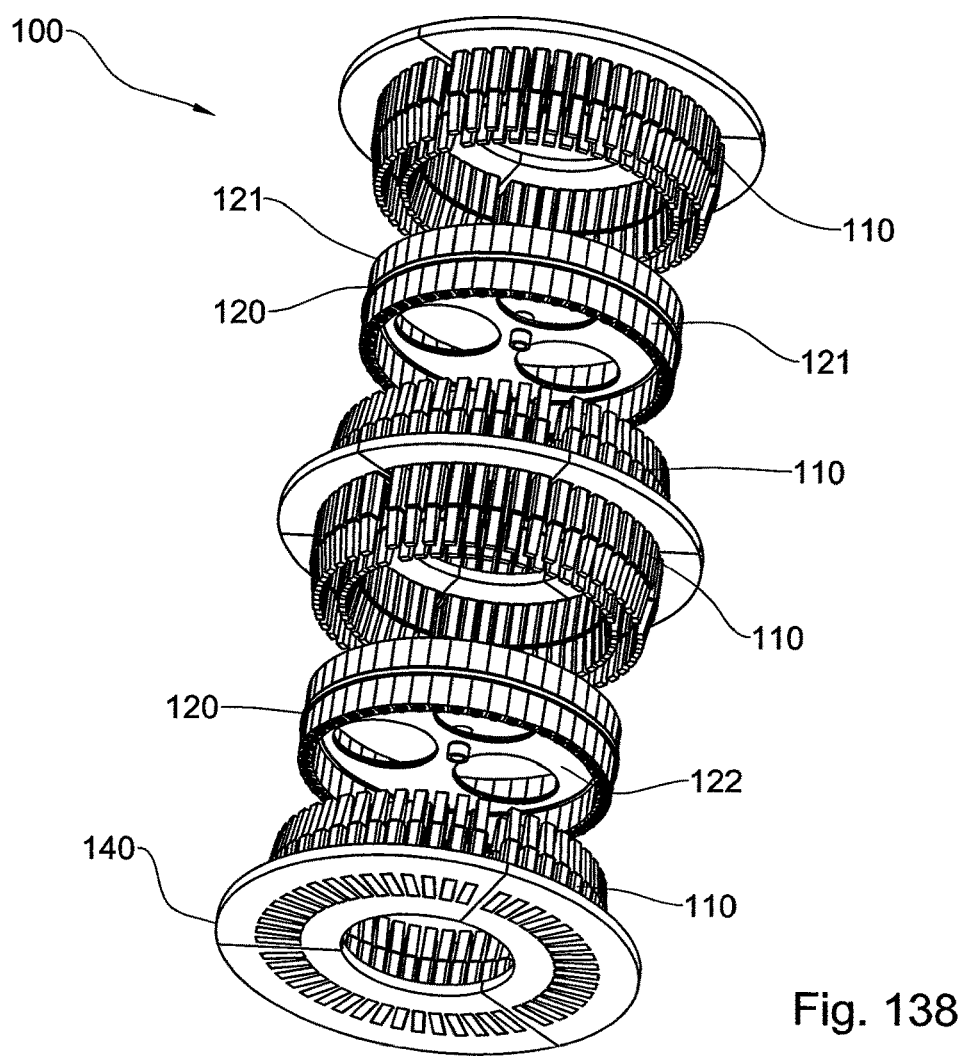
FIG. 138 is a schematic isometric exploded view of the electrical machine.

FIG. 138 shows another example of three-phased RFPM 100 design. The stator 110 comprises four similar sections, each of them containing three slots 140. The rotor 120 comprises two sections, each of them containing two groups of magnets 121 fixed on both sides on two bases of the rotor 122.

LISTING OF ELEMENTS

100—electrical machine
110—stator
120—rotor (armature)
121—permanent magnet
122—rotor (armature) base
123—groove
124—hole
125—screw
126—nonmagnetic insert
127—armature stem
130—air gap
140—stator slot
141—coil winding
142—magnetic conductor
143—magnetic conductor stack
144—magnetic conductor pole extension
145—magnetic conductor passive part
146—magnetic conductor stack lamination
147—stator winding
148—solenoid coil
149—winding sleeve comprising solenoid coils
150—outer casing of electrical machine
151—end shield
152—central section of the electrical machine outer casing
153—slot heat-conducting frame
154—fixing heat-insulating board
155—limiting board
156—compound
160—rotation axis (shaft)
170—fan
171—impeller elements
172—bladed strip
173—bladed ring

The invention claimed is:

1. A magnetic conductor unit configured for being employed in a stator of an electric machine, said magnetic conductor unit being constituted by at least one unitary body, said magnetic conductor unit comprising:

a neck portion constituted by two pole end extensions having ends directed outwardly and sides spaced apart to form a slot for receiving therein a portion of a driven component of the electrical machine, said two pole extensions defining therebetween a symmetry axis; and a frame extending from the two pole end extensions and lying on the same or parallel plane as that of the two pole end extensions, said frame having a first frame portion having walls extending to one side of the symmetry axis to a distance W1, and a second frame portion having walls extending to the other side of the symmetry axis to a distance W2, where W2<W1, wherein W1, W2 are measured substantially perpendicular to the symmetry axis;

wherein at least the first frame portion is configured for receiving therein a portion of a coil of the stator of the electrical machine;

wherein said frame further comprises a bottom portion which is common to said first frame portion and said second frame portion, and is spaced from the neck portion along the symmetry axis at a predetermined distance for inserting and/or removing the portion of the coil through said first frame portion.

2. The magnetic conductor unit according to claim 1, wherein said frame is rectangular.

3. The magnetic conductor unit according to claim 1, wherein one side of the frame is co-linear with one of the two pole end extensions.

4. The magnetic conductor unit according to claim 1, wherein the two pole end extensions have a tapering shape, becoming narrower away from the frame.

5. The magnetic conductor unit according to claim 1, wherein the magnetic conductor unit is made of a plurality of unitary bodies, each of the unitary body having a thickness y and a geometry similar to that of the magnetic conductor unit, said plurality of unitary bodies being joined to form the electromagnetic unit having a combined thickness Y, being the sum of thicknesses y.

6. A stator of an electrical machine comprising at least one coil winding and a plurality of magnetic conductor units according to claim 1, mounted onto said at least one coil winding being mutual for said plurality of magnetic conductor units, each magnetic conductor unit being oriented perpendicular to a contour of said at least one coil winding, wherein said plurality of magnetic conductor units are arranged successively along the contour of said at least one coil winding next to each other at an alternative arrangement such that for each two successive magnetic conductor units, the wall of the first frame portion of one magnetic conductor unit is located at one side of said at least one coil winding, while the wall of the second frame portion of the next successive magnetic conductor unit is located at the opposite side of said at least one coil winding.

7. The stator according to claim 6, wherein said plurality of the magnetic conductor units are arranged such that the neck portions thereof form together a passage space for a driven component of the electrical machine.

8. The stator according to claim 7, wherein the driven component is a permanent magnet structure.

9. The stator according to claim 6, wherein said at least one coil winding extends at least along a sector of a circle and has a first portion of radius R1 and a second portion of a radius R2, wherein R2<R1, extending about a mutual central axis, and wherein the magnetic conductor units are arranged along the coil contour at an alternating order so that the first frame portion of one magnetic conductor unit is located outside the confines of the first portion of said at least one coil winding, while the first frame portion of the successive electromagnetic unit is positioned within the confines of the second portion of said at least one coil winding.

10. The stator according to claim 6, wherein said stator further comprises at least one positioning plate formed with positioning slots into which at least a portion of each of the plurality of magnetic conductor units.

11. The stator according to claim 10, wherein said stator comprises two or more positioning plates, each being configured for receiving therein a different portion of each of the plurality of magnetic conductor units.

12. The stator according to claim 10, wherein said at least one positioning plate lies in a plane perpendicular to a plane of the magnetic conductor unit which is common to planes of the neck portion and the frame.

13. A method for assembly of a stator of an electrical machine, said method comprising:

providing:
  magnetic conductor units of claim 1;
  at least one coil winding; and
  at least one positioning plate comprising positioning slots, each being configured for receiving therein at least a portion of a corresponding magnetic conductor unit;

assembling the plurality of magnetic conductor units with said at least one coil winding in an alternating order on opposite sides of said at least one coil winding to form a semi-assembled stator; and assembling the magnetic conductor units onto the positioning plate by anchoring said magnetic conductor units into said positioning slots.

14. The method according to claim 13, wherein said coil is configured for surrounding a portion of a frame of the magnetic conductor unit.

15. The method according to claim 13 comprising:

first mounting the plurality of the magnetic conductor units onto said at least one coil winding to form a semi-assembled stator, so that each electromagnetic unit is oriented transverse to the longitudinal direction; and thereafter mounting the semi-assembled stator onto the positioning plate by anchoring each of a majority of the magnetic conductor units into respective positioning slots of the positioning plate, thereby forming an assembled stator in the form of a solid body; wherein the arrangement of the positioning slots is such that once the magnetic conductor units are anchored, said at least one coil winding is prevented from removal from the assembled stator.

16. The method according to claim 15, wherein said at least one coil winding has a close-contour which extends along at least a sector of a circle, said at least one coil winding having a first portion of radius R1 and a second portion of a radius R2, wherein R2<R1, extending about a mutual central axis, and wherein the magnetic conductor units are arranged along the coil contour at an alternating order so that the first frame portion of one magnetic conductor unit is located outside the confines of the first portion of said at least one coil winding, while the first frame portion of the successive electromagnetic unit is positioned within the confines of the second portion of said at least one coil winding.

17. The method according to claim 13, wherein said method includes providing two or more positioning plates, and anchoring the plurality of magnetic conductor units thereto so that each positioning plate is configured for receiving therein a different portion of each of the plurality of magnetic conductor units.

18. A stator assembled according to the method of claim 13.

* * * * *